US009442505B2

(12) United States Patent
Yokoyama et al.

(10) Patent No.: US 9,442,505 B2
(45) Date of Patent: Sep. 13, 2016

(54) ELECTRIC POWER CONTROL APPARATUS, ELECTRIC POWER CONTROL METHOD, AND ELECTRIC POWER FEEDING SYSTEM

(75) Inventors: Masayuki Yokoyama, Tokyo (JP); Naotaka Osawa, Kanagawa (JP); Yumiko Yamazaki, Kanagawa (JP); Shotaro Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 1050 days.

(21) Appl. No.: 13/581,869

(22) PCT Filed: Feb. 23, 2011

(86) PCT No.: PCT/JP2011/053934
§ 371 (c)(1),
(2), (4) Date: Aug. 30, 2012

(87) PCT Pub. No.: WO2011/108412
PCT Pub. Date: Sep. 9, 2011

(65) Prior Publication Data
US 2012/0326512 A1    Dec. 27, 2012

(30) Foreign Application Priority Data
Mar. 3, 2010    (JP) ................ 2010-047040

(51) Int. Cl.
*H02J 1/00* (2006.01)
*G05F 1/67* (2006.01)
(Continued)

(52) U.S. Cl.
CPC ............. *G05F 1/67* (2013.01); *H02J 1/108* (2013.01); *H02J 7/0031* (2013.01); *H02J 7/35* (2013.01);
(Continued)

(58) Field of Classification Search
CPC ......... G05F 1/67; H02J 7/0031; H02J 1/108; Y10T 307/604
USPC ............................................. 307/71
See application file for complete search history.

(56) References Cited

U.S. PATENT DOCUMENTS

| | | | |
|---|---|---|---|
| 6,373,226 B1* | 4/2002 | Itou | H02J 7/0018 320/132 |
| 2001/0038275 A1* | 11/2001 | Hanada | H02J 7/345 320/118 |

(Continued)

FOREIGN PATENT DOCUMENTS

| | | |
|---|---|---|
| JP | 07-020956 | 1/1995 |
| JP | 7-336910 | 12/1995 |

(Continued)

*Primary Examiner* — Jared Fureman
*Assistant Examiner* — Duc M Pham
(74) *Attorney, Agent, or Firm* — K&L Gates LLP

(57) ABSTRACT

An electric power control apparatus, an electric power control method, and an electric power feeding system by which the maximum operating point of a generating element such as a solar battery can be controlled to be maintained, and electric power loss can be avoided. The electric power control apparatus is provided with an electric power path switch unit to which a plurality of generating elements can be connected, and a voltage conversion unit that converts a voltage level which is generated by the generating elements and supplied via the electric power path switch unit. The electric power path switch unit includes a first connection switching function which switches between series connection and parallel connection for the plurality of generating elements, and a second connection switching function which switches between connected and non-connected to an input side of the voltage conversion unit for the generating elements connected in series or parallel.

56 Claims, 56 Drawing Sheets

(51) Int. Cl.
 *H02J 7/00* (2006.01)
 *H02J 1/10* (2006.01)
 *H02J 7/35* (2006.01)
(52) U.S. Cl.
 CPC ............... *Y02E 10/566* (2013.01); *Y02E 10/58* (2013.01); *Y10T 307/604* (2015.04); *Y10T 307/653* (2015.04); *Y10T 307/696* (2015.04)

(56) References Cited

U.S. PATENT DOCUMENTS

2005/0162131 A1* 7/2005 Sennami ............. H01M 2/1022
 320/128

2009/0179495 A1* 7/2009 Yeh ........................ H02J 9/062
 307/66

FOREIGN PATENT DOCUMENTS

| JP | 08-251818 | 9/1996 |
| JP | 11-103537 | 4/1999 |
| JP | 2000-089841 | 3/2000 |
| JP | 2001-218365 | 8/2001 |
| JP | 2007-133765 | 5/2007 |
| JP | 2008-3000745 | 12/2008 |
| JP | 2010-219349 | 9/2010 |

* cited by examiner

FIG. 6

| PATH NAME | DESCRIPTION | FIGURE |
|---|---|---|
| PTA | CONNECT SOLAR BATTERY 2 AND SECONDARY BATTERY DIRECTLY. | 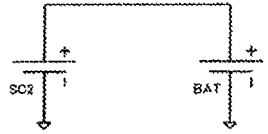 |
| PTB | SUPPLY OUTPUT FROM SOLAR BATTERY 2 VIA STEP-UP CIRCUIT TO SECONDARY BATTERY. | 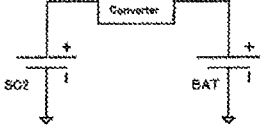 |
| PTC | CONNECT SOLAR BATTERY 1 AND SECONDARY BATTERY DIRECTLY. |  |
| PTD | SUPPLY OUTPUT FROM SOLAR BATTERY 1 VIA STEP-UP CIRCUIT TO SECONDARY BATTERY. |  |
| PTE | CONNECT SOLAR BATTERY 1 AND SOLAR BATTERY 2 IN SERIES, AND CONNECT SECONDARY BATTERY THERETO | 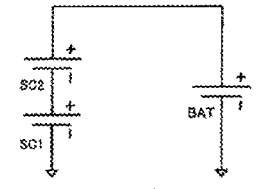 |

FIG. 7

| | | |
|---|---|---|
| PTF | SUPPLY OUTPUT FROM SERIES CONNECTION OF SOLAR BATTERY 1 AND SOLAR BATTERY 2 TO SECONDARY BATTERY VIA STEP-UP CIRCUIT. | |
| PTG | CONNECT SOLAR BATTERY 1 AND SOLAR BATTERY 2 IN PARALLEL, AND CONNECT SECONDARY BATTERY THERETO DIRECTLY. | |
| PTH | SUPPLY OUTPUT FROM PARALLEL CONNECTION OF SOLAR BATTERY 1 AND SOLAR BATTERY 2 TO SECONDARY BATTERY VIA STEP-UP CIRCUIT. | |
| PTI | PASS OUTPUT FROM SOLAR BATTERY 1 THROUGH STEP-UP CIRCUIT, CONNECT OUTPUT FROM SOLAR BATTERY 2 IN PARALLEL, AND SUPPLY THEM TO SECONDARY BATTERY. | |
| PTJ | PASS OUTPUT FROM SOLAR BATTERY 2 THROUGH STEP-UP CIRCUIT, CONNECT OUTPUT FROM SOLAR BATTERY 1 IN PARALLEL, AND SUPPLY THEM TO SECONDARY BATTERY. | |
| PTK | OPEN ALL OF SOLAR BATTERY 1, SOLAR BATTERY 2, AND SECONDARY BATTERY. GROUND MINUS SIDE OF SOLAR BATTERY 2 (PATH FOR OPEN VOLTAGE MEASUREMENT OF SOLAR BATTERY). | |
| PTL | OPEN ALL OF SOLAR BATTERY 1, SOLAR BATTERY 2, AND SECONDARY BATTERY (ALL SWITCHES IN OFF-STATE). LEAVE MINUS SIDE OF SOLAR BATTERY 2 IN OPEN STATE. | |

FIG. 8

|   | SW1 | SW2 | SW3 | SW4 | SW5 | SW6 |
|---|-----|-----|-----|-----|-----|-----|
| A | H | L | L | L | L | H |
| B | H | L | L | L | H | L |
| C | L | H | L | L | L | L |
| D | L | L | L | H | L | L |
| E | L | L | H | L | L | H |
| F | L | L | H | L | H | L |
| G | H | H | L | L | L | H |
| H | H | L | L | H | H | L |
| I | H | L | L | H | L | H |
| J | H | H | L | L | H | L |
| K | H | L | L | L | L | L |
| L | L | L | L | L | L | L |

ELECTRIC POWER PATH PTB

ELECTRIC POWER PATH PTE

FIG. 21

| PATH NAME | DESCRIPTION | FIGURE |
|---|---|---|
| PTE | CONNECT SOLAR BATTERY 1 AND SOLAR BATTERY 2 IN SERIES, AND CONNECT SECONDARY BATTERY THERETO DIRECTLY. | |
| PTF | SUPPLY OUTPUT FROM SERIES CONNECTION OF SOLAR BATTERY 1 AND SOLAR BATTERY 2 TO SECONDARY BATTERY VIA STEP-UP CIRCUIT. | |
| PTG | CONNECT SOLAR BATTERY 1 AND SOLAR BATTERY 2 IN PARALLEL, AND CONNECT SECONDARY BATTERY THERETO DIRECTLY. | |
| PTH | SUPPLY OUTPUT FROM PARALLEL CONNECTION OF SOLAR BATTERY 1 AND SOLAR BATTERY 2 TO SECONDARY BATTERY VIA STEP-UP CIRCUIT. | |
| PTM (H) | SUPPLY OUTPUT FROM PARALLEL CONNECTION OF SOLAR BATTERY 1 AND SOLAR BATTERY 2 TO SECONDARY BATTERY VIA STEP-DOWN CIRCUIT. | |
| PTN (F) | SUPPLY OUTPUT FROM SERIES CONNECTION OF SOLAR BATTERY 1 AND SOLAR BATTERY 2 TO SECONDARY BATTERY VIA STEP-DOWN CIRCUIT. | |

ELECTRIC POWER CONTROL APPARATUS, ELECTRIC POWER CONTROL METHOD, AND ELECTRIC POWER FEEDING SYSTEM

CROSS REFERENCES TO RELATED APPLICATIONS

The present application is a national stage of International Application No. PCT/JP2011/053934 filed on Feb. 23, 2011 and claims priority to Japanese Patent Application No. 2010-047040 filed on Mar. 3, 2010, the disclosure of which is incorporated herein by reference.

BACKGROUND

The present invention relates to an electric power control apparatus, an electric power control method, and an electric power feeding system for controlling supply of electric power generated by a generating element.

As an environment protection measure, development of clean energy that does not emit carbon dioxide or polluting substances is desired. Among others, solar power generation and wind power generation have seen increasingly widespread use in recent years.

Particularly, use of solar power generating elements in general households is gradually becoming widespread due to the decrease in price and increase in generation efficiency of solar batteries (solar panels) that can be installed on rooftops of houses and the like.

Solar power generating elements have also become smaller in size, and sales of portable telephones equipped with a solar battery have been available.

A solar battery has characteristics different from those of constant voltage sources, such as dry-cell batteries, and has characteristics as a current source dependent on the voltage across its terminals.

Thus, in order to obtain a maximum output from a solar battery, the voltage of a load connected to the solar battery needs to be matched with the maximum operating point voltage of the solar battery.

In the current-voltage characteristics of a solar battery, there is only one maximum operating point (MPP: Maximum Power Point) where the electric power is at the maximum.

However, the current-voltage characteristics of a solar battery vary depending on the environment such as illuminance or temperature, so that the control for obtaining the maximum operating point voltage needs to be performed during operation of a device connected to the solar battery.

Such a control for obtaining the maximum operating point during operation of device is referred to as a MPPT (Maximum Power Point Tracking) control.

Many techniques for implementing the MPPT control have been proposed, and those techniques for the direct-current path can be roughly categorized into the following two types.

First type is a technique involving switching between series and parallel connections of a plurality of solar batteries (see Patent Document 1, for example).

Second type is a technique for obtaining the maximum operating point by controlling a switching type DC-DC converter (see Patent Document 2, for example).

CITATION LIST

Patent Documents

Patent Document 1: Japanese Patent Application Laid-Open No. 2001-218365

Patent Document 2: Japanese Patent Application Laid-Open No. 7-336910

SUMMARY

Problems to be Solved by the Invention

For implementing the MPPT control, according to the first technique by which the connection of a plurality of solar batteries is switched between series and parallel connections, the control can be implemented such that the maximum operating point can be approached.

However, in this technique, because the solar batteries may be connected in parallel, the respective solar batteries need to have the same maximum operating point voltage.

Further, the possible modes of series or parallel connection vary depending on the number of the solar batteries. For example, when there are two solar batteries, selection must be made from two maximum operating points of an all-series connection and an all-parallel connection; when there are six solar batteries, the selection must be made from four maximum operating points.

In this case, there is the disadvantage that, because the voltage differences between the respective points are not uniform, a number of voltage sections exist in which the voltage across terminals cannot be matched with the maximum operating point.

According to the second technique for obtaining the maximum operating point by controlling the DC-DC converter, a control signal for a switch can be controlled such that the charging current to a storage battery can be at the maximum.

However, there is the disadvantage associated with electric power loss in the DC-DC converter or electric power loss in a control circuit such as a current measurement circuit, for example.

The present invention lies in providing an electric power control apparatus, an electric power control method, and an electric power feeding system by which the maximum operating point of a generating element, such as a solar battery, can be controlled to be maintained, and by which electric power loss can be avoided.

Solutions to Problems

An electric power control apparatus according to a first aspect of the present invention includes an electric power path switch unit configured to be connectable with a plurality of generating elements, and a voltage conversion unit configured to convert a voltage level generated by the generating elements and supplied via the electric power path switch unit. The electric power path switch unit includes a first connection switching function which switches between series connection and parallel connection for the plurality of generating elements, and a second connection switching function which switches between connected and non-connected for the generating elements connected in series or in parallel connected to an input side of the voltage conversion unit.

An electric power control method according to the first aspect of present invention includes: when output voltages of a plurality of generating elements are in a first voltage range, connecting the plurality of generating elements in parallel by a first connection switching function, and performing connection switching to a non-connected state by a second connection switching function such that a voltage level of any of the output voltages of the plurality of generating elements is not converted by a voltage conversion unit; when the output voltages of the generating elements are in a second voltage range lower than the first voltage range, connecting the plurality of generating elements in parallel by the first connection switching function, and performing connection switching to a connected state by the second connection switching function such that the voltage level of a final-stage output voltage of the plurality of generating elements is converted by the voltage conversion unit; and, when the output voltages of the generating elements are in a third voltage range lower than the second voltage range, connecting the plurality of generating elements in series by the first connection switching function, and performing connection switching to the non-connected state by the second connection switching function such that the voltage level of any of the output voltages of the plurality of generating elements is not converted by the voltage conversion unit.

An electric power feeding system according to a second aspect of the present invention includes a plurality of generating elements configured to generate electric power, and an electric power control apparatus configured to supply the electric power from the generating elements to a load side. The electric power control apparatus includes an electric power path switch unit configured to be connectable with the plurality of generating elements, and a voltage conversion unit configured to convert a voltage level generated by the generating elements and supplied via the electric power path switch unit. The electric power path switch unit includes a first connection switching function which switches between series connection and parallel connection for the plurality of generating elements, and a second connection switching function which switches between connected and non-connected for the generating elements connected in series or in parallel to an input side of the voltage conversion unit.

An electric power control apparatus according to a third aspect of the present invention includes an electric power path switch unit configured to be connectable with a plurality of generating elements and including a function which switches between series connection and parallel connection for the plurality of generating elements; a characteristics measurement circuit configured to measure output characteristics of the plurality of generating elements; and a control unit configured to perform switching control of an electric power path of the electric power path switch unit in accordance with a measurement result from the characteristics measurement circuit.

An electric power feeding system according to a fourth aspect of the present invention includes a plurality of generating elements configured to generate electric power, and an electric power control apparatus configured to supply the electric power from the generating elements to a load side. The electric power control apparatus includes an electric power path switch unit configured to be connectable with the plurality of generating elements and including a function which switches between series connection and parallel connection for the plurality of generating elements; a characteristics measurement circuit configured to measure output characteristics of the plurality of generating elements; and a control unit configured to perform switching control of an electric power path of the electric power path switch unit in accordance with a measurement result from the characteristics measurement circuit.

An electric power control apparatus according to a fifth aspect of the present invention includes a voltage conversion unit configured to convert a voltage level generated by at least one generating element, a characteristics measurement circuit configured to measure output characteristics of the generating element, and a control unit configured to perform MPPT control for tracking a maximum electric power operating point of the generating element in the voltage conversion unit in accordance with a measurement result from the characteristics measurement circuit. The voltage conversion unit is configured to compare a variable reference voltage with the voltage level generated by the generating element, and perform charging or discharging such that the maximum electric power operating point of the generating element is tracked in accordance with a comparison result. The control unit is configured to perform the MPPT control for tracking the maximum electric power operating point of the generating element in the voltage conversion unit by supplying the variable reference voltage based on the measurement result from the characteristics measurement circuit.

An electric power feeding system according to a sixth aspect of the present invention includes at least one generating element configured to generate electric power, and an electric power control apparatus configured to supply the electric power from the generating element to a load side. The electric power control apparatus includes a voltage conversion unit configured to convert a voltage level generated by the generating element; a characteristics measurement circuit configured to measure output characteristics of the generating element; and a control unit configured to perform MPPT control for tracking a maximum electric power operating point of the generating element in the voltage conversion unit in accordance with a measurement result from the characteristics measurement circuit. The voltage conversion unit is configured to compare a variable reference voltage with the voltage level generated by the generating element, and perform charging or discharging such that the maximum electric power operating point of the generating elements is tracked in accordance with a comparison result. The control unit is configured to perform the MPPT control for tracking the maximum electric power operating point of the generating element in the voltage conversion unit by supplying the variable reference voltage based on the measurement result from the characteristics measurement circuit.

An electric power control apparatus according to a seventh aspect of the present invention includes an electric power path switch unit configured to be connectable with a plurality of generating elements and including a function which switches between series connection and parallel connection for the plurality of generating elements, and a backflow prevention circuit disposed in an electric power supply line for supplying output electric power from the electric power path switch unit to a load and including a function which prevents backflow from a load side when a potential of the load side is higher than a potential of the electric power supply line.

An electric power feeding system according to an eighth aspect of the present invention includes a plurality of generating elements configured to generate electric power, and an electric power control apparatus configured to supply the electric power from the generating elements to a load side. The electric power control apparatus includes an electric power path switch unit configured to be connectable with the plurality of generating elements and including a function which switches between series connection and parallel connection for the plurality of generating elements, and a backflow prevention circuit disposed in an electric power supply line for supplying output electric power from the electric power path switch unit to a load and including a function which prevents backflow from the load side when a potential of the load side is higher than a potential of the electric power supply line.

An electric power control apparatus according to a ninth aspect of the present invention includes a backflow prevention circuit including a function which prevents backflow from a load side when a potential of a load side is higher than a potential of an electric power supply line, a limit circuit configured to supply electric power from a generating element to an electricity storage element on a load side for charging the electricity storage element, and be capable of limiting the supplied electric power, the limit circuit limiting the electric power supply such that a voltage supplied to the electricity storage element is lower than a full-charge voltage, and a control unit configured to terminate the backflow prevention function of the backflow prevention circuit when the electric power supply is limited by the limit circuit.

An electric power feeding system according to a tenth aspect of the present invention includes at least one generating element configured to generate electric power, and an electric power control apparatus configured to supply the electric power from the generating element to a load side. The electric power control apparatus includes a backflow prevention circuit including a function which prevents backflow from the load side when a potential of the load side is higher than a potential of an electric power supply line; a limit circuit configured to supply the electric power from the generating element to an electricity storage element on the load side for charging the electricity storage element, and be capable of limiting the supplied electric power, the limit circuit limiting the electric power supply such that a supply voltage to the electricity storage element is lower than a full-charge voltage; and a control unit configured to terminate the backflow prevention function of the backflow prevention circuit when the electric power supply is limited by the limit circuit.

An electric power control apparatus according to an eleventh aspect of the present invention includes an electric power path switch unit configured to be connectable with a plurality of generating elements and including a function which switches between series connection and parallel connection for the plurality of generating elements, and a limit circuit configured to supply electric power from the generating elements to an electricity storage element on a load side for charging the electricity storage element, and be capable of limiting the supplied electric power. The limit circuit is configured to limit the electric power supply such that a supply voltage to the electricity storage element is lower than a full-charge voltage.

An electric power feeding system according to a twelfth aspect of the present invention includes a plurality of generating elements configured to generate electric power, and an electric power control apparatus configured to supply the electric power from the generating elements to a load side. The electric power control apparatus includes an electric power path switch unit configured to be connectable with the plurality of generating elements and including a function which switches between series connection and parallel connection for the plurality of generating elements, and a limit circuit configured to supply the electric power from the generating elements to an electricity storage element on the load side for charging the electricity storage element, and be capable of limiting a supply voltage. The limit circuit is configured to limit voltage supply such that the supply voltage to the electricity storage element is lower than a full-charge voltage.

An electric power control apparatus according to a thirteenth aspect of the present invention includes an electric power path switch unit configured to be connectable with a plurality of generating elements and including a function which switches between series connection and parallel connection for the plurality of generating elements; a voltage conversion unit configured to convert a voltage level generated by the generating elements and supplied via the electric power path switch unit; and a control unit configured to perform charging control by supplying electric power from the generating elements to an electricity storage element on a load side by performing switching control of the electric power path switch unit. The control unit is configured to perform switching such that, when a voltage of the electricity storage element is equal to or less than a certain voltage, the electric power is directly supplied from the generating elements to the electricity storage element, and when the voltage of the electricity storage element is equal to or more than the certain voltage, operating voltages for the electric power path switch unit, the voltage conversion unit, and the control unit can be obtained from the electricity storage element.

An electric power feeding system according to a fourteenth aspect of the present invention includes a plurality of generating elements configured to generate electric power, and an electric power control apparatus configured to supply the electric power from the generating elements to a load side. The electric power control apparatus includes an electric power path switch unit configured to be connectable with the plurality of generating elements and including a function which switches between series connection and parallel connection for the plurality of generating elements; a voltage conversion unit configured to convert a voltage level generated by the generating elements and supplied via the electric power path switch unit; and a control unit configured to perform charging control by supplying the electric power from the generating elements to the load side by performing switching control of the electric power path switch unit. The control unit is configured to compare an input voltage due to the generating elements with a charging voltage of the load and perform initial charging by supplying the voltage due to the generating elements to the load side when the input voltage is higher. When the charging voltage becomes higher than the input voltage as a result of the initial charging, the control unit switches operating voltages for the electric power path switch unit, the voltage conversion unit, and the control unit from the voltage due to the generating elements to the charging voltage on the load side.

An electric power control apparatus according to a fifteenth aspect of the present invention includes an electric power path unit configured to be connectable with a plurality of generating elements with different rates of change of a voltage with respect to illuminance or temperature, and a voltage conversion unit configured to convert a voltage level generated by the generating elements and supplied via the electric power path unit. The electric power path unit is configured to connect the generating elements with a large rate of change of the voltage to the voltage conversion unit, and put the generating elements with a small rate of change of the voltage to a non-connected state with respect to the voltage conversion unit.

An electric power feeding system according to a sixteenth aspect of the present invention includes a plurality of generating elements with different rates of change of a voltage with respect to illuminance or temperature, and an electric power control apparatus configured to supply electric power from the generating elements to a load side. The electric power control apparatus includes an electric power path unit configured to be connectable with the plurality of generating elements with the different rates of change of the voltage with respect to illuminance or temperature, and a voltage conversion unit configured to convert a voltage level generated by the generating elements and supplied via the electric power path unit. The electric power path unit is configured to connect the generating elements with a large rate of change of the voltage to the voltage conversion unit, and put the generating elements with a small rate of change of the voltage in a non-connected state with respect to the voltage conversion unit.

Effects of the Invention

According to the present invention, the maximum operating point of a generating element such as a solar battery can be controlled to be maintained, and electric power loss can be avoided.

Additional features and advantages are described herein, and will be apparent from the following Detailed Description and the figures.

BRIEF DESCRIPTION OF THE FIGURES

FIG. 6 is a first figure of examples of patterns of electric power paths formed by the power switch circuit of FIG. 5.

FIG. 7 is a second figure of examples of patterns of the electric power paths formed by the power switch circuit of FIG. 5.

FIG. 8 shows a truth table of gate voltages of switches for controlling the electric power path of the power switch circuit according to the present embodiment.

FIG. 21 illustrates that the maximum electric power can be obtained from the generating elements (solar batteries) by selecting one of the electric power paths regardless of illuminance or temperature.

DETAILED DESCRIPTION

In the following, an embodiment of the present invention will be described with reference to the drawings.
1. Overall configuration of electric power feeding system
2. Configuration example of generating element
3. Configuration example of electricity storage element
4. Configuration example of electric power control apparatus
4-1. Configuration example of power switch circuit (electric power path switch unit)
4-2. Configuration example of characteristics measurement circuit and control of electric power path based on result of characteristics measurement
4-3. Concrete configuration example of characteristics measurement circuit
4-4. Concrete configuration example of voltage conversion unit
4-5. Configuration example of backflow prevention circuit
4-6. Charging control
4-7. Overall charging control
5. Case where different types of solar battery are used
<1. Overall Configuration of Electric Power Feeding System>

Figure 1:
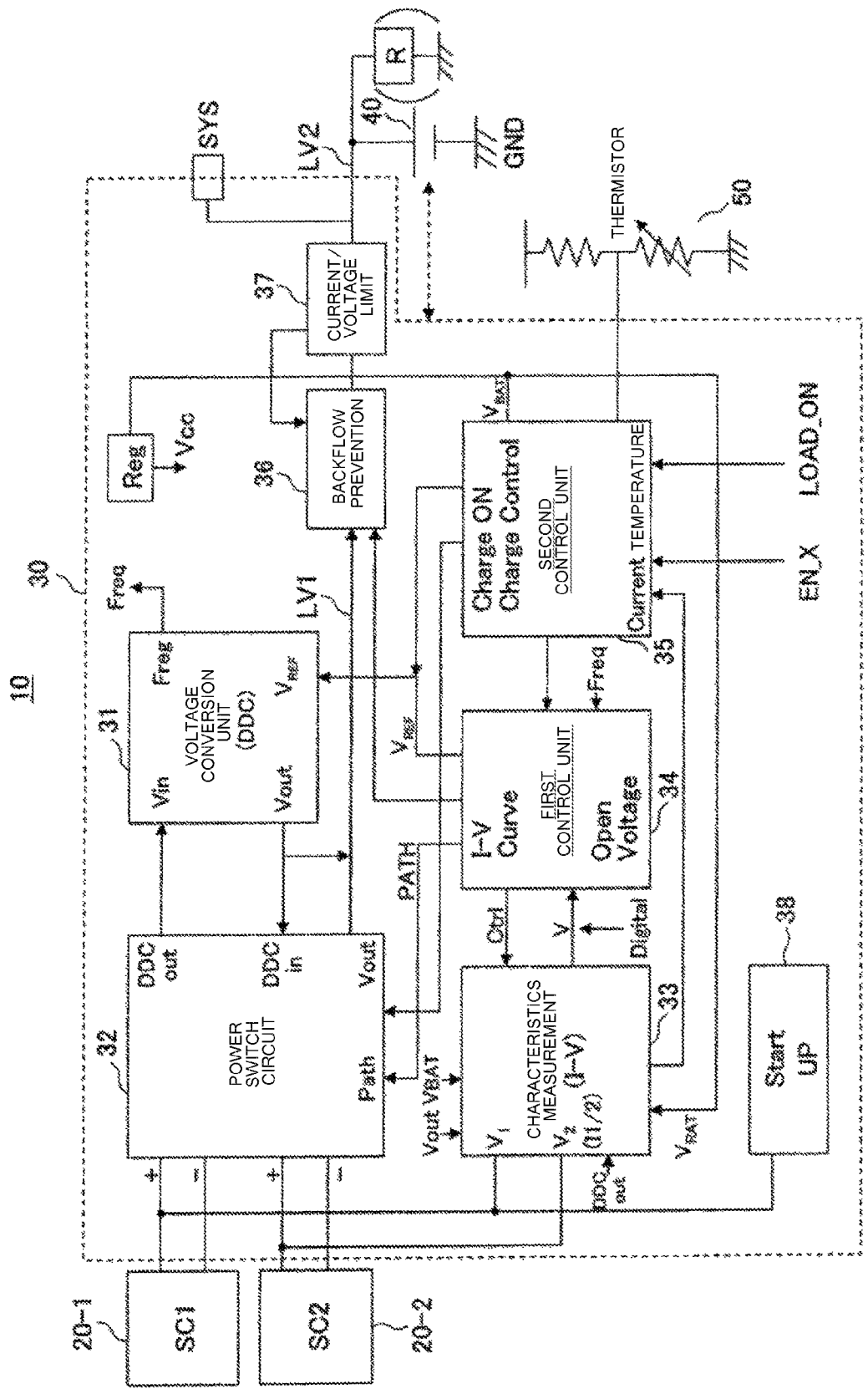
FIG. 1 is a diagram showing an example of an overall configuration of an electric power feeding system according to an embodiment of the present invention.

FIG. 1 shows an example of an overall configuration of an electric power feeding system according to an embodiment of the present invention.

The electric power feeding system 10 includes a plurality of generating elements 20-$n$ (n=2 in the present embodiment), an electric power control apparatus 30, and an electricity storage element 40 as major constituent elements.

The electric power feeding system 10 also includes a thermistor 50 connected to the electric power control apparatus 30.

The electric power feeding system 10 is configured to charge (store electricity in) the electricity storage element (battery) 40, which is a secondary battery, from the generating elements 20-1 (SC1) and 20-1 (SC2), such as solar batteries, not just under sun light but also under other everyday environments, such as in the shade, under indirect light, or inside a bright room.

Particularly, the electric power control apparatus 30 is formed as a charging control LSI for fully utilizing the electric power generated by the generating elements 20.

The electric power control apparatus 30 may be connected with a Li+ type (including polymer) secondary battery as the electricity storage element 40 and charge the secondary battery.

To the electric power control apparatus 30, one or a plurality of generating elements may be connected. According to the present embodiment, one or two generating elements 20-1 and 20-2 may be connected.

According to the present embodiment, the electric power control apparatus 30 may utilize an arbitrary number of cells connected in series, including a single cell.

The electric power control apparatus 30 may perform connection switching control concerning the mode of connection of the plurality of generating elements, such as whether the generating elements are to be connected in series or in parallel, depending on the output voltage value of the generating elements. The electric power control apparatus 30 may also perform switching control as to whether a voltage is to be stepped up or down by inputting the voltage to a voltage conversion unit such as a DC-DC converter.

The electric power control apparatus 30 may utilize various types of the generating elements 20 and is configured to exert control such that the maximum efficiency can be obtained regardless of the electric power-voltage characteristics of the generating elements 20.

The electric power control apparatus 30 may be charged with high efficiency by performing MPPT control whereby the maximum electric power operating point of the generating elements (solar batteries) 20 is tracked.

The electric power control apparatus 30 may perform the MPPT control even when the generating elements 20 include a single cell.

The electric power control apparatus 30 may control the start and end (full charge) of charging of the electricity storage element 40.

The electric power control apparatus 30 includes the function which terminates charging when a fixed or variable charging end voltage is reached, for example.

The electric power control apparatus 30 includes the function which starts charging when a fixed or variable charging start voltage is reached after charging is terminated, for example.

The electric power control apparatus 30 may control the maximum charging current at the time of high illuminance, for example, by using an external current control resistor. A current control threshold value in this case may be set by providing an external resistor for measuring the charging current that flows through the electricity storage element 40.

The electric power control apparatus 30 includes the function which decreases a loss of a forward-direction voltage VF while preventing backflow from the electricity storage element 40 to the generating elements 20 by a biopass control of a backflow prevention diode.

The electric power control apparatus 30 includes the function which decreases a loss due to difference in illuminance between the two generating elements 20-1 and 20-2, together with the prevention of backflow between the generating elements 20-1 and 20-2.

The electric power control apparatus 30 includes the function which outputs electric power from the generating elements 20 via load drive terminals after full charge detection detecting an open voltage of the electricity storage element 40 having reached a certain value.

The electric power control apparatus 30 may perform initial charging when the electricity storage element 40 is in an over-discharged state with its voltage not more than a predetermined voltage, such as not more than 2.7 V, until the voltage recovers. In this case, the electric power control apparatus 30 may be charged by decreasing (limiting) current by using an external current limit resistor.

The electric power control apparatus 30 includes the function which prevents charging at temperatures of 0° C. or lower or 60° C. or higher by using an externally connected thermistor, for example.

The electric power control apparatus 30 may control termination of charging and transition of charging to a sleep mode by using an external enable terminal, for example.

The electric power control apparatus 30 may be configured to output electric power information.

In the following, concrete configurations and functions of various components will be described by way of example.

In the following, after the configuration and function of the generating elements 20 and the electricity storage element 40 are described, a concrete configuration and function of the electric power control apparatus 30 will be described.

<2. Configuration Example of Generating Element>

The generating elements 20-1 and 20-2 have the function which generates electricity by using natural energy, such as sunlight or wind power, and supplies the generated electric power to the electric power control apparatus 30.

According to the present embodiment, as the generating elements 20-1 and 20-2, solar power generation panels that utilize photoelectric conversion of sunlight, such as solar potential, are adopted.

Figure 2:
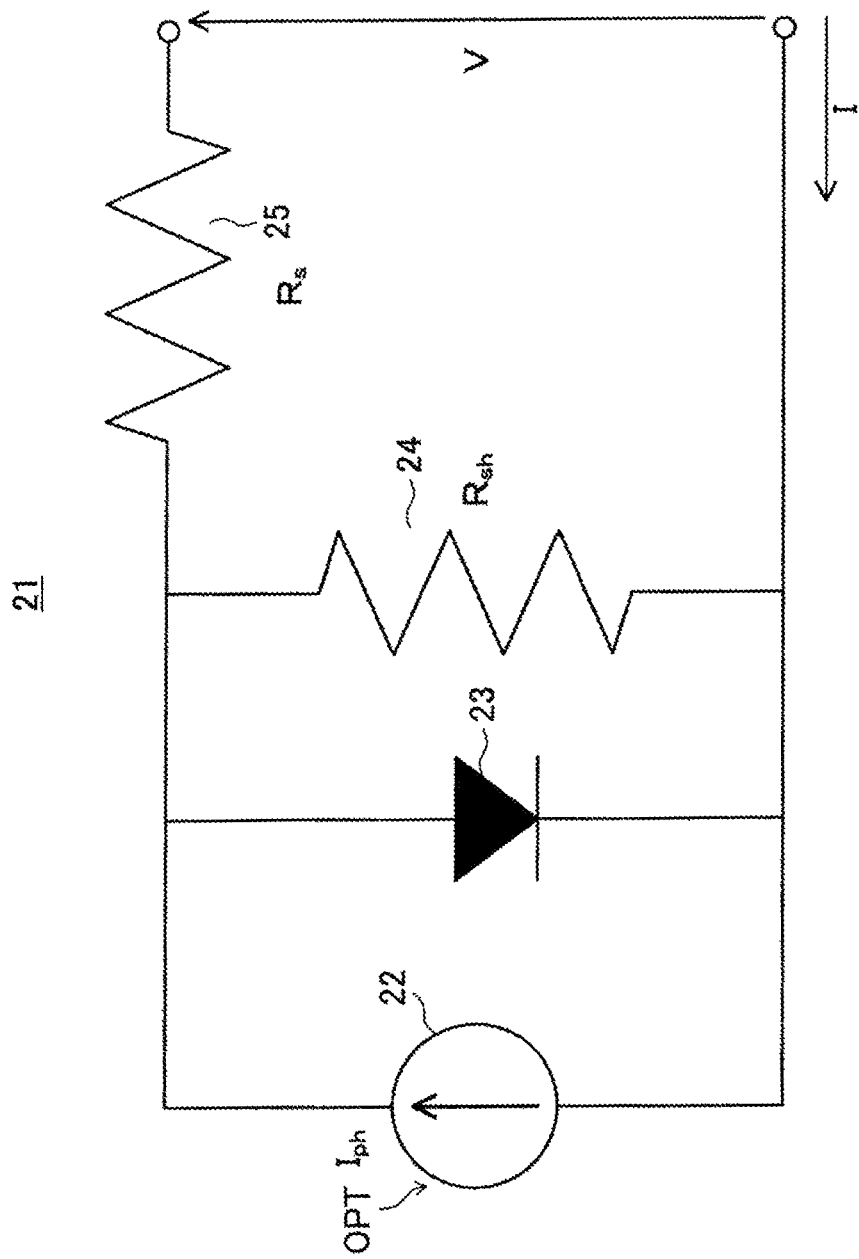
FIG. 2 is a diagram showing an equivalent circuit of a solar power generation panel as a generating element according to the present embodiment.

FIG. 2 shows an equivalent circuit of a solar power generation panel as the generating elements according to the present embodiment.

The solar power generation panel (solar battery) 21, as shown in the equivalent circuit of FIG. 2, produces a current on the basis of light input.

In FIG. 2, the light input OPT is substituted by electromotive force ($I_{ph}$) to indicate current Ish.

Further, in FIG. 2, a sum of resistance of a substrate, a light receiving layer, and an electrode portion of the solar battery 21 is indicated by series resistance Rs, and the loss resistance of the solar battery 21 is indicated by Rsh.

In FIG. 2, an output current of the solar battery 21 is indicated by Id, and an output voltage of the solar battery 21 is indicated by V.

The solar battery 21 produces more current as the amount of incident light increases and less current when it is darker. In the equivalent circuit of FIG. 2, the brightness of light is indicated by the magnitude of the current source. As the voltage increases, the current gradually decreases.

The equivalent circuit has the configuration such that a current source 22, a diode 23, and a resistor 24 are connected in parallel, and a resistor 25 is connected in series.

The current source 22 supplies an optical current $I_{ph}$, and the diode 123 is an ideal diode. When the voltage V across the terminals of the solar battery 21 is increased, the current $I_{ph}$ from the current source 22 flows through the diode 23, so that the current I that flows on the terminal side decreases as the voltage V increases.

Figure 3:
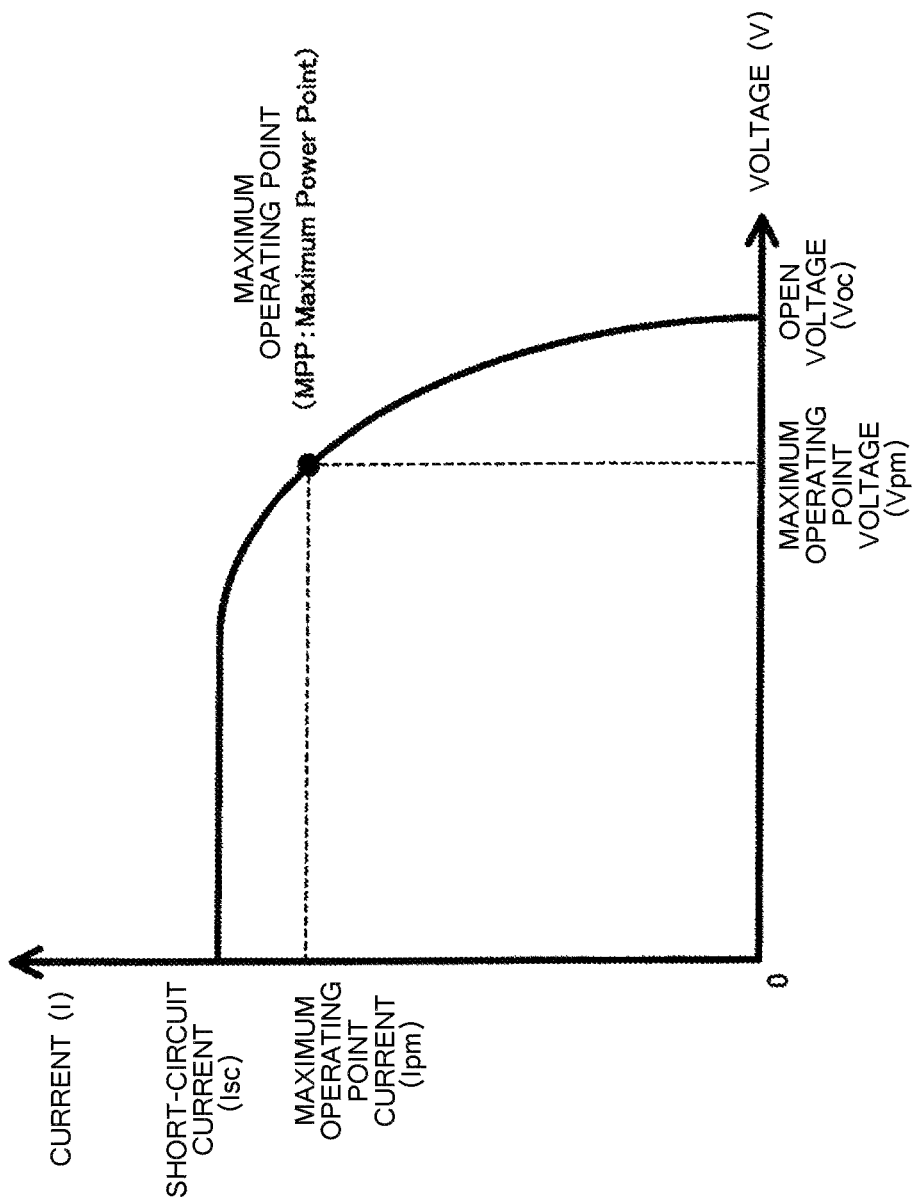
FIG. 3 is a diagram showing current-voltage characteristics of a general solar battery.

FIG. 3 shows the current-voltage characteristics of a general solar battery.

The output current value of the solar battery 21 is uniquely determined when the voltage value across the terminals is determined.

The voltage across the terminals when the current value is zero is referred to as an open voltage (Voc), while the output current value when the voltage value across the terminals is zero is referred to as a short-circuit current (Isc).

As described above, in the current-voltage characteristics curve of the solar battery, there is only one maximum operating point where the electric power (=voltage×voltage) is at the maximum.

The current at the maximum operating point is referred to as a maximum operating point current (Ipm). The voltage at the maximum operating point is referred to as a maximum operating point voltage (Vpm).

Because of such characteristics of the solar battery, in order to obtain the maximum output from the solar battery, the voltage of a load connected to the solar battery needs to be matched with the maximum operating point voltage of the solar battery.

Because the current-voltage characteristics of the solar battery vary depending on the environment, such as illuminance or temperature, the control for obtaining the maximum operating point voltage needs to be performed during operation of the device connected to the solar battery.

According to the present embodiment, various controls are performed in the electric power control apparatus 30, for example, a control concerning the mode of connection of a plurality of the generating elements 20-1 and 20-2, i.e., whether they are connected in series or parallel, depending on the output voltage values of the generating elements, and a switching control for determining whether a voltage is to be stepped up or down by inputting the voltage to a voltage conversion unit such as a DC-DC converter.

The electric power obtained by the solar battery 21 is a direct current, and the direct-current electric power (DC electric power) is supplied to the electric power control apparatus 30.

<3. Configuration Example of Electricity Storage Element>

The electricity storage element 40 stores the electric power supplied from the electric power control apparatus 30.

The electricity storage element 40 may be of a type with a charging voltage variable, such as an electric double layer capacitor or a lithium-ion type secondary battery.

Figure 4:
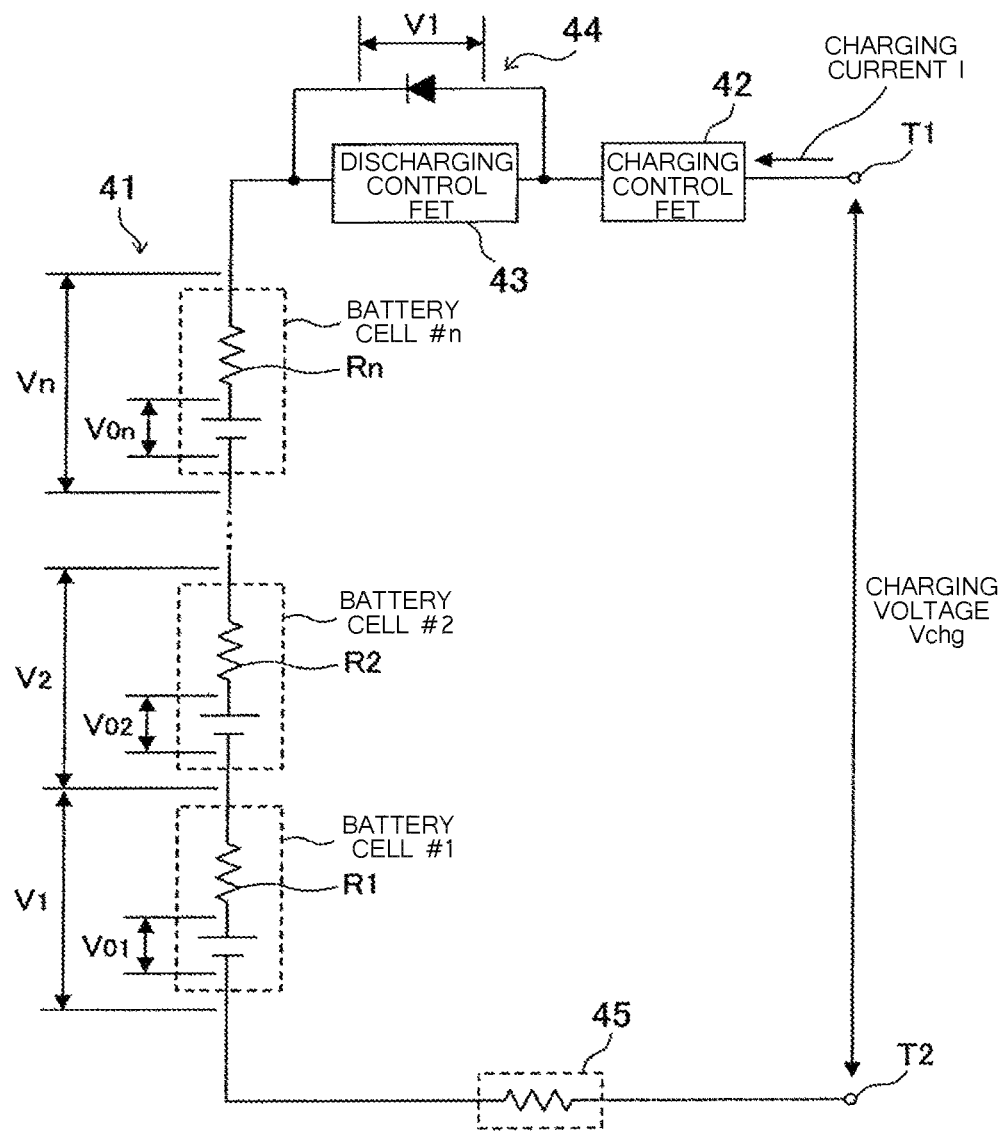
FIG. 4 is a diagram showing a configuration example of an electricity storage element according to the present embodiment.

FIG. 4 shows a configuration example of the electricity storage element according to the present embodiment.

The electricity storage element 40 shown in FIG. 4 includes an assembled battery 41, a charging control field effect transistor (FET) 42, a discharging control FET 43, a diode 44, and a current detecting resistor 45.

The electricity storage element 40 has a positive electrode terminal T1 and a negative electrode terminal T2 connected to a positive electrode terminal and a negative electrode terminal, respectively, of an electronic device as a load.

In the electricity storage element 40, under the control of the electric power control apparatus 30, the assembled battery 41 is charged or discharged via the charging control FET 42, the discharging control FET 43, the diode 445, and the current detecting resistor 45.

The assembled battery 41 is a secondary battery such as a lithium-ion secondary battery, and includes a plurality of battery cells connected in series and/or parallel.

In the example of FIG. 4, three battery cells are connected in series.

According to the present embodiment, the electric power control apparatus 30 performs a control for preventing over-charging or over-discharging of the electricity storage element 40, and a control for ensuring safe charging, for example.

In the electricity storage element 40, the voltage of the assembled battery 41 and the voltage of each of the battery cells in the assembled battery 41 are measured at predetermined time intervals, and the magnitude and direction of the current that flows through the current detecting resistor 45 are measured at predetermined time intervals.

In the electricity storage element 40, on the basis of the measured voltage value and current value, the charging control FET 42 is controlled to be off when the voltage of any of the cells of the assembled battery 41 reaches an over-charging detection voltage.

In the electricity storage element 40, the discharging control FET 43 is controlled to be off when the voltage of the assembled battery 41 becomes equal to or less than an over-discharging detection voltage, thereby preventing over-charging or over-discharging.

In the case of a lithium-ion battery, the over-charging detection voltage may be determined to be 4.2 V±0.5 V, and the over-discharging detection voltage may be determined to be 2.4 V±0.1 V.

Generally, as a system for charging the assembled battery 41, the CCCV (Constant Current, Constant Voltage) charging system is used.

In the CCCV charging system, charging is conducted with a constant current (CC charging) until the voltage of the assembled battery 41 reaches a predetermined voltage. After the voltage of the assembled battery 41 has reached the predetermined voltage, charging is conducted with a constant voltage (CV charging). Charging ends when the charging current converges to substantially zero [A].

<4. Configuration Example of Electric Power Control Apparatus>

As shown in FIG. 1, the electric power control apparatus 30 includes a voltage conversion unit 31 and a power switch circuit 32 as an electric power path switch unit included in an electric power path unit.

The electric power control apparatus 30 includes a characteristics measurement circuit 33, a first control unit 34, a second control unit 35, a backflow prevention circuit 36, a current/voltage limit circuit 37, and a start-up circuit 38 as major constituent elements.

The voltage conversion unit 31 includes the function which steps up or down voltages generated by the generating elements 20-1 and 20-2 and selectively supplied by the power switch circuit 32.

The voltage conversion unit 31 supplies a voltage obtained by stepping up or down to the electricity storage element 40 via the power switch circuit 32 and the backflow prevention circuit 36, for example.

The voltage conversion unit 31 is constructed of a DC-DC converter, for example.

A concrete configuration of the voltage conversion unit 31 will be described in detail later.

<4-1. Configuration Example of Power Switch Circuit>

The power switch circuit 32 includes the function which determines the connection relationship among the two generating elements (solar batteries) 20-1 and 20-2, the voltage conversion unit (step-up/down circuit) 31, and the electricity storage element (secondary battery) 40 in accordance with control exerted by the first control unit 34 or the second control unit 35.

The power switch circuit 32 is configured to be capable of performing electric power path switching control depending on an output state of the generating elements 20-1 and 20-2.

Specifically, the power switch circuit 32 functions as an electric power path switch unit.

The power switch circuit 32 according to the present embodiment includes a first connection switching function which switches between series connection and parallel connection for the two generating elements 20-1 and 20-2 in accordance with the control by the first control unit 34 or the second control unit 35.

The power switch circuit 32 further includes a second connection switching function which switches the generating elements 20-1 and 20-2 connected to the input side of the voltage conversion unit 31.

The power switch circuit 32 according to the present embodiment is basically configured to be capable of performing at least the following connection switching by the first connection switching function and the second connection switching function.

[Switching Control for Series; Parallel and Step-Up; Parallel; Series and Step-Up; and Parallel and Step-Down]

The power switch circuit 32 connects the generating elements 20-1 and 20-2 in series and outputs an output voltage from the generating elements 20-1 and 20-2 as is without inputting it to the voltage conversion unit 31.

Alternatively, the power switch circuit 32 connects the generating elements 20-1 and 20-2 in parallel or in series and inputs an output voltage to the voltage conversion unit 31 so that the voltage can be stepped-up or stepped-down for output.

Alternatively, the generating elements 20-1 and 20-2 are connected in parallel and an output voltage is output as is without inputting it to the voltage conversion unit 31.

(Parallel)

When the output voltages of the generating elements 20-1 and 20-2 are in a first voltage range V1, the power switch circuit 32 connects the generating elements 20-1 and 20-2 in parallel by the first connection switching function.

In this case, the power switch circuit 32 performs the connection switching such that the generated electric power is not input to the voltage conversion unit 31 by the second connection switching function so as to prevent conversion of the voltage level of either of the output voltages of the generating elements 20-1 and 20-2 by the voltage conversion unit 31.

(Parallel and Step-Up)

The power switch circuit 32 connects the generating elements 20-1 and 20-2 in parallel by the first connection switching function when the output voltages of the generating elements 20-1 and 20-2 are in a second voltage range V2 (<V1).

In this case, the power switch circuit 32 performs the connection switching such that the generated electric power is input to the voltage conversion unit 31 by the second connection switching function so as to allow the voltage level of a final-stage output voltage of the generating elements 20-1 and 20-2 to be converted by the voltage conversion unit 31.

(Series)

The power switch circuit 32 connects the generating elements 20-1 and 20-2 in series by the first connection switching function when the output voltages of the generating elements 20-1 and 20-2 are in a third voltage range V3 (<V2<V1).

In this case, the power switch circuit 32 performs the connection switching such that the generated electric power is not input to the voltage conversion unit 31 by the second connection switching function so as to prevent conversion of the voltage level of either of the output voltages of the generating elements 20-1 and 20-2 by the voltage conversion unit 31.

(Series and Step-Up)

The power switch circuit 32 connects the generating elements 20-1 and 20-2 in series by the first connection switching function when the output voltages of the generating elements 20-1 and 20-2 are in a fourth voltage range V4 (<V3<V2<V1).

In this case, the power switch circuit 32 performs the connection switching such that the generated electric power is input to the voltage conversion unit 31 by the second connection switching function so as to allow the voltage level of the final-stage output voltage of the generating elements 20-1 and 20-2 to be converted by the voltage conversion unit 31.

(Parallel and Step-Down)

The power switch circuit 32 connects the generating elements 20-1 and 20-2 in parallel by the first connection switching function when the output voltages of the generating elements 20-1 and 20-2 are in a fifth voltage range V5 (>V1>V2>V3>V4).

In this case, the power switch circuit 32 performs the connection switching such that the generated electric power is input to the voltage conversion unit 31 by the second connection switching function so as to allow the voltage level of the final-stage output voltage of the generating elements 20-1 and 20-2 to be converted by the voltage conversion unit 31.

In the above switching controls, the following relationship holds: [(output voltage of generating elements in the case of series and step-up)<(output voltage in the case of series)<(output voltage in the case of parallel and step-up)<(output voltage in the case of parallel)<(output voltage in the case of parallel and step-down)].

[Switching Control for Series; Series and Step-Down; Parallel; Series and Step-Up; and Parallel and Step-Down]

The power switch circuit 32 connects the generating elements 20-1 and 20-2 in series and outputs an output voltage as is without inputting it to the voltage conversion unit 31.

Alternatively, the power switch circuit 32 connects the generating elements 20-1 and 20-2 in series or in parallel and inputs an output voltage to the voltage conversion unit 31 so that the voltage can be stepped-down or stepped-up for output.

Alternatively, the generating elements 20-1 and 20-2 are connected in parallel and an output voltage is output as is without inputting it to the voltage conversion unit 31.

(Parallel)

The power switch circuit 32 connects the generating elements 20-1 and 20-2 in parallel by the first connection switching function when the output voltages of the generating elements 20-1 and 20-2 are in a sixth voltage range V6.

In this case, the power switch circuit 32 performs the connection switching such that the generated electric power is not input to the voltage conversion unit 31 by the second connection switching function so as to prevent conversion of the voltage level of either of the output voltages of the generating elements 20-1 and 20-2 by the voltage conversion unit 31.

(Series and Step-Down)

The power switch circuit 32 connects the generating elements 20-1 and 20-2 in series by the first connection switching function when the output voltages of the generating elements 20-1 and 20-2 are in a seventh voltage range V7 (<V6).

In this case, the power switch circuit 32 performs the connection switching such that the generated electric power is input to the voltage conversion unit 31 by the second connection switching function so as to allow the voltage level of the final-stage output voltage of the generating elements 20-1 and 20-2 to be converted by the voltage conversion unit 31.

(Series)

The power switch circuit 32 connects the generating elements 20-1 and 20-2 in series by the first connection switching function when the output voltages of the generating elements 20-1 and 20-2 are in an eighth voltage range V8 (<V7<V6).

In this case, the power switch circuit 32 performs the connection switching such that the generated electric power is not input to the voltage conversion unit 31 by the second connection switching function so as to prevent conversion of the voltage level of either of the output voltages of the generating elements 20-1 and 20-2 by the voltage conversion unit 31.

(Series and Step-Up)

The power switch circuit 32 connects the generating elements 20-1 and 20-2 in series by the first connection switching function when the output voltages of the generating elements 20-1 and 20-2 are in a ninth voltage range V9 (<V8<V7<V6).

In this case, the power switch circuit 32 performs the connection switching such that the generated electric power is input to the voltage conversion unit 31 by the second connection switching function so as to allow the voltage level of the final-stage output voltage of the generating elements 20-1 and 20-2 to be converted by the voltage conversion unit 31.

(Parallel and Step-Down)

The power switch circuit 32 connects the generating elements 20-1 and 20-2 in parallel by the first connection switching function when the output voltages of the generating elements 20-1 and 20-2 are in a tenth voltage range V10 (>V6>V7>V8>V9).

In this case, the power switch circuit 32 performs the connection switching such that the generated electric power is input to the voltage conversion unit 31 by the second connection switching function so as to allow the voltage level of the final-stage output voltage of the generating elements 20-1 and 20-2 to be converted by the voltage conversion unit 31.

In the above switching controls, the following relationship holds: [(output voltage of generating elements in the case of series and step-up)<(output voltage in the case of series)<(output voltage in the case of series and step-down)<(output voltage in the case of parallel)<(output voltage in the case of parallel and step-down)].

<4-1-1 Concrete Configuration Example of Power Switch Circuit>

Figure 5:
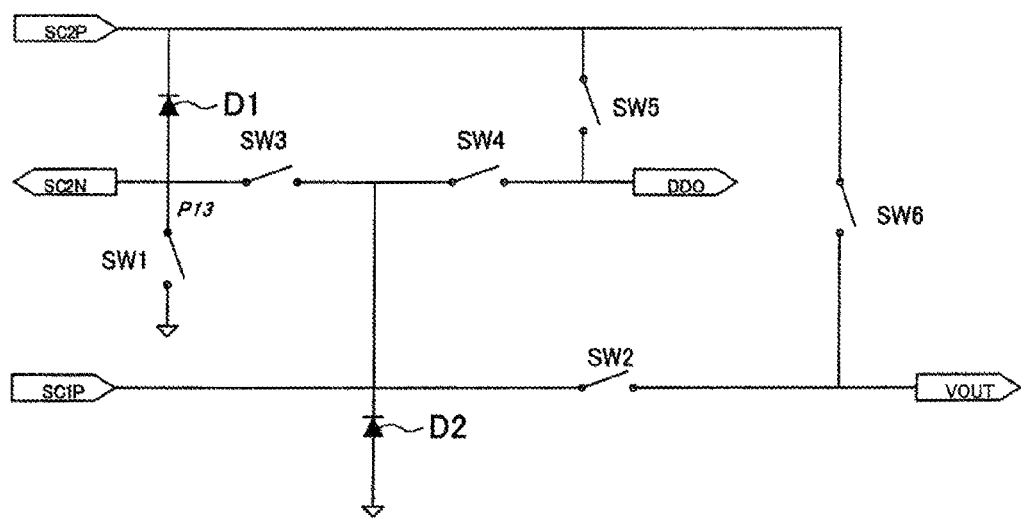
FIG. 5 is a diagram showing a configuration example of a power switch circuit according to the present embodiment.

FIG. 5 shows a configuration example of the power switch circuit according to the present embodiment.

The power switch circuit 32 shown in FIG. 5 includes six switches SW1 to SW6 and two diodes D1 and D2.

Each of the switches SW1 to SW6 is constructed of an insulated gate field effect transistor (FET), more specifically a MOSFET.

The power switch circuit 32 determines the connection relationship of the maximum two generating elements (solar batteries SC1 and SC2) 20-1 and 20-2, the voltage conversion unit (step-up/down circuit) 31, and the electricity storage element (BAT) 40, which is a secondary battery, by controlling the gate voltage to the switches SW1 to SW6.

In the electric power path formed by the power switch circuit 32 of FIG. 5 from the generating elements 20-1 and 20-2 to the electricity storage element 40, patterns shown in FIGS. 6 and 7 exist.

A path PTA is formed as a path directly connecting the generating element (SC2) 20-2 and the electricity storage element 40, i.e., the secondary battery.

A path PTB is formed as a path supplying the output electric power from the generating element (SC2) 20-2 to the electricity storage element 40, i.e., the secondary battery, via the voltage conversion unit (step-up/down circuit) 31.

A path PTC is formed as a path directly connecting the generating element (SC1) 20-1 and the electricity storage element 40, i.e., the secondary battery.

A path PTD is formed as a path supplying the output electric power from the generating element (SC1) 20-1 to the electricity storage element 40, i.e., the secondary battery, via the voltage conversion unit (step-up/down circuit) 31.

A path PTE is formed as a path connecting the generating element (SC1) 20-1 and the generating element (SC2) 20-2 in series and directly connecting the electricity storage element 40, i.e., the secondary battery, to the series connection.

A path PTF is formed as a path supplying the output voltage of the generating element (SC1) 20-1 and the generating element (SC2) 20-2 connected in series to the electricity storage element 40, i.e., the secondary battery, via the voltage conversion unit (step-up/down circuit) 31.

A path PTG is formed as a path directly supplying the output electric power from the generating element (SC1) 20-1 and the generating element (SC2) 20-2 connected in parallel to the electricity storage element 40, i.e., the secondary battery, without passing it through the voltage conversion unit 31.

A path PTH is formed as a path supplying the output electric power from the generating element (SC1) 20-1 and the generating element (SC2) 20-2 connected in parallel to the electricity storage element 40, i.e., the secondary battery, via the voltage conversion unit (step-up/down circuit) 31.

A path PTI is formed as a path supplying the output from the generating element (SC1) to the voltage conversion unit (step-up/down circuit) 31, connecting the output from the generating element (SC2) 20-2 in parallel, and supplying the output electric power from the parallel connection to the electricity storage element 40, i.e., the secondary battery.

A path PTJ is formed as a path supplying the output from the generating element (SC2) 20-2 to the voltage conversion unit (step-up/down circuit) 31, connecting the output from the generating element (SC1) 20-1 in parallel, and supplying the output voltage from the parallel connection to the electricity storage element 40, i.e., the secondary battery.

A path PTK is formed as a path opening all the generating element (SC1) 20-1, the generating element (SC2) 20-2, and the electricity storage element 40. At this time, the minus side of the generating element (SC2) 20-2 is grounded and used as a path for measuring the open voltage of the generating element (solar battery).

A path PTL is formed as a path opening all the generating element (SC1) 20-1, the generating element (SC2) 20-2, and the electricity storage element 40. At this time, all of the switches SW1 to SW6 are in off-state. The minus side of the generating element (SC2) is in open-state.

FIG. 8 shows the gate voltage of each of the switches for controlling the electric power path of the power switch circuit according to the present embodiment in the form of a truth table.

FIGS. 9 to 20 show the flow of electric power through the electric power paths PTA to PTL selectively formed by the power switch circuit according to the present embodiment.

(Path PTA)

Figure 9:
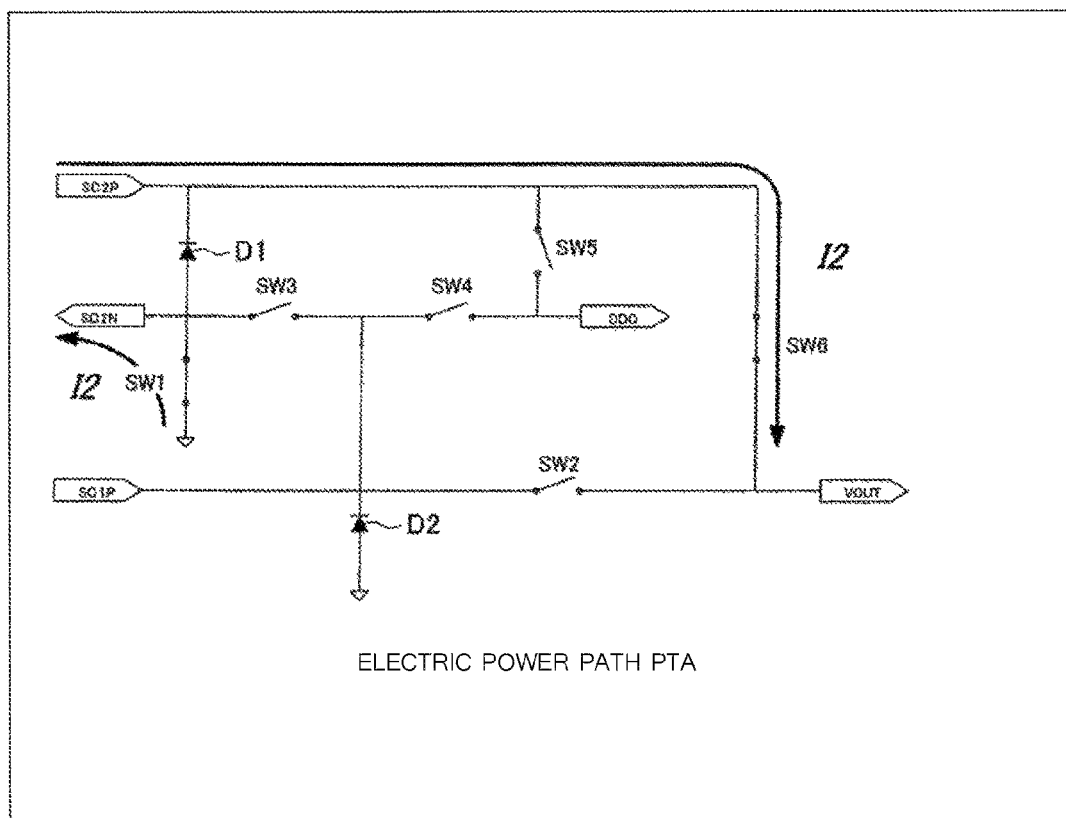
FIG. 9 is a diagram showing the flow of electric power through an electric power path PTA selectively formed by the power switch circuit according to the present embodiment.

FIG. 9 shows the flow of electric power through the electric power path PTA selectively formed by the power switch circuit according to the present embodiment.

When the path PTA is selected, the switches SW1 and SW6 are controlled to be on while the switches SW2 to SW5 are controlled to be off, so that the electromotive force (current I2) from the generating element (SC2) 2 is output to an output terminal VOUT toward the electricity storage element 40, i.e., the secondary battery.

(Path PTB)

Figure 10:
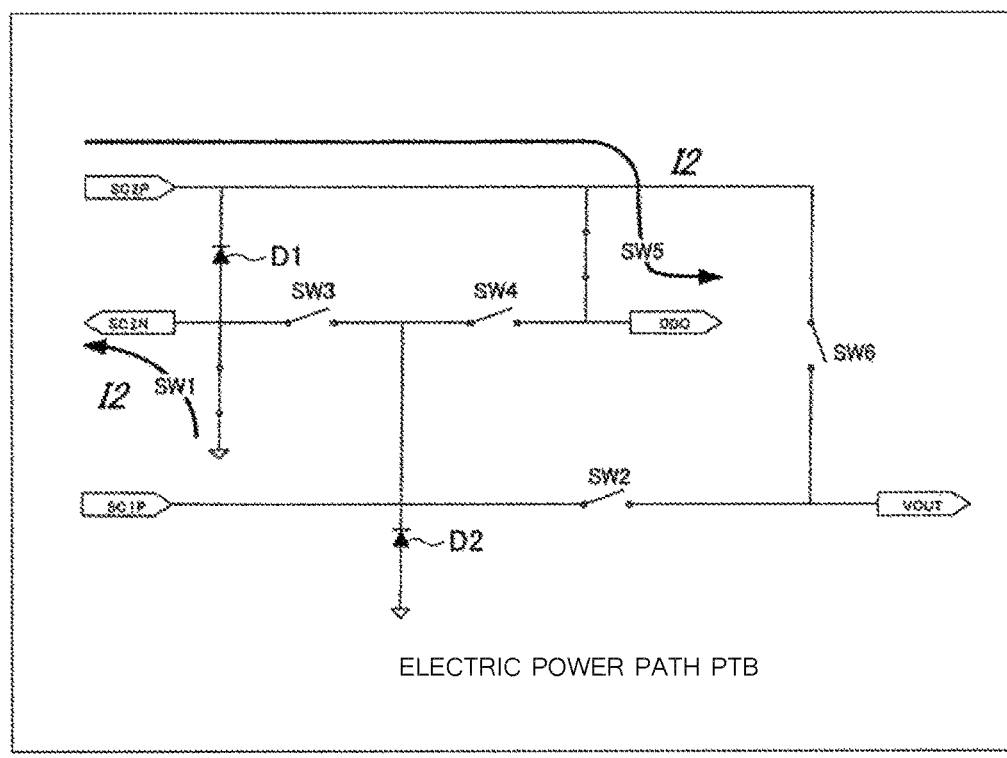
FIG. 10 is a diagram showing the flow of electric power through an electric power path PTB selectively formed by the power switch circuit according to the present embodiment.

FIG. 10 shows the flow of electric power through the electric power path PTB selectively formed by the power switch circuit according to the present embodiment.

When the path PTB is selected, the switches SW1 and SW5 are controlled to be on while the switches SW2 to SW4 and SW6 are controlled to be off, so that the electromotive force (current I2) from the generating element (SC2) is output to an output terminal DDO toward the voltage conversion unit (step-up/down circuit) 31.

(Path PTC)

Figure 11:
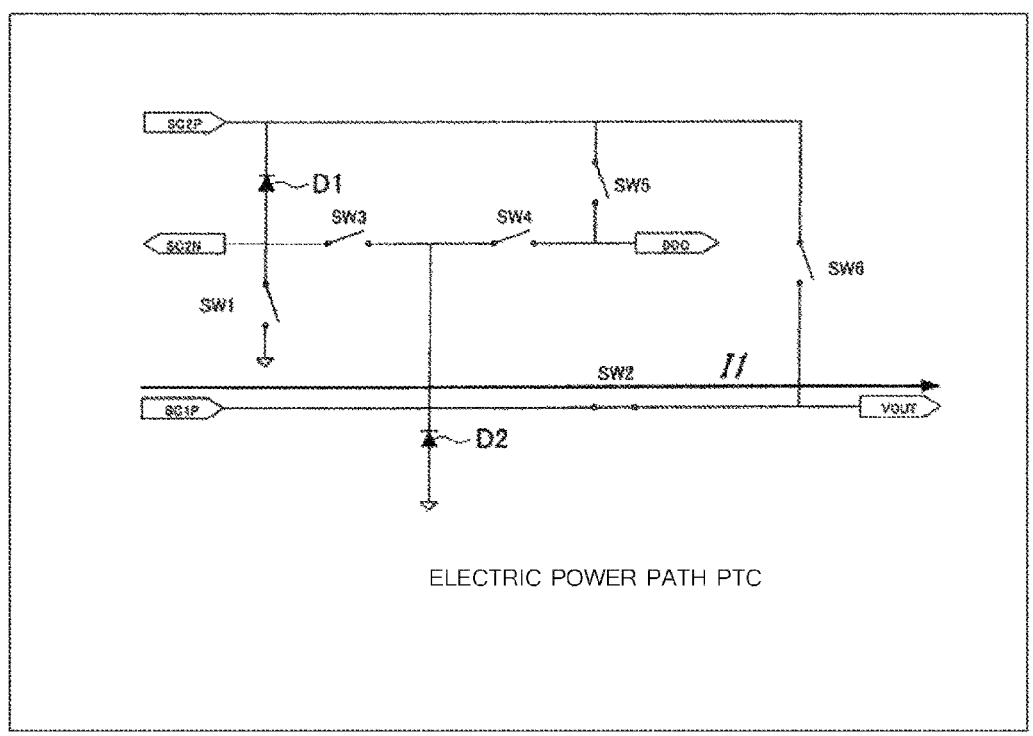
FIG. 11 is a diagram showing the flow of electric power through an electric power path PTC selectively formed by the power switch circuit according to the present embodiment.

FIG. 11 shows the flow of electric power through the electric power path PTC selectively formed by the power switch circuit according to the present embodiment.

When the path PTC is selected, the switch SW2 is controlled to be on while the switches SW1, and SW3 to SW6 are controlled to be off, so that the electromotive force (current I1) from the generating element (SC1) 20-1 is output to the output terminal VOUT toward the electricity storage element 40, i.e., the secondary battery.

(Path PTD)

Figure 12:
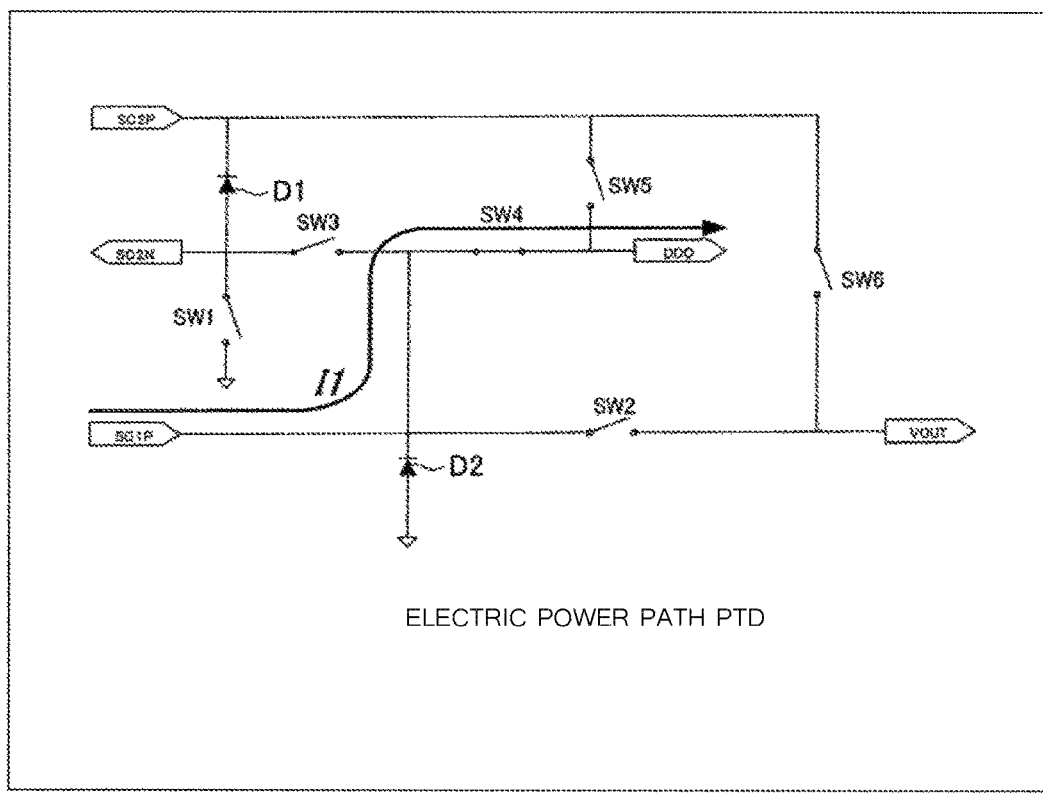
FIG. 12 is a diagram showing the flow of electric power through an electric power path PTD selectively formed by the power switch circuit according to the present embodiment.

FIG. 12 shows the flow of electric power through the electric power path PTD selectively formed by the power switch circuit according to the present embodiment.

When the path PTD is selected, the switch SW4 is controlled to be on and the switches SW1 to SW3, SW5, and SW6 are controlled to be on, so that the electromotive force (current I1) from the generating element (SC1) 20-1 is output to the output terminal DDO toward the voltage conversion unit (step-up/down circuit) 31.

(Path PTE)

Figure 13:
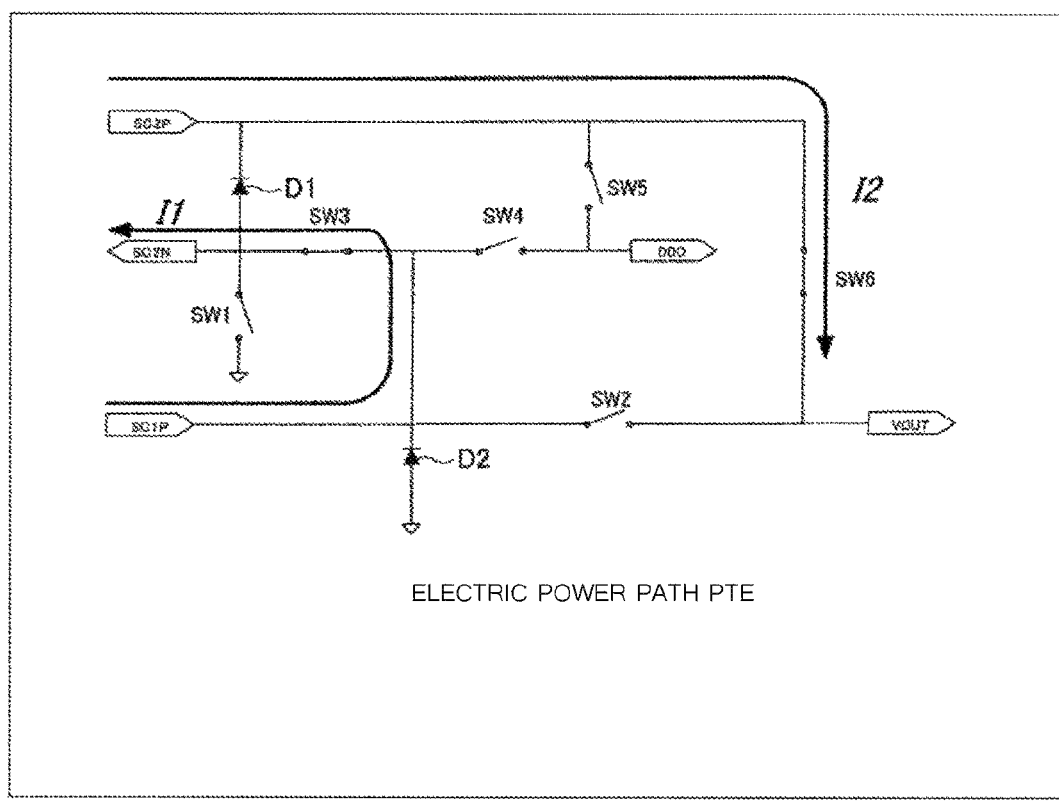
FIG. 13 is a diagram showing the flow of electric power through an electric power path PTE selectively formed by the power switch circuit according to the present embodiment.

FIG. 13 shows the flow of electric power through the electric power path PTE selectively formed by the power switch circuit according to the present embodiment.

When the path PTE is selected, the switches SW3 and SW6 are controlled to be on while the switches SW1, SW2, SW4, and SW5 are controlled to be off.

Thus, the electromotive force (current I1) from the generating element (SC1) 20-1 and the electromotive force (current I2) from the generating element (SC2) 20-2 are output in series to the output terminal VOUT toward the electricity storage element 40, i.e., the secondary battery.

Because the two generating elements 20-1 and 20-2 are connected in series, I1=I2=Iout (output current to VOUT).

(Path PTF)

Figure 14:
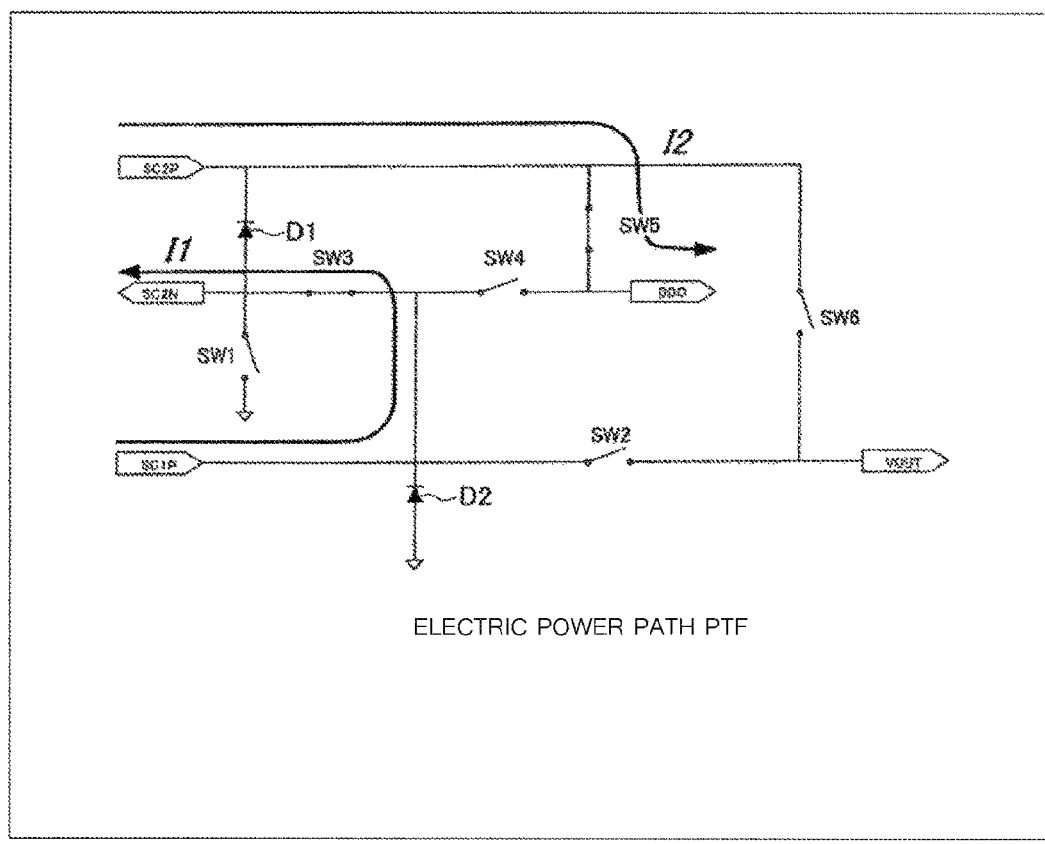
FIG. 14 is a diagram showing the flow of electric power through an electric power path PTF selectively formed by the power switch circuit according to the present embodiment.

FIG. 14 shows the flow of electric power through the electric power path PTF selectively formed by the power switch circuit according to the present embodiment.

When the path PRF is selected, the switches SW3 and SW5 are controlled to be on while the switches SW1, SW2, SW4, and SW6 are controlled to be off.

Thus, the electromotive force (current I1) from the generating element (SC1) 20-1 and the electromotive force (current I2) from the generating element (SC2) 20-2 are output in series to the output terminal DDO toward the voltage conversion unit (step-up/down circuit) 31.

Because the two generating elements 20-1 and 20-2 are connected in series, I1=I2=Iddo (output current to DDO).

(Path PTG)

Figure 15:
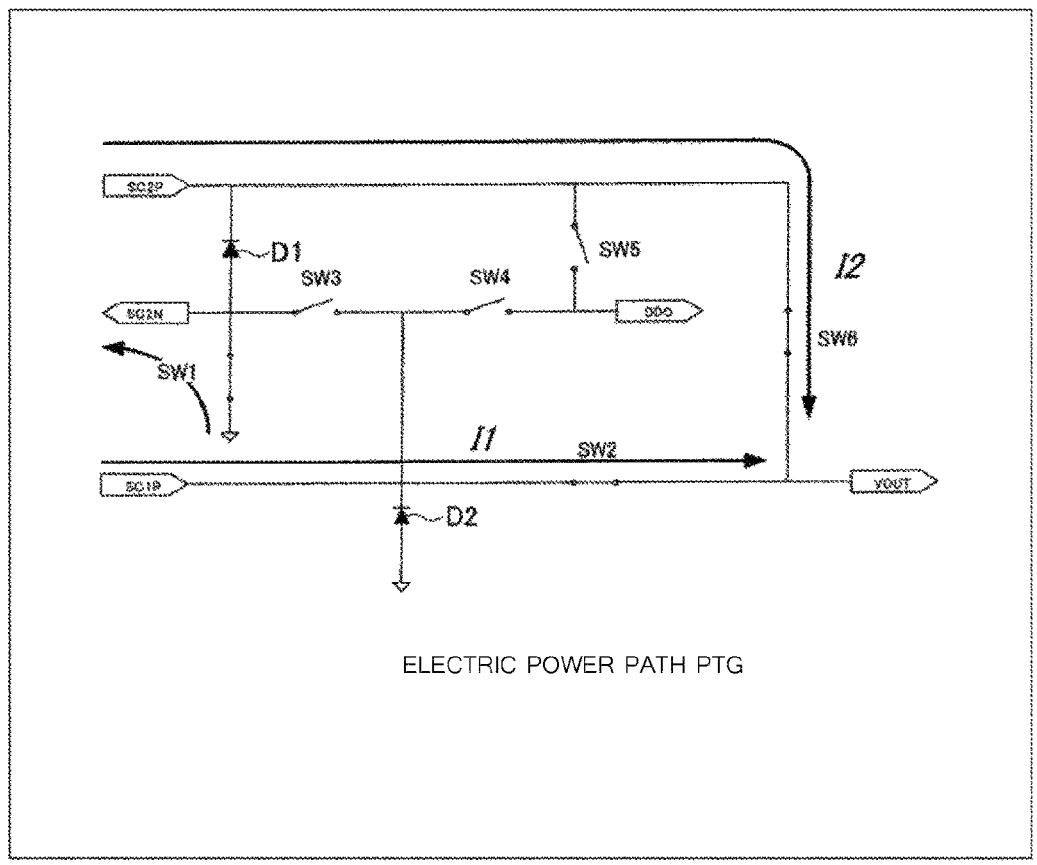
FIG. 15 is a diagram showing the flow of electric power through an electric power path PTG selectively formed by the power switch circuit according to the present embodiment.

FIG. 15 shows the flow of electric power through the electric power path PTG selectively formed by the power switch circuit according to the present embodiment.

When the path PTG is selected, the switches SW1, SW2, and SW6 are controlled to be on while the switches SW3 to SW5 are controlled to be off.

Thus, the electromotive force (current I1) from the generating element (SC1) 20-1 and the electromotive force (current I2) from the generating element (SC2) 20-2 are output in parallel to the output terminal VOUT toward the electricity storage element 40, i.e., the secondary battery.

Because the two generating elements 20-1 and 20-2 are connected in parallel, I1+I2=Iout (output current to VOUT).

(Path PTH)

Figure 16:
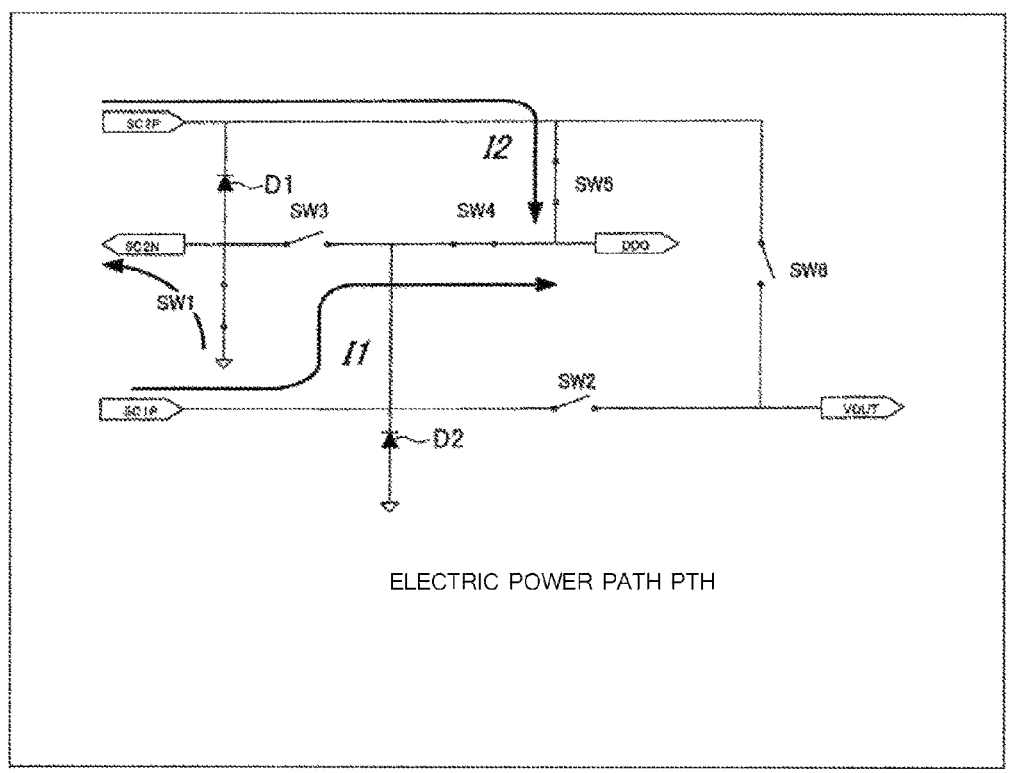
FIG. 16 is a diagram showing the flow of electric power through an electric power path PTH selectively formed by the power switch circuit according to the present embodiment.

FIG. 16 shows the flow of electric power through the electric power path PTH selectively formed by the power switch circuit according to the present embodiment.

When the path PTH is selected, the switches SW4 and SW5 are controlled to be on while the switches SW1 to SW4 and SW6 are controlled to be off.

Thus, the electromotive force (current I1) from the generating element (SC1) 20-1 and the electromotive force (current I2) from the generating element (SC2) 20-2 are output in parallel to the output terminal DDO toward the voltage conversion unit (step-up/down circuit) 31.

Because the two generating elements 20-1 and 20-2 are connected in parallel, I1+I2=Iddo (output current to DDO).

(Path PTI)

Figure 17:
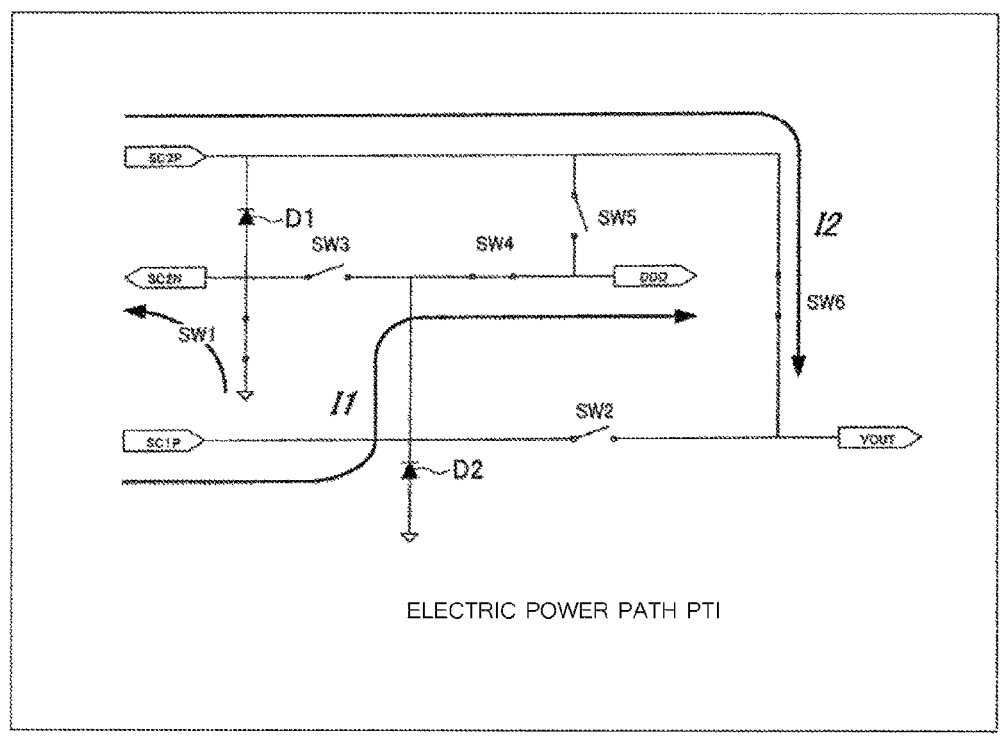
FIG. 17 is a diagram showing the flow of electric power through an electric power path PTI selectively formed by the power switch circuit according to the present embodiment.

FIG. 17 shows the flow of electric power through the electric power path PTI selectively formed by the power switch circuit according to the present embodiment.

When the path PTI is selected, the switches SW1 and SW6 are controlled to be on while the switches SW2 to SW5 are controlled to be off.

Thus, the electromotive force (current I1) from the generating element (SC1) 20-1 is output to the output terminal DDO toward the voltage conversion unit (step-up/down circuit) 31. The electromotive force (current I2) from the generating element (SC2) 20-2 is output to the output terminal VOUT toward the electricity storage element 40, i.e., the secondary battery.

(Path PTJ)

Figure 18:
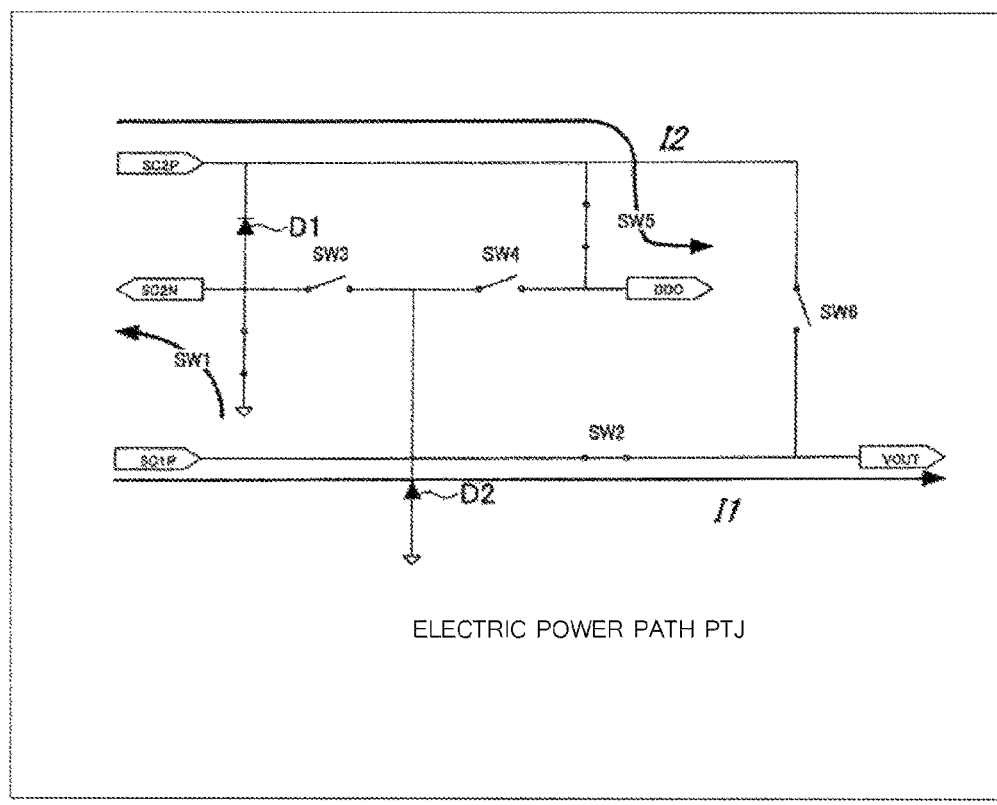
FIG. 18 is a diagram showing the flow of electric power through an electric power path PTJ selectively formed by the power switch circuit according to the present embodiment.

FIG. 18 shows the flow of electric power through the electric power path PTJ selectively formed by the power switch circuit according to the present embodiment.

When the path PTJ is selected, the switches SW1, SW2, and SW5 are controlled to be on while the switches SW3, SW4, and SW6 are controlled to be off.

Thus, the electromotive force (current I1) from the generating element (SC1) 20-1 is output to the output terminal VOUT toward the electricity storage element 40, i.e., the secondary battery. The electromotive force (current I2) from the generating element (SC2) 20-2 is output to the output terminal DDO toward the voltage conversion unit (step-up/down circuit) 31.

(Path PTK)

Figure 19:
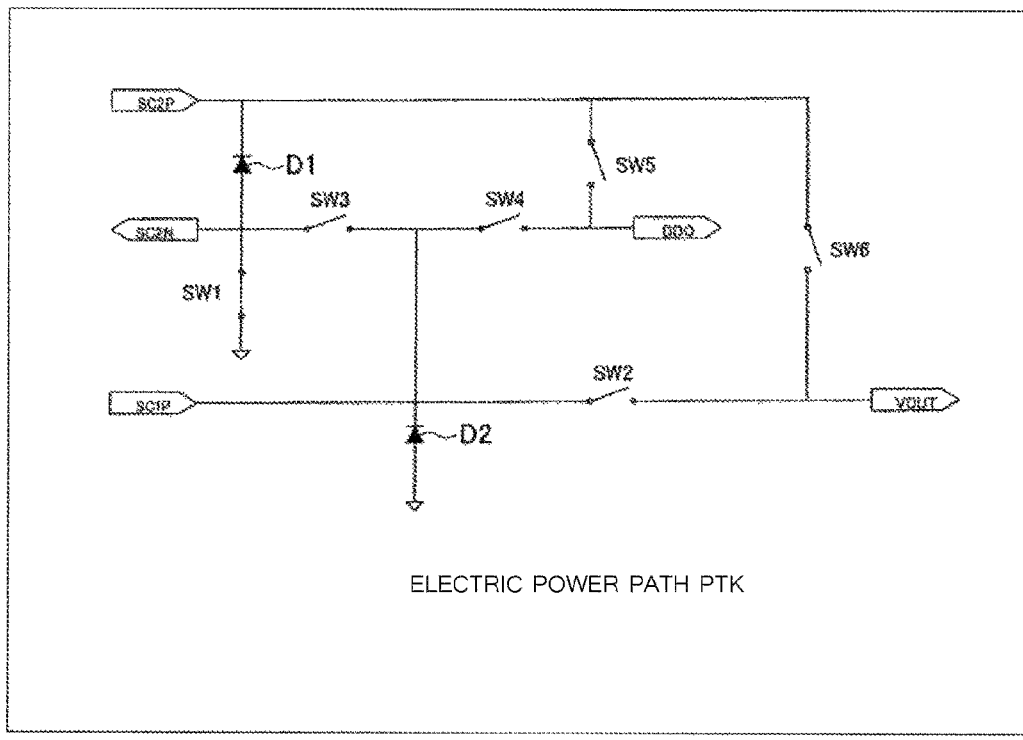
FIG. 19 is a diagram showing the flow of electric power through an electric power path PTK selectively formed by the power switch circuit according to the present embodiment.

FIG. 19 shows the flow of electric power through the electric power path PTK selectively formed by the power switch circuit according to the present embodiment.

In the path PTK, the switch SW1 is controlled to be on while the switches SW2 to SW6 are controlled to be off.

Thus, the positive electrode sides of the generating element (SC1) 20-1 and the generating element (SC2) 20-2 are opened, so that no current flows through the electric power path of the power switch circuit 32.

However, the switch SW1 alone is on so that an open voltage Vop of the generating element (SC1) 20-1 and the generating element (SC2) 20-2 can be measured.

(Path PTL)

Figure 20:
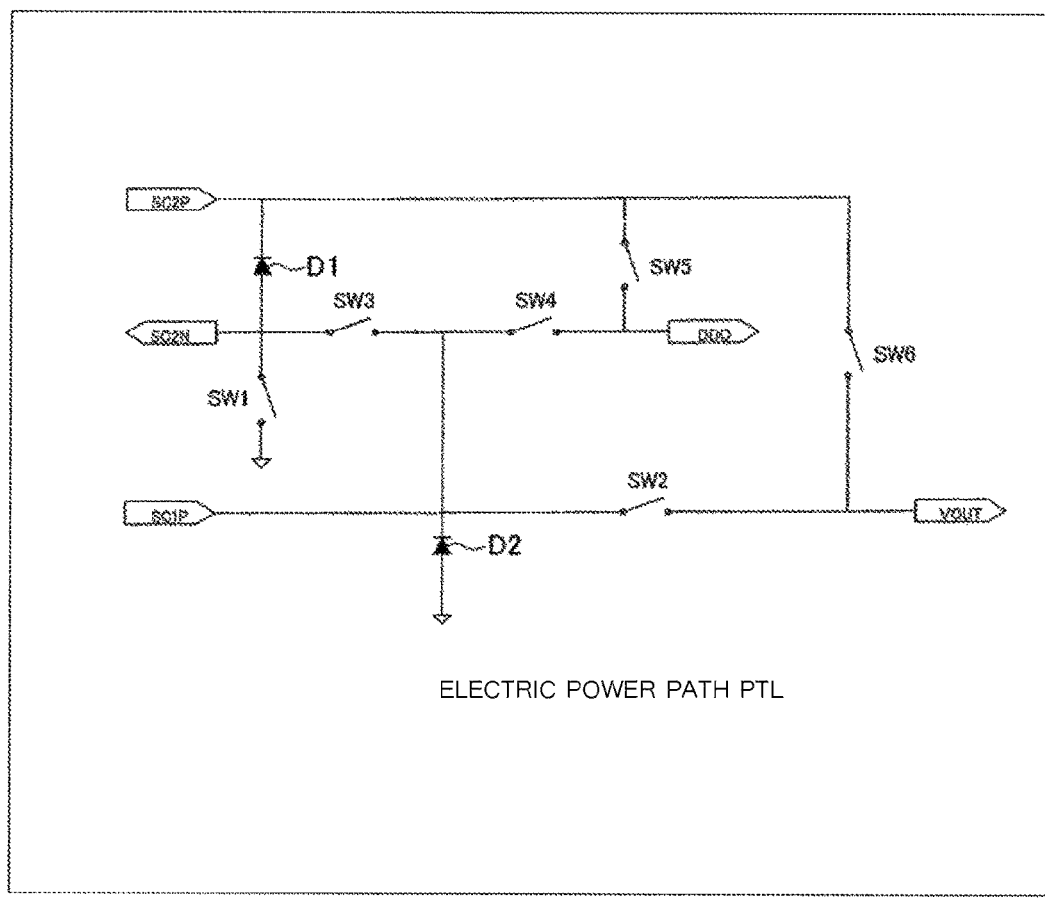
FIG. 20 is a diagram showing the flow of electric power through an electric power path PTL selectively formed by the power switch circuit according to the present embodiment.

FIG. 20 shows the flow of electric power through the electric power path PTL selectively formed by the power switch circuit according to the present embodiment.

In the path PTL, all of the switches SW1 to SW6 are in off-state, so that there is no current flow through the electric power path of the power switch circuit 32.

According to the present embodiment, one of the electric power paths such as shown in FIG. 21 is selected by the control by the first control unit 34 or the second control unit 35 depending on the environment, such as illuminance and temperature. Thus, the maximum electric power can be obtained from the generating elements (solar batteries) 20 at all times regardless of illuminance or temperature.

Figure 22:
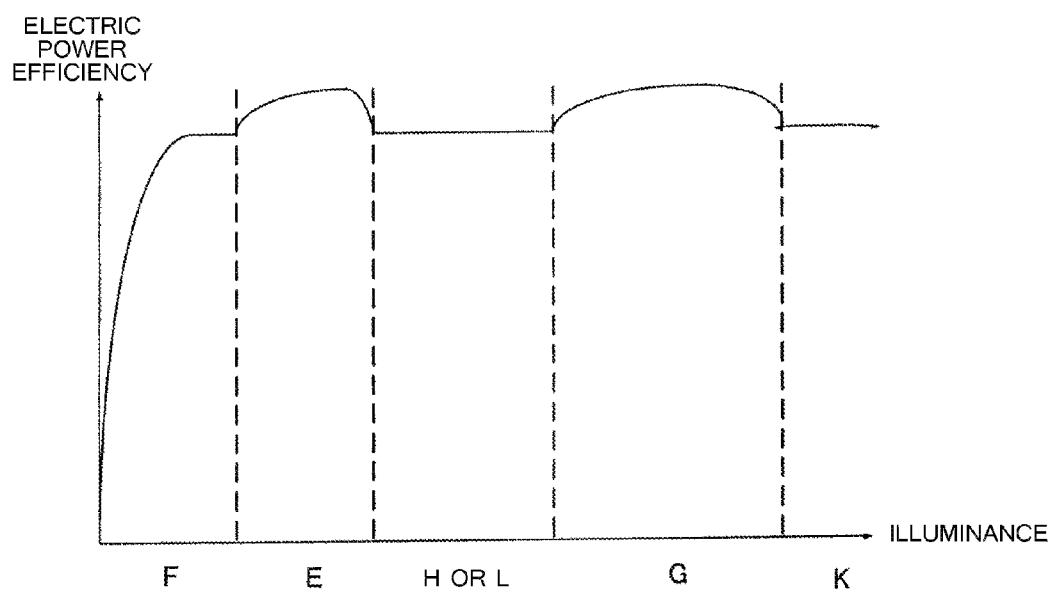
FIG. 22 is a diagram showing electric power paths and electric power efficiency on an illuminance basis.

For example, when the electric power path is switched based on illuminance, the electric power path is switched on an illuminance basis as shown in FIG. 22. There may be a path that does not require switching, depending on the characteristics or circuit configuration of the generating elements (solar batteries) 20.

When the illuminance is at the minimum, the maximum operating point voltage of the generating elements (solar batteries) 20-1 and 20-2 is very low. Thus, the generating elements (solar batteries) 20-1 and 20-2 are connected in series so as to increase the voltage, and the voltage is fed to the electricity storage element 40, i.e., the secondary battery, via the voltage conversion unit 31.

When the output current from the generating elements (solar batteries) 20-1 and 20-2 is too low, the electric power efficiency of the step-up circuit decreases.

When the illuminance is increased to some extent, the electric power efficiency of the electric power path PTE becomes higher than that of the electric power path PTF.

This is due to the fact that the maximum operating point voltage of the generating elements (solar batteries) 20-1 and 20-2 connected in series without passing through the voltage conversion unit 31 approaches the charging voltage of the electricity storage element 40, i.e., the secondary battery.

When the illuminance is even higher, the path PTH connecting the generating elements (solar batteries) 20-1 and 20-2 in parallel and passing through the step-up circuit, or the path PTM (the same equivalent circuit as PTH) connecting the solar batteries in series and passing through the step-down circuit is selected.

When the illuminance is even higher, the generating elements (solar batteries) 20-1 and 20-2 are connected in parallel and the electricity storage element 40, i.e., the secondary battery, is fed without passing through the voltage conversion unit 31.

When the illuminance is at the highest, the generating elements (solar batteries) 20-1 and 20-2 are connected in parallel and the secondary battery is fed via the step-down circuit.

The illuminance may be measured by periodically measuring an open voltage or a short-circuit current of the generating elements (solar batteries) 20-1 and 20-2.

According to the present embodiment with the power switch circuit of the above configuration, the maximum operating point of the generating element such as the solar batteries can be controlled to be maintained, thus providing the advantageous effect that electric power loss can be avoided.

In the power switch circuit 32 with the above configuration, source and drain potentials differ from one switch to another among the switches SW1 to SW6. Thus, the circuit of each switch is individually designed.

In the power switch circuit 32, the source potential may take 0 V, Vbat (charging voltage of the secondary battery), Voc (open voltage of the solar battery), or an intermediate value of any of the above, depending on the switch.

In a MOSFET, the threshold value voltage increases as a substrate-source potential difference Vbs increases, allowing potential destabilization of an on-off operation or increase in the on-resistance.

Thus, in the power switch circuit 32, the source and the substrate are short-circuited for both NMOS and PMOS so that the substrate-source potential difference Vbs is 0 V.

The switch SW1 is constructed of an NMOS. The switches SW2 and SW6 are constructed of PMOS's.

While the power switch circuit 32 is driven from the first control unit 34 or the second control unit 34, the control units are designed with logic MOSFETs and therefore have a low drive capacity. Thus, it may take a long time for switching the switches if the MOSFETs of the power switch circuit 32 are directly driven.

Accordingly, there is desired a configuration in which the MOSFETs are driven from the control units via low gate-capacitance NMOS (MCN) or PMOS (MCP).

Because the switches SW3, SW4, and SW5 take large source potential values, a sufficiently large voltage across gate-source necessary for turning on the switches may not be obtained.

Thus, there is desired a circuit configuration in which the switches SW3, SW4, and SW5 are provided with a transmission gate configuration having combined NMOS with CMOS so that at least one of NMOS and PMOS can be turned on even when the source potential is large.

In the power switch circuit 32, the substrate potential of the MOSFETs is fixed to the source potential, so that a parasitic diode may be formed at a p-n junction portion even when the MOSFETs are off, resulting in conduction.

In the case of NMOS, when the source potential Vs is higher than the drain potential Vd in off-state, electrical continuity is established between a p-type substrate and an n-type diffusion layer. In the case of PMOS, electrical continuity is established between a p-type diffusion layer and an n-type substrate when the drain potential Vd is higher than the source potential Vs in off-state.

Thus, in the power switch circuit 32, it is desirable to connect two MOSFETs of the same type in the switches SW2 to SW5, for example, such that the parasitic diodes are oriented in opposite directions. In this way, there can be obtained a configuration in which electrical continuity is not established even when either of the potential of the input or output terminals becomes higher.

For example, when the solar battery is connected to one terminal of a switch and the secondary battery is connected to the other terminal of the switch, the voltage (open voltage) on the solar battery side may become higher or lower than the secondary battery voltage due to illuminance during off-state. Thus, an anti-parasitic diode measure may be required.

Next, a description is given of the characteristics measurement circuit 33 of the electric power control circuit and a control of the electric power path, the voltage conversion unit 31, and the like by the first control unit 34 depending on a measurement result from the characteristics measurement circuit 33.

<4-2. Configuration Example of Characteristics Measurement Circuit and Control of Electric Power Path on Basis of Measurement Result>

The characteristics measurement circuit 33 includes the function which measures a short-circuit current and an open voltage of the generating elements (SC1, SC2) 20-1 and 20-2.

When an electric power path including the voltage conversion unit 31, which includes a step-up circuit and a step-down circuit, is selected, the characteristics measurement circuit 33 performs current-voltage (I-V) measurement for performing MPPT control in the voltage conversion unit 31 when a circuit is operated in the selected electric power path.

The first control unit 34 performs selection control of the electric power path of the power switch circuit 32 on the basis of the measurement result from the characteristics measurement circuit 33.

When the electric power path including the voltage conversion unit 31, which includes the step-up circuit and the step-down circuit, is selected, the first control unit 34 performs MPPT control in the voltage conversion unit 31 on the basis of a I-V measurement result when the circuit is operated in the selected electric power path.

[Method of Controlling Characteristics Measurement Circuit]

Generally, when charging is to be performed with high energy efficiency on the basis of charging by a generating element (solar battery), a method involving MPPT control and using a step-up circuit is used.

According to the present embodiment, in order to achieve high energy efficiency charging, a control is performed such that the circuit configuration of the solar battery charging circuit can be optimized by freely modifying the connection of one or a plurality of generating elements (solar batteries) or the connection of the voltage conversion unit (step-up and step-down) circuit.

Specifically, in order to realize an optimum circuit configuration of the power switch circuit 32, an optimum control of the power switch circuit 32 is performed on the basis of the measurement result from the characteristics measurement circuit 33.

Figure 23:
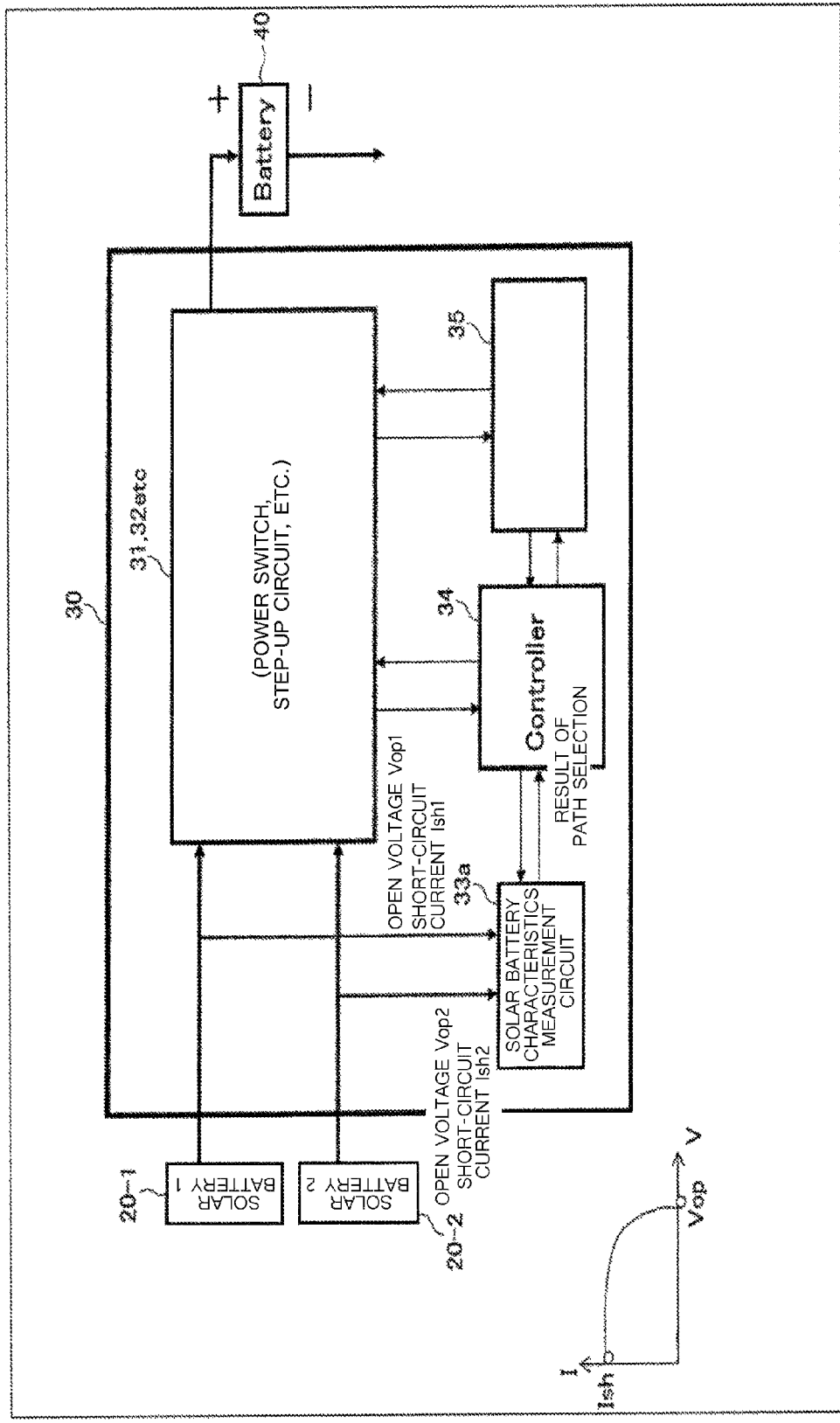
FIG. 23 is a diagram showing a first function example of a characteristics measurement circuit according to the present embodiment.

FIG. 23 illustrates a first function example of the characteristics measurement circuit according to the present embodiment.

Figure 24:
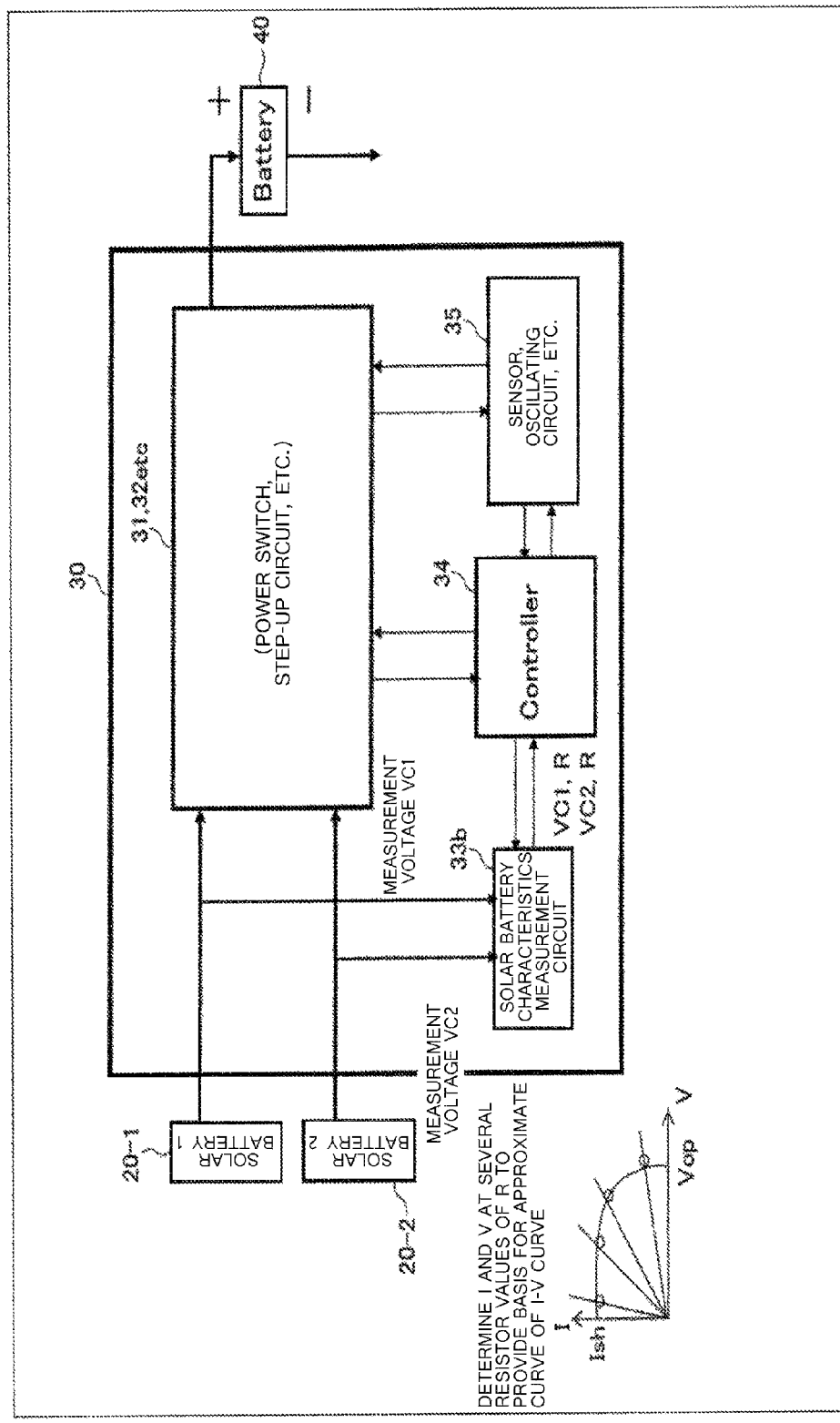
FIG. 24 is a diagram showing a second function example of the characteristics measurement circuit according to the present embodiment.

FIG. 24 illustrates a second function example of the characteristics measurement circuit according to the present embodiment.

A characteristics measurement circuit 33a shown in FIG. 23 measures an open voltage Vop1 and a short-circuit current Ish1 of the generating element (SC1) 20-1 and an open voltage Vop2 and a short-circuit current Ish2 of the generating element (SC2) 20-2 so as to obtain electric power path selection information.

The characteristics measurement circuit 33a supplies the measurement result to the first control unit 34 in the form of a digital signal.

A characteristics measurement circuit 33b shown in FIG. 24 measures a voltage VC1 of the generating element (SC1) 20-1 and a voltage VC2 of the generating element (SC2) 20-2 so as to perform the I-V measuring operation for the MPPT control.

The characteristics measurement circuit 33b determines I and V at several resistor values R so as to provide the basis for an approximate curve of the I-V curve.

The characteristics measurement circuit 33b supplies the measurement result to the first control unit 34 in the form of a digital signal. In this case, information of the resistor value R is included. The current I during operation is determined by V/R.

[Discussion of Selection of Electric Power Path]

When there are two generating elements (solar batteries) 20-1 and 20-2 according to the present embodiment, a first state and a second state may be present, as described below.

The first state is a state where at least one of the two generating elements (solar batteries) 20-1 and 20-2 is operating.

The second state is a state where neither of the two generating elements (solar batteries) 20-1 nor 20-2 is operating.

Basically, according to the present embodiment, the first control unit 34 measures a current at a load side voltage at the time of series connection and a current at a load side voltage at the time of parallel connection, and selects the electric power path such that higher electric power path can be obtained.

Conditions for selecting the electric power path PTA are the following.

$$Vpm2 < Vddc\_min \tag{A-1}$$

$$Ipm2 < Iddc\_min \tag{A-2}$$

$$Vpm2 * Ipm2 * Eff\_ddc(Vpm2, Ipm2) < I2(Vbat) * \& Vbat \tag{A-3}$$

$$(A\text{-}1) \| (A\text{-}2) \| (A\text{-}3)$$

When the electric power path PTB is selected, Vref=Vpm2.

Eff_ddc(I) indicates electric power efficiency (0-1.0) of the step-up circuit of the voltage conversion unit 31 at the current value I. Eff_ddc(I) can be set as a fixed coefficient at the time of designing.

Vpm1 indicates an expected voltage of the generating element (SC1) 20-1 at the time of MPPT control when the open voltage is Vop1.

Vpm2 indicates an expected voltage of the generating element (SC2) 20-2 at the time of MPPT control when the open voltage is Vop2.

Vddc_min indicates a minimum open voltage as a threshold value for performing connection change of the generating elements (solar batteries) 20-1 and 20-2.

Iddc_min indicates a short-circuit current as a threshold value for performing connection change of the generating elements (solar batteries) 20-1 and 20-2.

Vbat indicates a charging voltage of the electricity storage element 40, i.e., the secondary battery.

Vref indicates a reference voltage that the first control unit 34 provides to the voltage conversion unit 31 by MTTP control.

Conditions for selecting the electric power path PTC are as follows:

$$Vpm1 < Vddc\_min \tag{C-1}$$

$$Ipm1 < Iddc\_min \tag{C-2}$$

$$Vpm1 * Ipm1 * Eff\_ddc(Vpm1, Ipm1) < I1(Vbat) * Vbat \tag{C-3}$$

$$(C\text{-}1) \| (C\text{-}2) \| (C\text{-}3)$$

When the electric power path PTD is selected, Vref=Vpm1.

[Comparison (1) of Electric Power of Paths PTE, PTF, PTG, PTH, PTI, and PTJ]

Paths with the maximum values of the following (E-1) to (J-1) are selected:

$$Vbat * Iseries(Vbat) \tag{E-1}$$

$$Vpm\_series * Ipm\_series * Eff\_ddc(Vpm\_series, Ipm\_series) \tag{F-1}$$

The paths are eliminated from candidates when any of the following conditions for operation of the step-up circuit is not satisfied:

$$Vpm\_series > Vddc\_min$$

$$Ipm\_series > Iddc\_min$$

When the electric power path PTFF is selected, Vref=Vpm_series.

$$Vbat * \{I1(Vbat) + I2(Vbat)\} \quad (G-1)$$

$$Vpm\_parallel * Ipm\_parallel * \mathit{Eff}\_ddc(Vpm\_parallel, Ipm\_parallel) \quad (H-1)$$

When any of the following conditions for operation of the step-up circuit is not satisfied, the paths are eliminated from candidates:

$$Vpm\_parallel > Vddc\_min$$

$$Ipm\_parallel > Iddc\_min$$

When the electric power path PTH is selected, Vref=Vpm_parallel.

[Comparison (2) of Electric Power of Paths PTE, PTF, PTG, PTH, PTI, and PTJ]

$$Vpm1 Ipm1 * \mathit{Eff}\_ddc(Vpm1, Ipm1) + Vbat * I2(Vbat) \quad (I-1)$$

When any of the following conditions for operation of the step-up circuit is not satisfied, the paths are eliminated from candidates:

$$Vpm1 > Vddc\_min$$

$$Ipm1 > Iddc\_min$$

When the electric power path PTI is selected, Vref=Vpm1.

$$Vpm2 * Ipm2 * \mathit{Eff}\_ddc(Vpm2, Ipm2) + Vbat * I1(Vbat) \quad (J-1)$$

When any of the following conditions for operation of the step-up circuit is not satisfied, the paths are eliminated from candidates:

$$Vpm2 > Vddc\_min$$

$$Ipm2 > Iddc\_min$$

When the electric power path PTJ is selected, Vref=Vpm2.

Next, other methods will be described.

When there are the two generating elements (solar batteries) 20-1 and 20-2 and at least one of them is operating, there are the following patterns of operation state.

(1) The two generating elements (solar batteries) 20-1 and 20-2 are connected.

(2) The two generating elements (solar batteries) 20-1 and 20-2 are in a generating operation state.

(3) The two generating elements (solar batteries) 20-1 and 20-2 are performing a generating operation in substantially the same state.

(4) The two generating elements (solar batteries) 20-1 and 20-2 have different generating operation states due to the influence of shades or the like.

(5) One is performing a generating operation while the other is performing hardly any generating operation due to the influence of shades or the like.

(6) Only one of the two generating elements (solar batteries) 20-1 and 20-2 is connected.

[Determination as to Whether the Generating Element (Solar Battery) is in Generating Operation State]

Determination as to whether the generating elements (solar batteries) 20-1 and 20-2 are in a generating operation state is made by determining the following conditions concerning the short-circuit current.

$$Ish \geq Ish\_min \quad \text{[Expression 1]}$$

where Ish_min indicates a minimum short-circuit current at which it can be recognized that the solar battery is performing a generating operation and the resultant electric power is significant.

[Two Generating Elements (Solar Batteries) 20-1 and 20-2 are Both in Generating State]

When both of the two generating elements (solar batteries) 20-1 and 20-2 are in a generating state, the following seven states are considered.

| | |
|---|---|
| $Vop\_min \leq Vpm1\_f + Vpm2\_f < Vddc\_se$ path$E$ | State (1): |
| $Vddc\_se \leq Vpm1\_f + Vpm2\_f < VBAT$ $F$ | State (2): |
| $BAT \leq Vpm1\_f + Vpm2\_f < Vddc\_pa$ $E$ | State (3): |
| $Vddc\_pa < Vpm1\_f + Vpm2\_f, Vop1 < VAT,$ $Vop2 < VBAT\_H$ | State (4): |
| $Vop1 > VBAT, Vop2 < VBAT$ $I$ | State (5): |
| $Vop1 < VBAT, Vop2 > VBAT$ $J$ | State (6): |
| $Vop1 > VBAT, Vop2 > VBAT$ $G$ | State (7): |

Vpm1_f indicates an expected voltage of the generating element (SC1) 20-1 at the time of MPPT control when the open voltage is Vop1.

Vpm2_f indicates an expected voltage of the generating element (SC2) 20-2 at the time of MPPT control when the open voltage is Vop2.

Vop_min indicates a minimum open voltage at which it can be recognized that the generating element (solar battery) is performing a generating operation and the resultant electric power is significant.

Vddc_se indicates an open voltage <1> as a threshold value for performing connection change of the generating elements (solar batteries) 20-1 and 20-2. It also indicates a voltage as a threshold value at which a portion generated by the generating elements is not minus even when the voltage conversion unit 31 is used with respect to a series connection of the generating elements (solar batteries) 20-1 and 20-2.

Vddc_pa indicates an open voltage <2> as a threshold value for performing connection change of the generating elements (solar batteries) 20-1 and 20-2. It also indicates a voltage as a threshold value at which higher electric power can be obtained by performing the step-up control using the voltage conversion unit 31 with respect to a parallel connection of the generating elements (solar batteries) 20-1 and 20-2 than using the generating elements 20-1 and 20-2 in a series connection.

Pse (DDC) indicates electric power that would be theoretically obtained when Vmp1_f and Vmp2_f are realized by using the voltage conversion unit (DDC) 31 with respect to a series connection of the generating elements (solar batteries) 20-1 and 20-2 when both of the generating elements (solar batteries) 20-1 and 20-2 are in a generating state.

f(Pse(DDC)) indicates electric power that is actually obtained in view of the efficiency of the voltage conversion unit (DDC) 31 (i.e., Pse (DDC) multiplied by electric power efficiency).

When a current generated by the generating element (SC1) 20-1 at the time of Vmp1_f is Imp1_f, a current generated by the generating element (SC2) 20-2 at the time of Vmp_f2 is Imp2_f, and when the value of a larger one of Imp1_f and Imp2_f is Ib(Imp1_f, Imp2_f), the following apply.

$$Vddc\_se = f(Pse(DDC))/Ib(Imp1\_f, Imp2\_f)$$

$$Pse(DDC) = (Vmp1\_f + Vmp\_f2) \times Ib(Imp1\_f, Imp2\_f) \quad \text{[Expression 2]}$$

Ppa(DDC) indicates electric power that would be theoretically obtained when Vmp1_f and Vmp_f2 are realized by using the voltage conversion unit (DDC) 31 is used with respect to a parallel connection of the generating elements (solar batteries) 20-1 and 20-2.

f(Ppa(DDC)) indicates electric power that is actually obtained in view of the efficiency of the voltage conversion unit (DDC) 31, i.e., Ppa(DDC) multiplied by electric power efficiency.

When a voltage obtained when the generating element (SC1) 20-1 and the generating element (SC2) are connected in parallel is V(Vmp1_f‖Vmp_f2), the following holds.

$$Vddc\_pa = f(Ppa(DDC))/(Imp1\_f + Imp2\_f)$$

$$Ppa(DDC) = V(Vmp1\_f \| Vmp\_f2) \times (Imp1\_f + Imp2\_f) \quad \text{[Expression 3]}$$

When both of the two generating elements (solar batteries) 20-1 and 20-2 are performing a generating operation with substantially no shades, the following confirmation is made.

FIGS. 25(A) to 25(E) show the electric power paths selected by operation state determination based on the open voltage Vop when the two generating elements are performing the generating operation with substantially no shades.

(1) It is confirmed that both of the generating elements (solar batteries) 20-1 and 20-2 are in a generating operation state by determination (Ish1≥Ish_min and Ish2≥Ish_min) of the solar battery generating operation state on the basis of the short-circuit current Ish.

(2) The electric power path is determined by operation state determination on the basis of the open voltage Vop.

Figure 25:
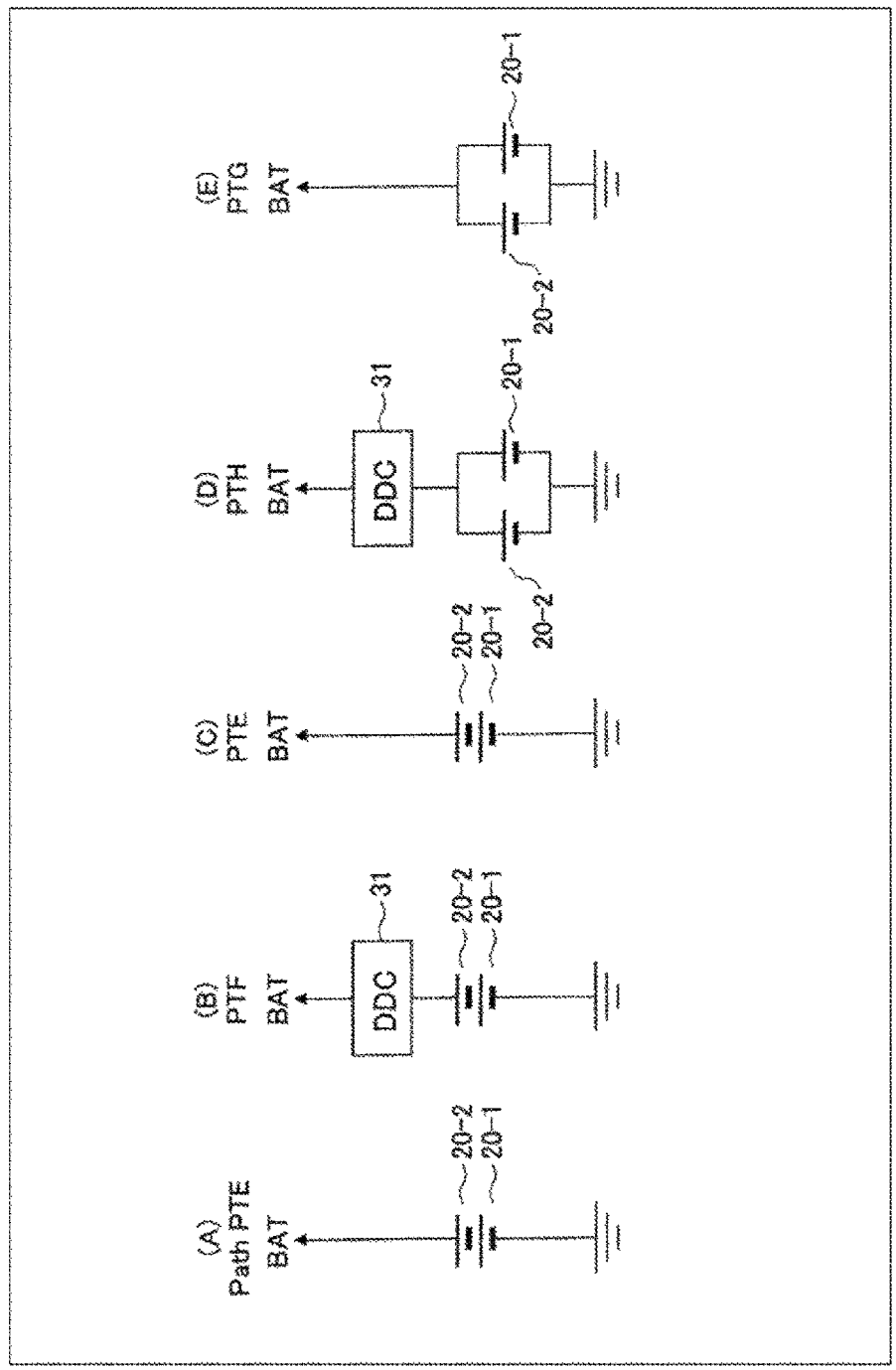
FIG. 25 is a diagram showing electric power paths selected by operation state determination on the basis of an open voltage Vop when two generating elements are performing a generating operation with virtually no shades.

When the electromotive force from the generating elements 20-1 and 20-2 is small and the resultant electric power will be minus after covering the electric power consumption by the voltage conversion unit (DDC) 31, the first control unit 34 selects the electric power path PTE shown in FIG. 25(A).

In the case it is smaller than the voltage of the electricity storage element (BAT) 40 even when the generating elements 20-1 and 20-2 are connected in series but the resultant electric power can be increased by stepping-up by the voltage conversion unit (DDC) 31, the first control unit 34 selects the electric power path PTF shown in FIG. 25(B).

In the case it is smaller than the voltage of the electricity storage element (BAT) 40 by the generating elements 20-1 and 20-2 individually, but when connected in series, the voltage of the electricity storage element 40 can be reached, and when the resultant electric power is greater than the power obtained when a parallel connection is used and stepping-up is performed by the voltage conversion unit (DDC) 31, the following applies.

In this case, the first control unit 34 selects the electric power path PTE shown in FIG. 25(C).

In the case it is smaller than the voltage of the electricity storage element (BAT) 40 by the generating elements 20-1 and 20-2 individually, but when connected in series, the voltage of the electricity storage element 40 can be reached, and when a greater resultant electric power can be obtained by using a parallel connection and stepping-up with the voltage conversion unit (DDC) 31, the following applies.

In this case, the first control unit 34 selects the electric power path PTH as shown in FIG. 25(D).

When the voltage of the electricity storage element (BAT) 40 can be reached by the generating elements 20-1 and 20-2 individually, the first control unit 34 selects the electric power path PTG shown in FIG. 25(E).

When both of the two generating elements (solar batteries) 20-1 and 20-2 are performing a generating operation although with shades, the following process is performed.

Figure 26:
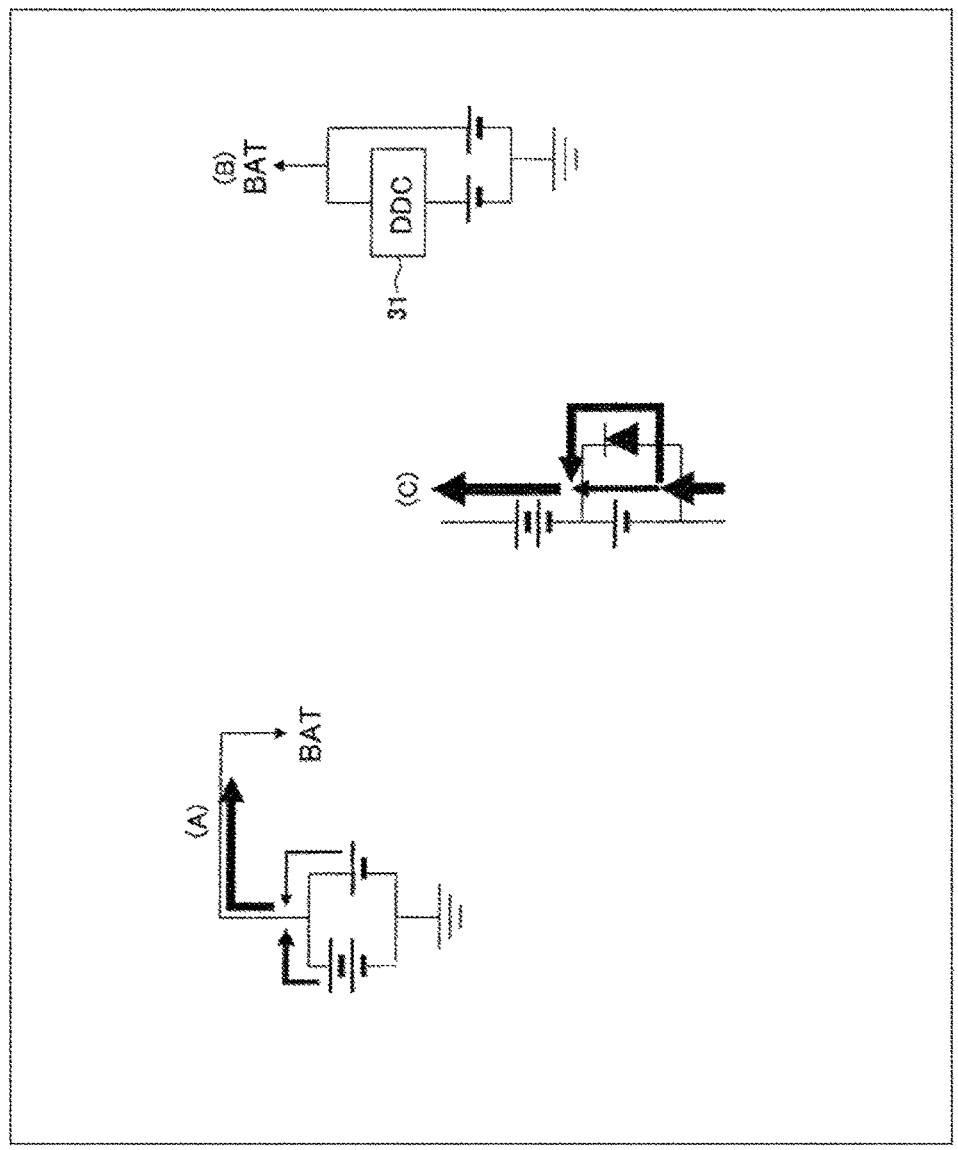
FIG. 26 is a diagram showing a process where the two generating elements are performing a generating operation although with shades.

FIGS. 26(A) to 26(C) illustrate the process performed when both of the generating elements (solar batteries) 20-1 and 20-2 are performing a generating operation although with shades.

As shown in FIG. 26(A), even when solar batteries with different potentials are connected in parallel, no backflow to the generating elements 20-1 and 20-2 occurs and charging can be performed normally if the voltage of each of the generating elements (solar batteries) 20-1 and 20-2 is higher than the voltage of the electricity storage element (BAT) 40.

When the open voltage Vop of one of the generating elements is higher than the voltage of the electricity storage element 40, the generating element does not require stepping-up while the other generating element requires stepping-up, so that the configuration shown in FIG. 26(B) inevitably results.

As shown in FIG. 26(C), in the case of a series (+DDC) connection, a current corresponding to the difference between the two generating elements 20-1 and 20-2 flows through a bypass diode of the generating elements with a lower potential, so that the phenomenon in which current is limited by the generating element with the lower potential can be prevented.

When one of the two generating elements (solar batteries) 20-1 and 20-2 has shades and they are in different generating operation states, the following confirmation is made.

FIGS. 27(A) to 27(D) illustrate electric power paths selected by operation state determination based on the open voltage Vop when the two generating elements have different generating operation states.

(1) By determination (Ish1≥Ish_min and Ish2≥Ish_min) of the solar battery generating operation state on the basis of the short-circuit current Ish, it is confirmed that both of the generating elements (solar batteries) 20-1 and 20-2 are in generating operation states.

(2) The electric power path is determined by operation state determination based on the open voltage Vop.

In the case it is smaller than the voltage of the electricity storage element (BAT) 40 by the generating elements (solar batteries) 20-1 and 20-2 individually, and when connected in series but the resultant electric power can be increased by stepping-up with the voltage conversion unit (DDC) 31, the following applies.

Figure 27:
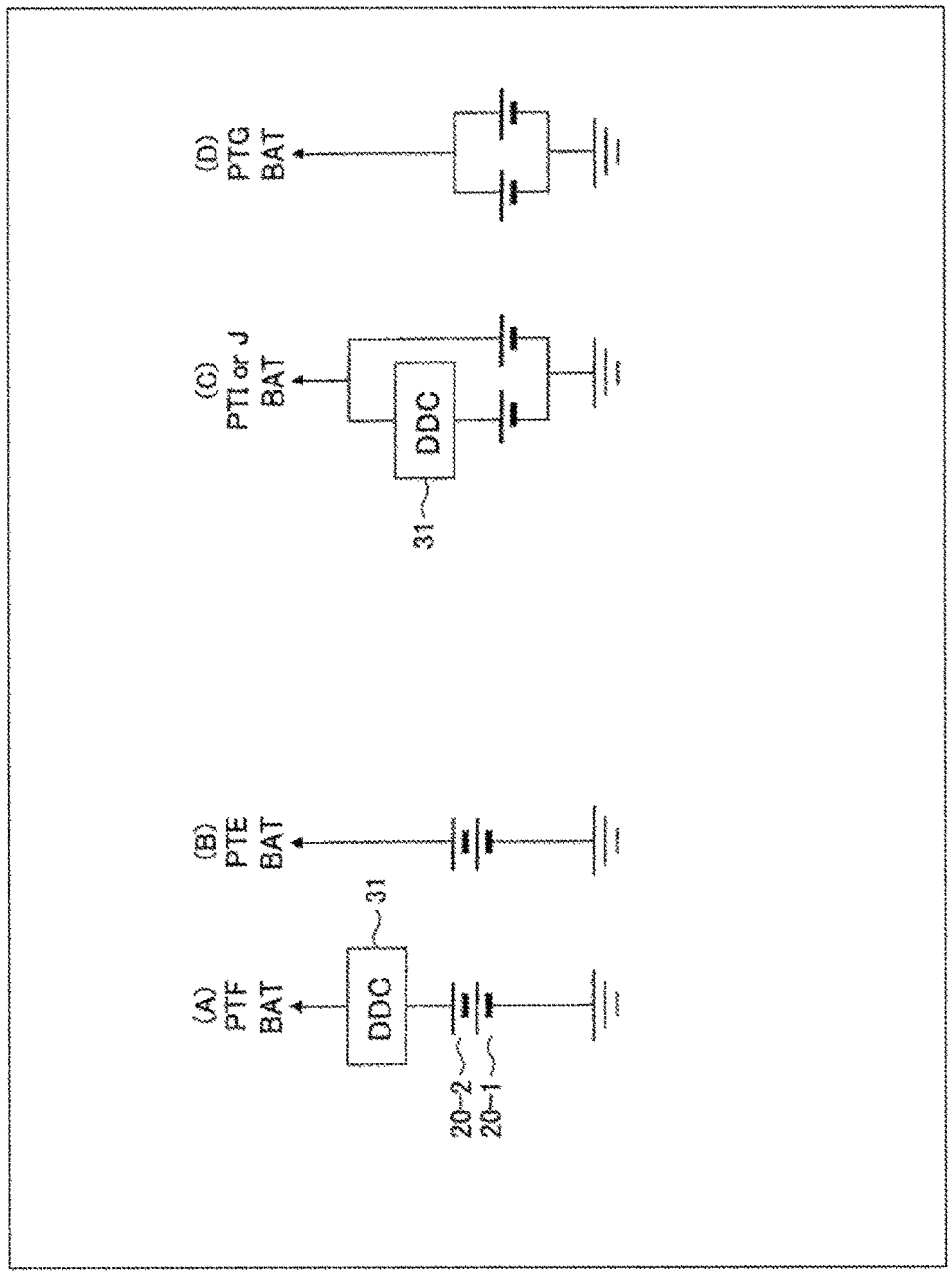
FIG. 27 is a diagram showing electric power paths selected by the operation state determination on the basis of the open voltage Vop when the two generating elements have different generating operation states.

In this case, the first control unit 34 selects the electric power path PTF shown in FIG. 27(A).

In the case it is smaller than the voltage of the electricity storage element (BAT) 40 by the generating elements (solar batteries) 20-1 and 20-2 individually, but the voltage of the electricity storage element 40 can be reached when connected in series, the first control unit 34 selects the electric power path PTE shown in FIG. 27(B).

In the case the voltage of the electricity storage element (BAT) 40 can be reached by one of the generating elements (solar batteries) 20-1 and 20-2 individually but not be reached by the other generating element individually, the following applies.

In this case, the first control unit 34 selects the electric power path PTI or PTJ shown in FIG. 27(C).

When the voltage of the electricity storage element (BAT) 40 can be reached by the generating elements (solar batteries) 20-1 and 20-2 individually, the first control unit 34 selects the electric power path PTG shown in FIG. 27(D).

When one of the two generating elements (solar batteries) 20-1 and 20-2 has shades and is not in a generating operation state while the other is in a generating operation state, the following confirmation is made.

Figure 28:
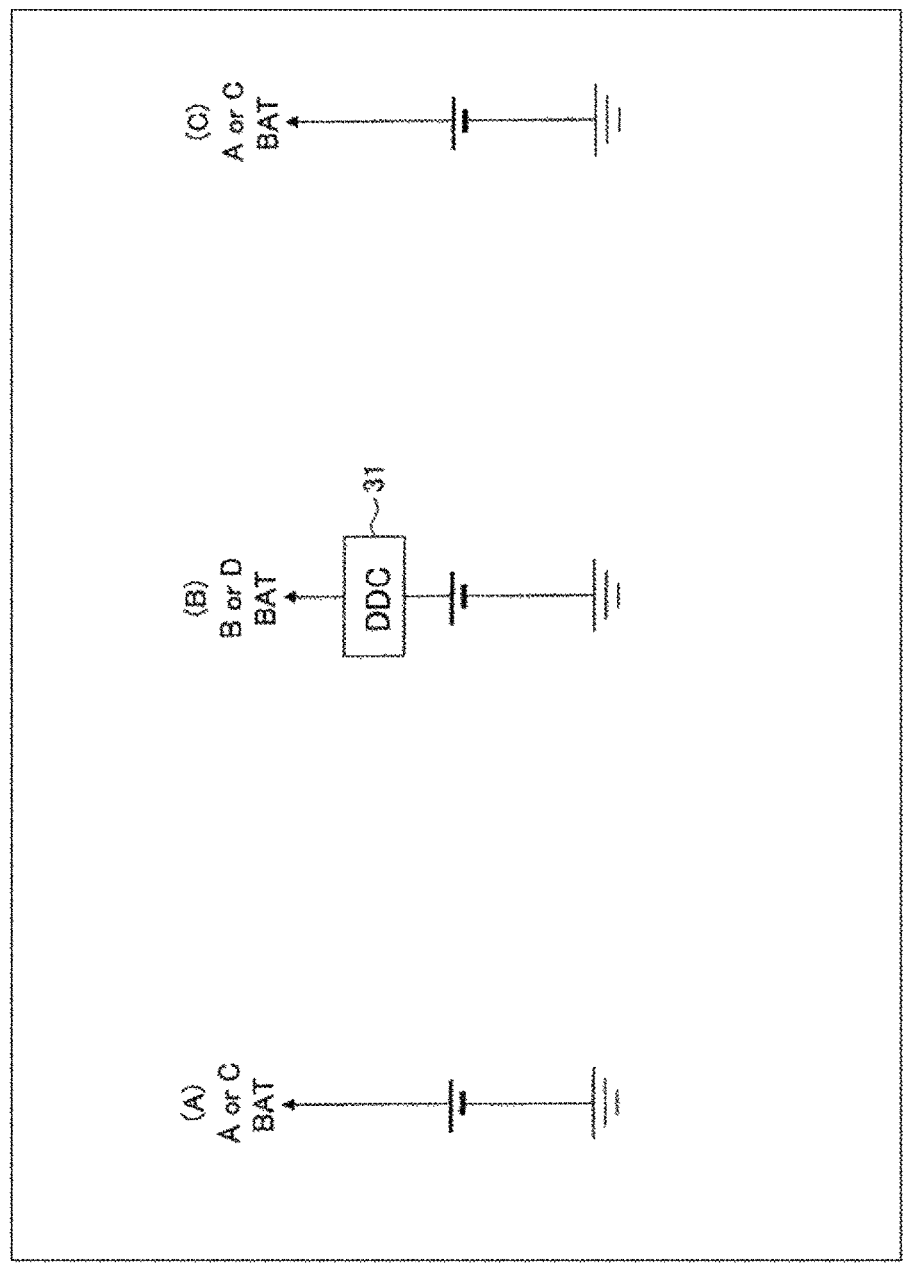
FIG. 28 is a diagram showing electric power paths selected by the operation state determination on the basis of the open voltage Vop when one of the two generating elements is not in a generating operation state but the other is in a generating operation state.

FIGS. 28(A) to 28(C) show the electric power paths selected by operation state determination based on the open voltage Vop when one of the two generating elements is not in a generating operation state and the other is in a generating operation state.

(1) In a solar battery generating operation state determination based on the short-circuit current Ish (Ish1≥Ish_min and Ish2≥Ish_min), it is confirmed that only one of the generating elements (solar batteries) 20-1 and 20-2 is in a generating operation state.

(2) The electric power path is determined by operation state determination based on the open voltage Vop.

When the electromotive force of the generating element is small and the resultant electric power would be minus if the electric power consumption by the electricity storage element (DDC) 31 is covered, the first control unit 34 selects the electric power path PTA or PTC shown in FIG. 28(A).

When the voltage of the electricity storage element (BAT) 40 is not reached by the generating element individually but the resultant electric power can be increased by stepping-up by the voltage conversion unit (DDC) 31, the first control unit 34 selects the electric power path PTB or PTD shown in FIG. 28(B).

When the voltage of the electricity storage element (BAT) 40 can be reached by the generating element individually, the first control unit 34 selects the electric power path PTA or PTC shown in FIG. 28(C).

When only one of the two generating elements (solar batteries) 20-1 and 20-2 is connected, the following confirmation is made.

Figure 29:
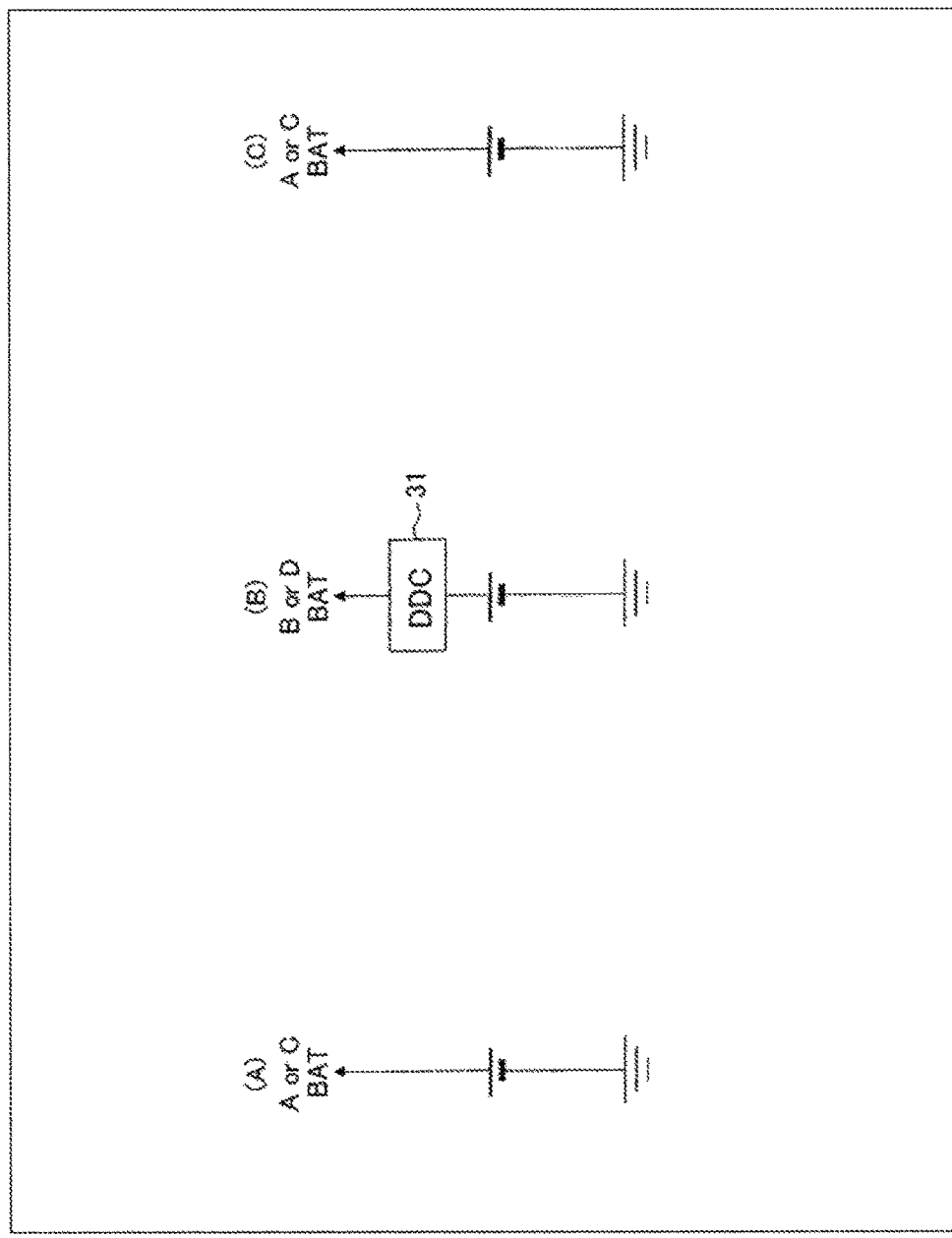
FIG. 29 is a diagram showing electric power paths selected by the operation state determination by the open voltage Vop when only one of the two generating elements is connected.

FIGS. 29(A) to 29(C) show the electric power paths selected by operation state determination based on the open voltage Vop when only one of the two generating elements is connected.

(1) In the solar battery generating operation state determination based on the short-circuit current Ish (Ish1[or Ish2]≥Ishmin), it is confirmed that the one generating element (solar battery) is in a generating operation state.

(2) The electric power path is determined by operation state determination based on the open voltage Vop.

When the electromotive force of the generating element is small and the resultant electric power would be minus if the electric power consumption by the electricity storage element (DDC) 31 is covered, the first control unit 34 selects the electric power path PTA or PTC shown in FIG. 29(A).

In the case it is smaller than the voltage of the electricity storage element (BAT) 40 by the generating element individually but the resultant electric power can be increased by stepping-up by the voltage conversion unit (DDC) 31, the first control unit 34 selects the electric power path PTB or PTD shown in FIG. 29(B).

When the voltage of the electricity storage element (BAT) 40 can be reached by the generating element individually, the first control unit 34 selects the electric power path PTA or PTC shown in FIG. 29(C).

When neither of the two generating elements (solar batteries) 20-1 nor 20-2 is operating, the following process is performed.

When none of the generating elements is operating in the power switch circuit 32, the following patterns may be considered.

(1) The two generating elements (solar batteries) 20-1 and 20-2 are connected and neither is operating.

(2) One generating element is connected and the one generating element is not operating (the generating element that is not connected may or may not be operating).

(3) Neither is connected (the two generating elements (solar batteries) that are not connected may or may not be operating).

In either case when the generating elements (solar batteries) that are connected are not operating or when the generating elements (solar batteries) that are not connected are not operating, the power switch circuit 32 does not operate (is not influenced).

Similarly, even if the generating elements (solar batteries) that are not connected are operating, the power switch circuit 32 does not operate, or no problem arises as for a generating element.

A "state in which the power switch circuit does not operate" may be generalized into a "state in which none of the generating elements is operating".

Figure 30:
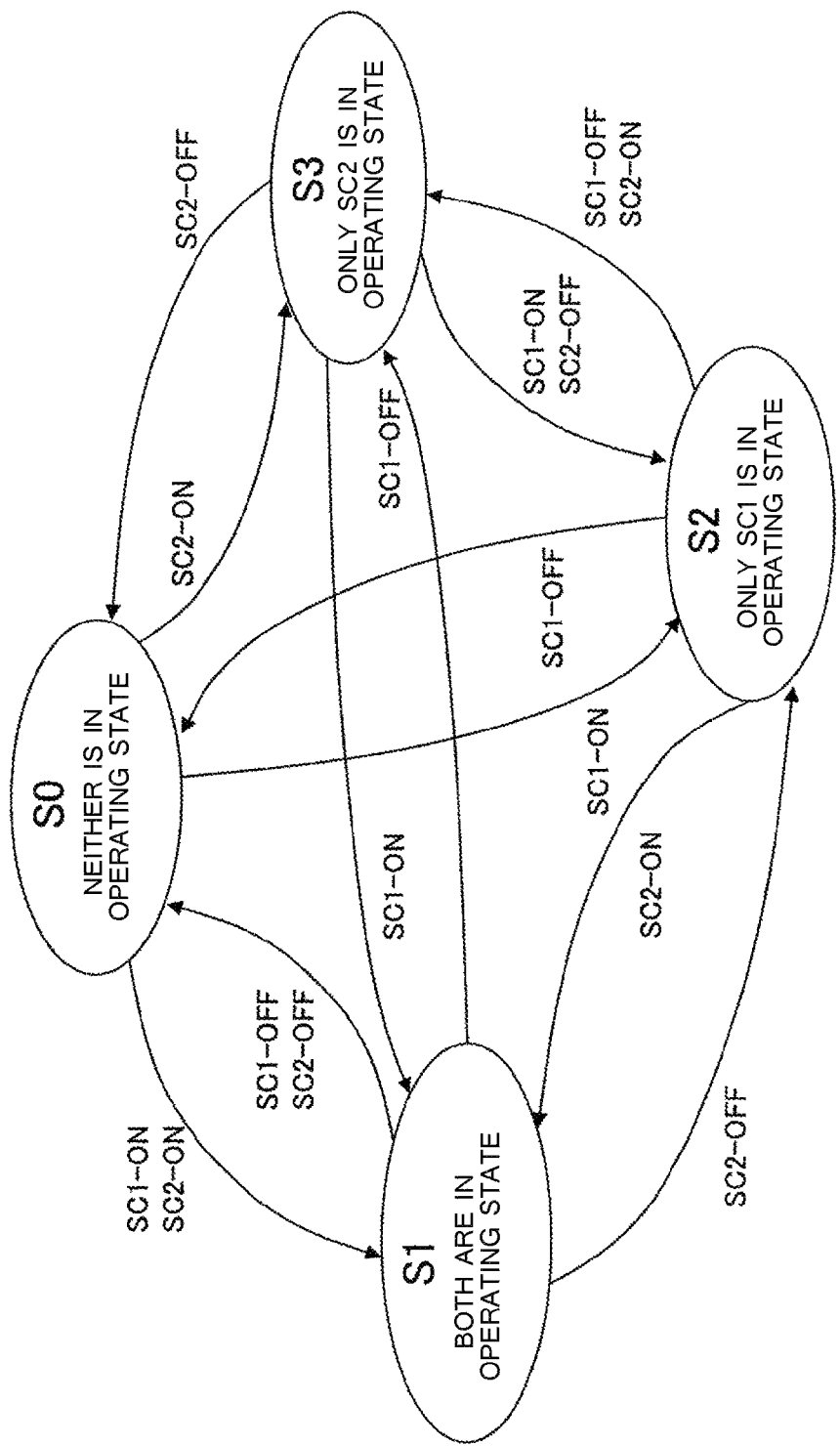
FIG. 30 is a state transition diagram illustrating a determination as to whether the generating elements are in a generating operation state.

FIG. 30 shows a state transition diagram of the determination as to whether each generating element is in a generating operation state.

In FIG. 30, a state S0 indicates a state in which none of the generating elements is in an operation state. A state S1 indicates a state in which both of the two generating elements (SC1) 20-1 and (SC2) 20-2 are operating.

A state S2 indicates a state in which only the generating element (SC1) 20-1 is in an operation state. A state S3 indicates a state in which only the generating element (SC2) is in an operation state.

At the time of transition between the respective states, the generating element (SC1) 20-1 and the generating element (SC2) 20-2 are turned on or off.

Figure 31:
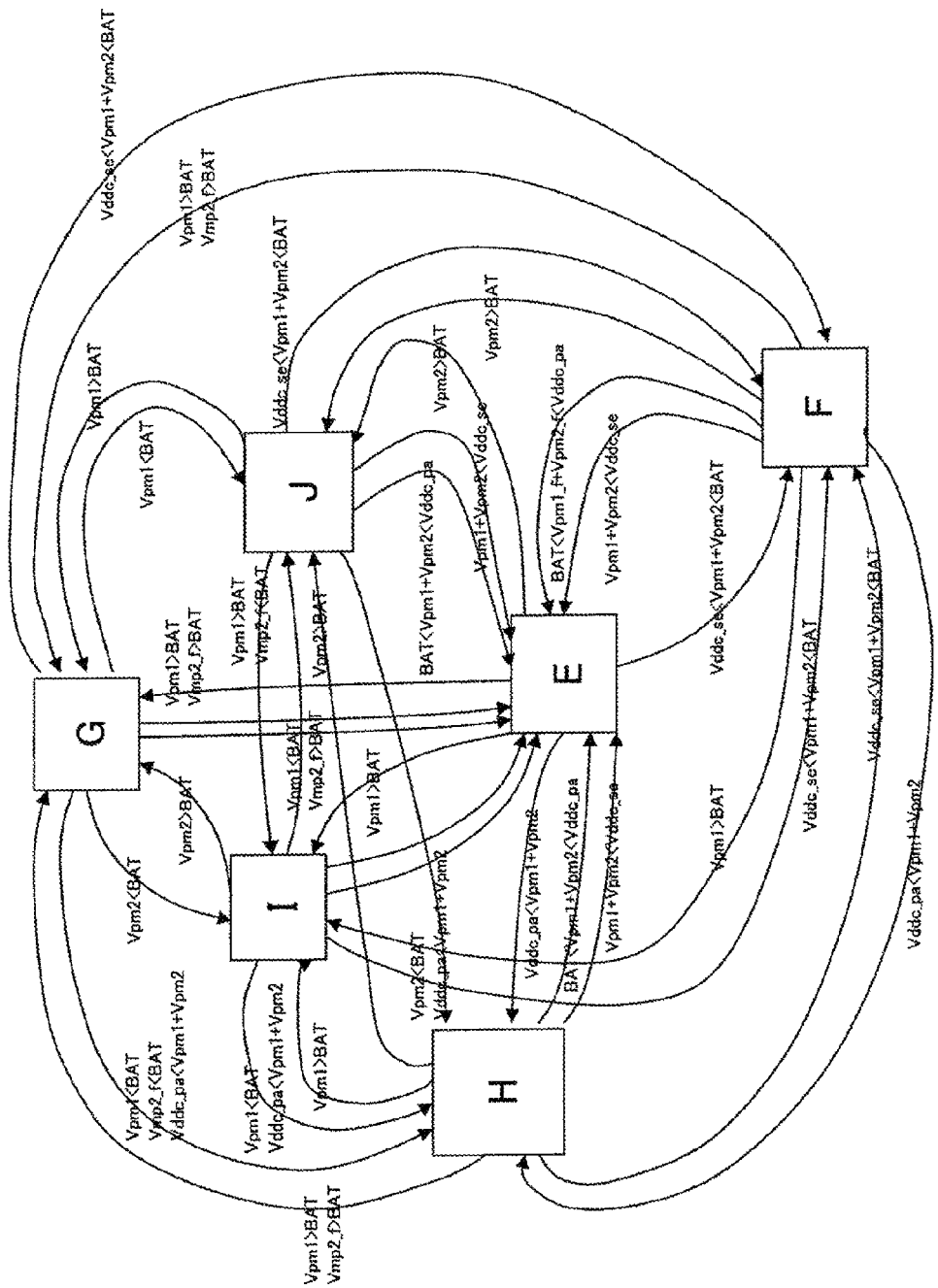
FIG. 31 is a state transition diagram illustrating a determination as to which electric power paths are in operation when the two generating elements in state S1 are both in a generating operation state.

FIG. 31 shows a state transition diagram for the determination as to which electric power paths are operating when the two generating elements in state S1 are both in a generating operation state.

In the example shown in FIG. 31, state transitions between the electric power paths PTE, PTF, PTG, PTH, PTI, and PTJ are illustrated.

Figure 32:
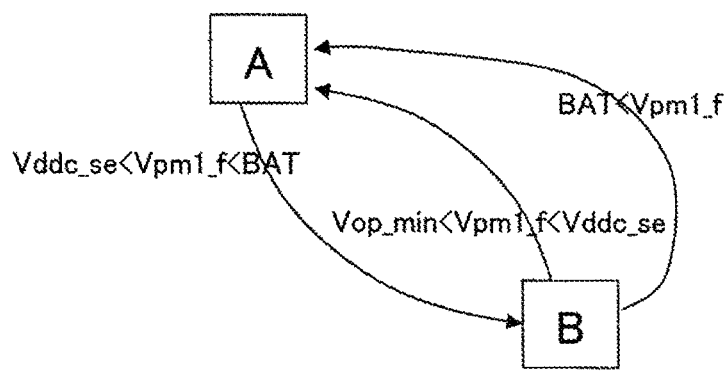
FIG. 32 is a state transition diagram illustrating a determination as to which electric power paths are in operation when one generating element (SC1) in state S2 is in a generating operation state.

FIG. 32 shows a state transition diagram for the determination as to which electric power paths are operating when the one generating element (SC1) in state S2 is in a generating operation state.

In the example of FIG. 32, state transitions between the electric power paths PTA and PTB are illustrated.

Figure 33:
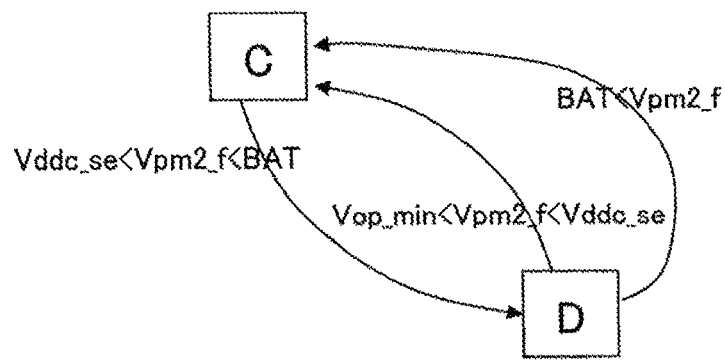
FIG. 33 is a state transition diagram illustrating a determination as to which electric power paths are in operation when one generating element (SC2) in state S3 is in a generating operation state.

FIG. 33 shows a state transition diagram for the determination as to which electric power paths are operating when one generating element (SC2) in state S3 is in a generating operation state.

In the example of FIG. 33, state transitions between the electric power paths PTC and PTD are illustrated.

Figure 34:
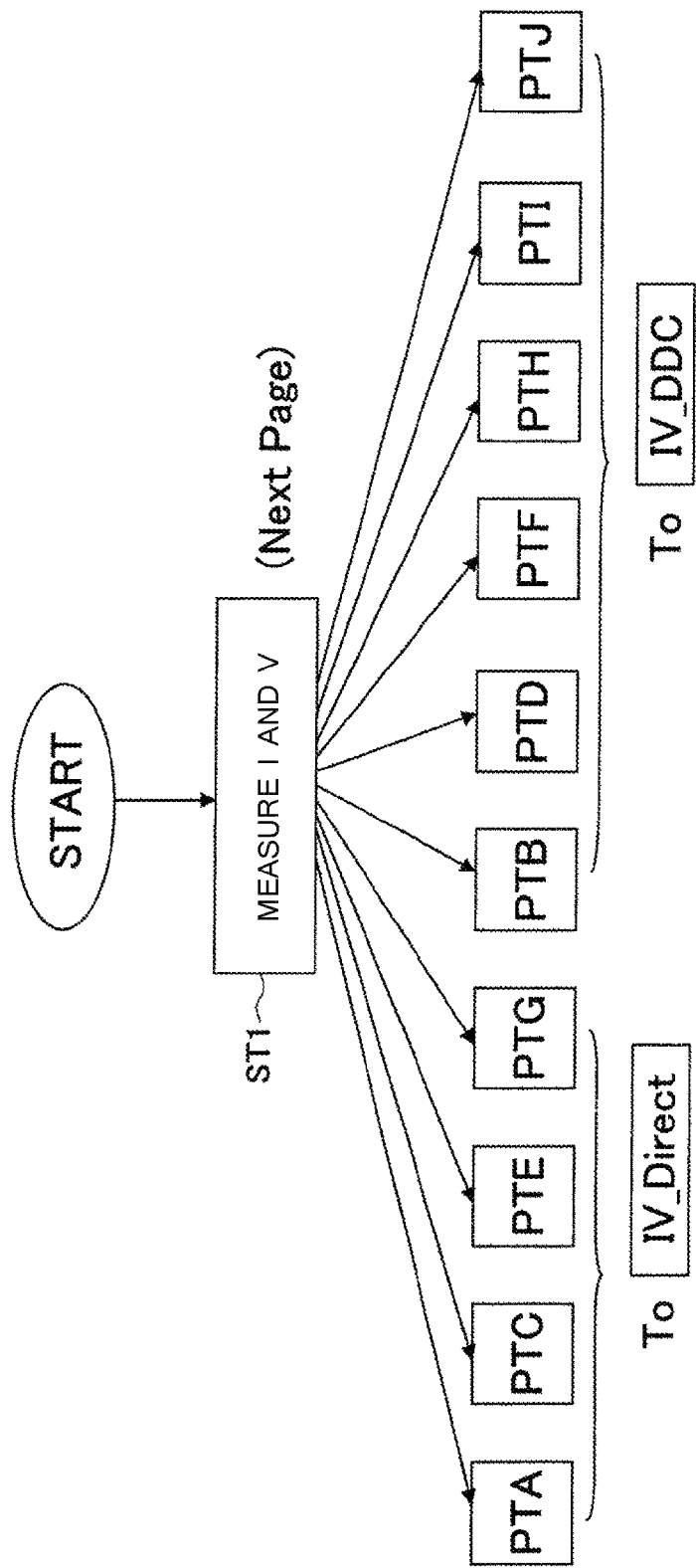
FIG. 34 is a flowchart illustrating in a simplified manner a process of selecting the electric power path from a result of measuring a short-circuit current and an open voltage.

FIG. 34 is a flowchart illustrating in a simplified manner a process of selecting the electric power path from a result of measuring the short-circuit current and the open voltage.

The short-circuit current Ish and the open voltage Vop are measured (ST1), and the electric power paths PTA to PTJ are selected on the basis of the result.

When the electric power path PTA, PTC, PTE, or PTG is selected, the electricity storage element 40 is directly fed without passing through the voltage conversion unit (DDC) 31.

When the electric power path PTB, PTD, PTF, PTH, PTI, or PTJ is selected, the electricity storage element 40 is fed with a voltage stepped-up (or stepped-down) via the voltage conversion unit (DDC) 31.

Figure 35:
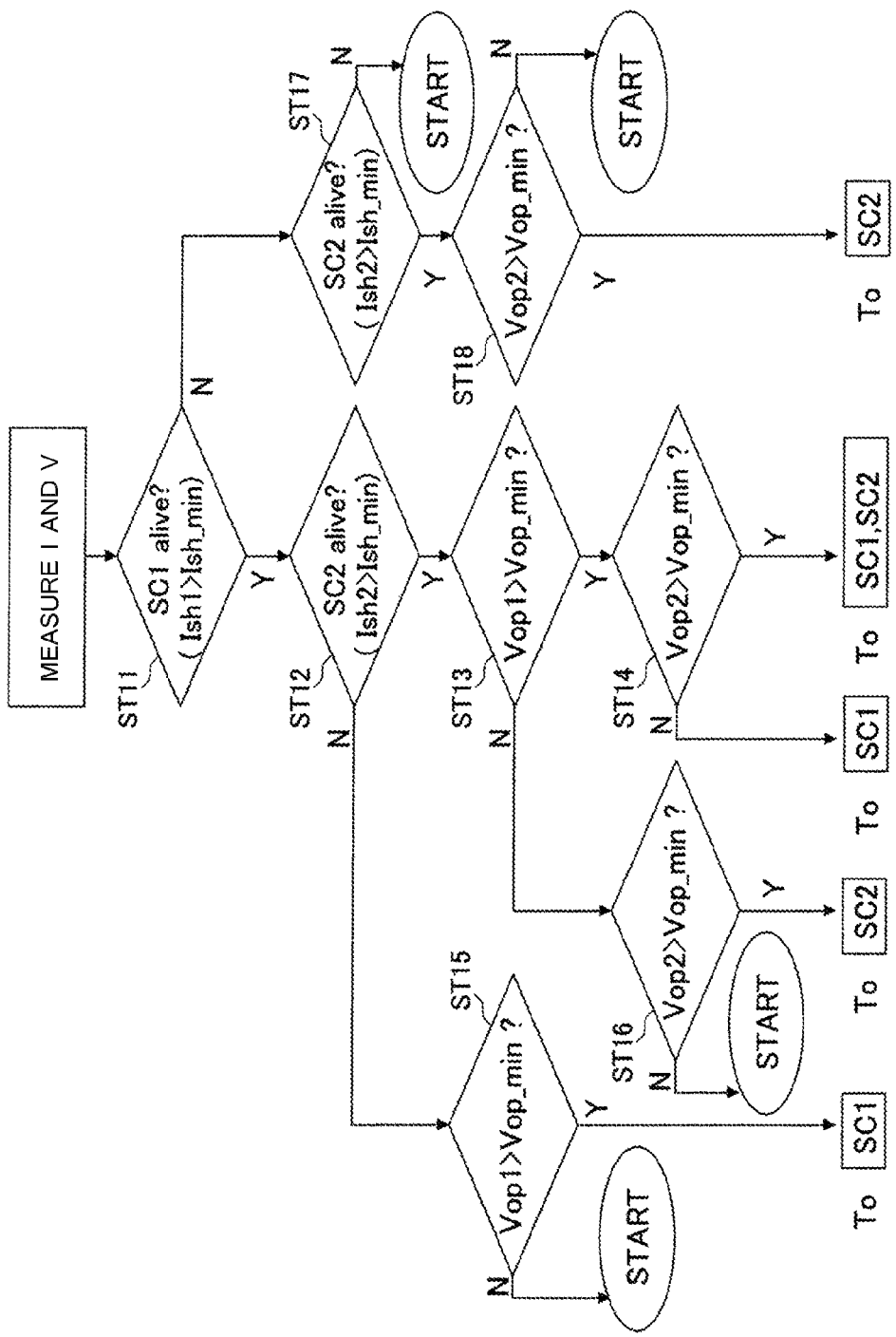
FIG. 35 is a first flowchart concretely illustrating the process selecting the electric power path from the result of measuring the short-circuit current and the open voltage.

FIG. 35 is a first flowchart concretely illustrating the process of selecting the electric power path from the result of measuring the short-circuit current and the open voltage.

Figure 36:
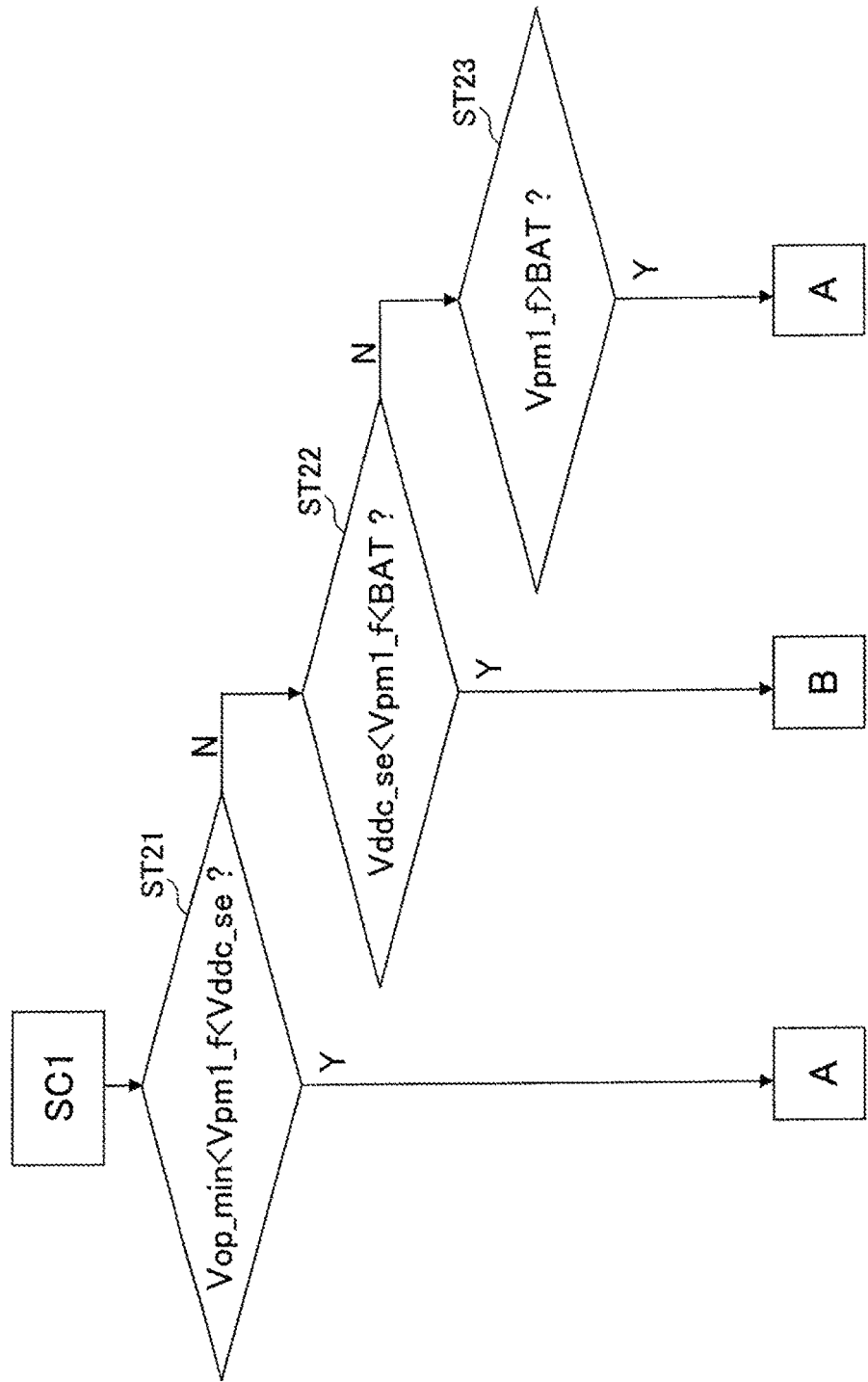
FIG. 36 is a second flowchart concretely illustrating the process of selecting the electric power path from the result of measuring the short-circuit current and the open voltage.

FIG. 36 is a second flowchart concretely illustrating the process of selecting the electric power path on the basis of the result of measuring the short-circuit current and the open voltage.

Figure 37:
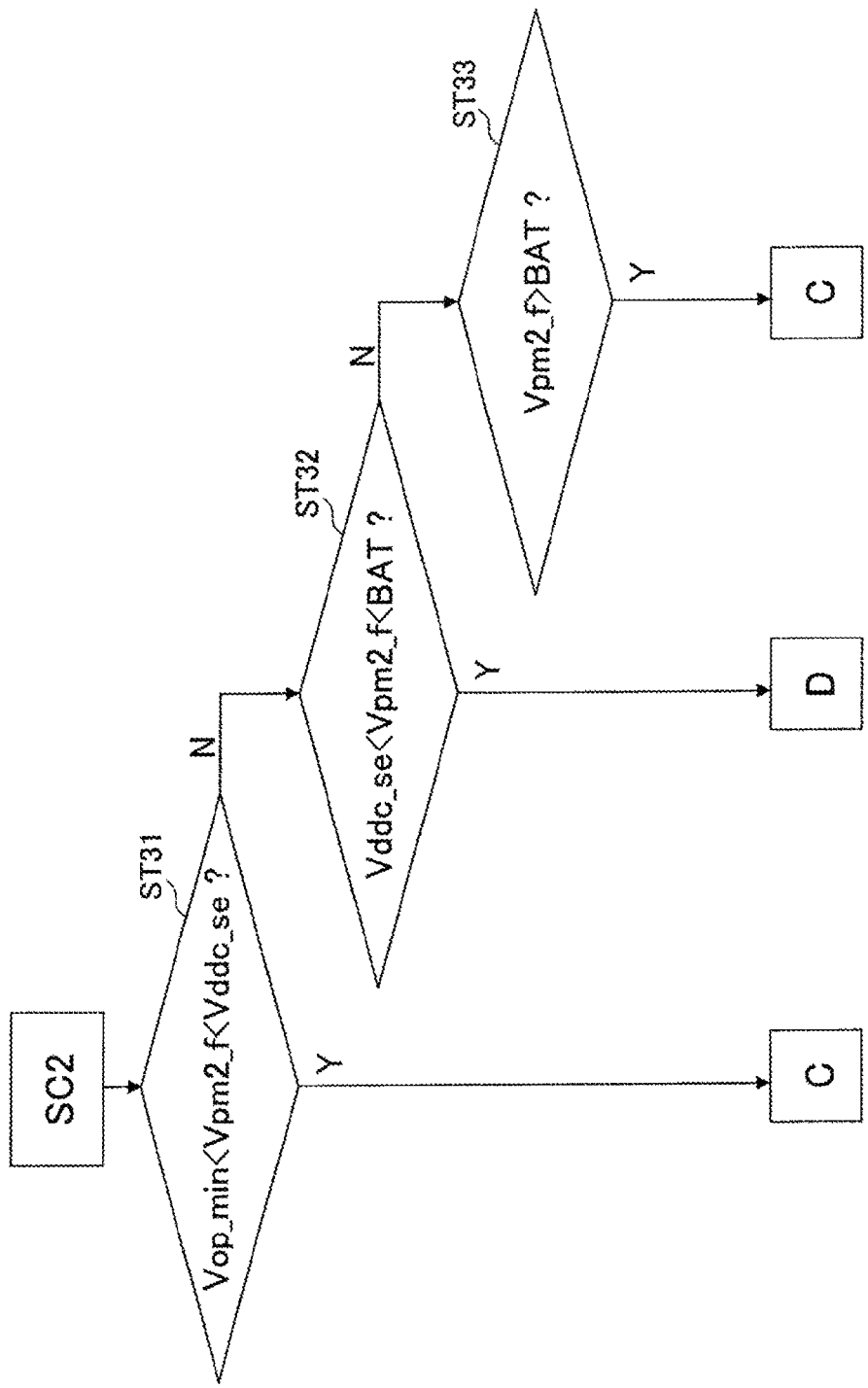
FIG. 37 is a third flowchart concretely illustrating the process of selecting the electric power path from the result of measuring the short-circuit current and the open voltage.

FIG. 37 is a third flowchart concretely illustrating the process of selecting the electric power path on the basis of the result of measuring the short-circuit current and the open voltage.

Figure 38:
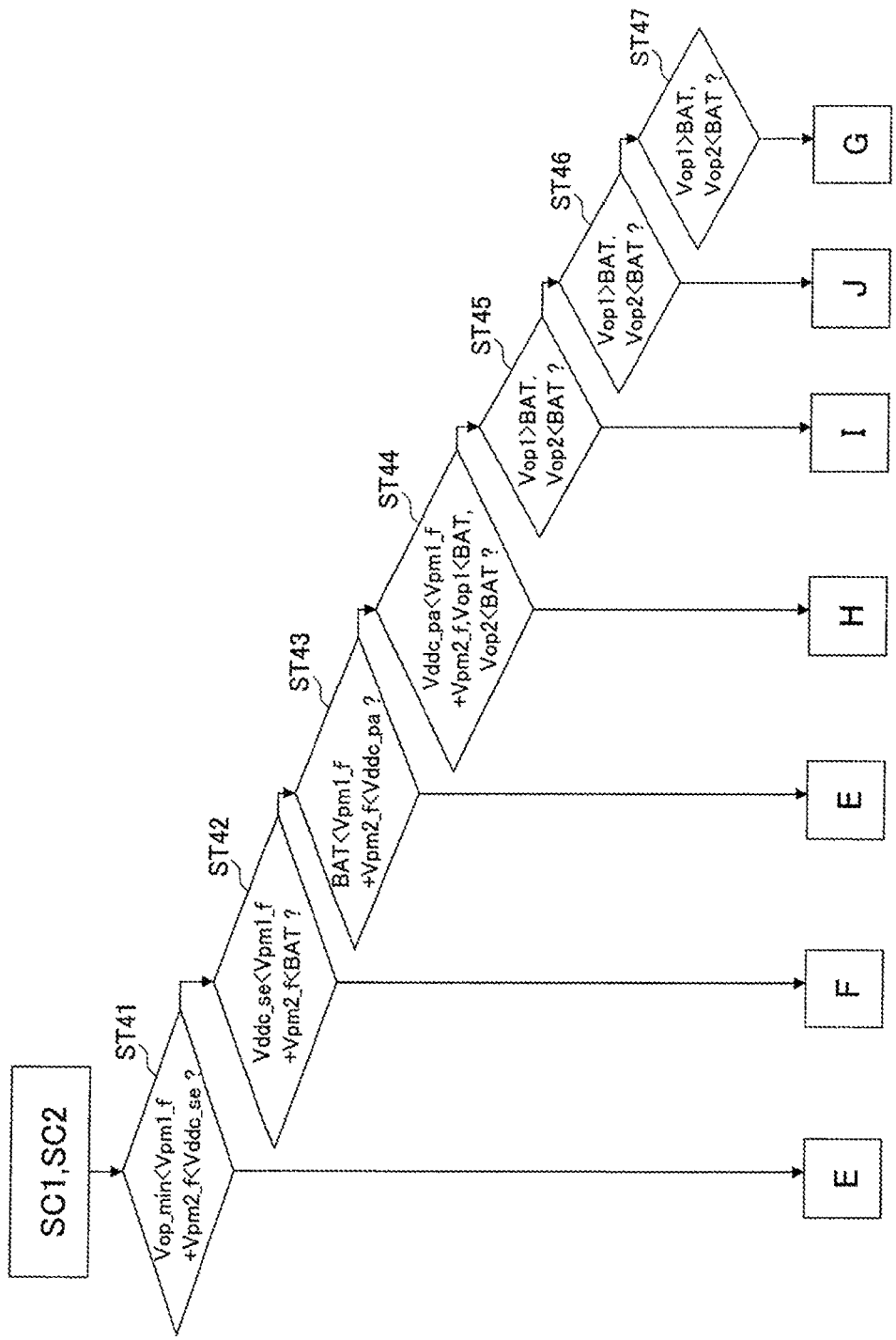
FIG. 38 is a fourth flowchart concretely illustrating the process of selecting the electric power path from the result of measuring the short-circuit current and the open voltage.

FIG. 38 is a fourth flowchart concretely illustrating the process of selecting the electric power path on the basis of the result of measuring the short-circuit current and the open voltage.

Referring to FIG. 35, it is first determined whether the short-circuit current Ish1 of the generating element (SC1) 20-1 is greater than the minimum short-circuit current Ish_min (Ish1>Ish_min), and then it is determined whether the generating element 20-1 is in a generating operation state (SC1 alive?) (ST11).

When it is determined in step ST11 that the generating element (SC1) 20-1 is in a generating operation state, it is determined whether the short-circuit current Ish2 of the generating element (SC1) 20-2 is greater than the minimum short-circuit current Ish_min (Ish2>Ish_min). Then, it is determined whether the generating element 20-2 is in a generating operation state (SC2 alive?) (ST12).

When it is determined in step ST12 that the generating element (SC1) 20-2 is in a generating operation state, the following determination process is performed.

Specifically, it is determined whether the open voltage Iop1 of the generating element (SC1) 20-1 is greater than the minimum open voltage Iop_min (Iop1>Iop_min), and it is determined whether the generating elements 20-1 is in a generating operation state (ST13).

When it is determined in step ST13 that the generating element (SC1) 20-1 is in a generating operation state, it is determined whether the open voltage Iop2 of the generating element (SC1) 20-2 is greater than the minimum open voltage Iop_min (Iop2>Iop_min). Then, it is determined whether the generating element 20-2 is in a generating operation state (ST14).

When a positive determination result is obtained in step ST14, the process proceeds to the process of FIG. 38, assuming that the two generating elements (SC1, SC2) 20-1 and 20-2 are in the operation state.

When a negative determination result is obtained in step ST14, the process proceeds to the process of FIG. 36, assuming that the generating element (SC1) is in the operation state.

When a negative determination result is obtained in step ST12, it is determined whether the open voltage Iop1 of the generating element (SC1) 20-1 is greater than the minimum open voltage Iop_min (Iop1>Iop_min), and it is determined whether the generating element 20-1 is in a generating operation state (ST15).

When a positive determination result is obtained in step ST15, the process proceeds to the process of FIG. 36 assuming that the generating element (SC1) is in the operation state.

When a negative determination result is obtained in step ST15, the process proceeds to a start-up process of the start-up circuit 38, assuming that the two generating elements (SC1, SC2) 20-1 and 20-2 are in a non-operation state.

When a negative determination result is obtained in step ST13, it is determined whether the open voltage Iop2 of the generating element (SC2) 20-2 is greater than the minimum open voltage Iop_min (Iop2>Iop_min), and it is determined whether the generating element 20-2 is in a generating operation state (ST16).

When a positive determination result is obtained in step ST16, the process proceeds to the process of FIG. 37 assuming that the generating element (SC2) is in the operation state.

When a negative determination result is obtained in step ST16, the process proceeds to the start-up process of the start-up circuit 38, assuming that the two generating elements (SC1, SC2) 20-1 and 20-2 are in a non-operation state.

When a negative determination result is obtained in step ST11, it is determined whether the short-circuit current Ish2 of the generating element (SC2) 20-2 is greater than the minimum short-circuit current Ish_min (Ish2>Ish_min), and it is determined whether the generating element 20-21 is in a generating operation state (SC2 alive?) (ST17).

When it is determined in step ST17 that the generating element (SC2) 20-2 is in a generating operation state, it is determined whether the open voltage Iop2 of the generating element (SC1) 20-2 is greater than the minimum open voltage Iop_min (Iop2>Iop_min) (ST18).

When a positive determination result is obtained in step ST18, the process proceeds to the process of FIG. 37, assuming that the generating element (SC2) is in the operation state.

When a negative determination result is obtained in step ST17 or ST18, the process proceeds to the start-up process of the start-up circuit 38, assuming that the two generating elements (SC1, SC2) 20-1 and 20-2 are in a non-operation state.

In FIG. 36, the following process is performed.

First, when the open voltage is Vop1, it is determined whether an expected voltage Vpm1_f of the generating element (SC1) 20-1 at the time of MPPT control is greater than the minimum open voltage Vop_min and smaller than the open voltage Vddc_se as the threshold value for performing connection change (ST21).

When a positive determination result is obtained in step ST21, the electric power path PTA is selected.

When a negative determination result is obtained in step ST21, it is determined whether the voltage Vpm1_f is greater than the open voltage Vddc_se as the threshold value for performing connection change and smaller than the voltage BAT of the electricity storage element 40 (ST22).

When a positive determination result is obtained in step ST22, the electric power path PTB is selected.

When a negative determination result is obtained in step ST22, it is determined whether the voltage Vpm1_f is greater than the voltage BAT of the electricity storage element 40 (ST23).

When a positive determination result is obtained in step ST23, the electric power path PTA is selected.

In FIG. 37, the following process is performed.

First, when the open voltage is Vop2, it is determined whether the expected voltage Vpm2_f of the generating element (SC2) 20-2 at the time of MPPT control is greater than the minimum open voltage Vop_min and smaller than the open voltage Vddc_se as the threshold value for performing connection change (ST31).

When a positive determination result is obtained in step ST31, the electric power path PTC is selected.

When a negative determination result is obtained in step ST31, it is determined whether the voltage Vpm2_f is greater than the open voltage Vddc_se as the threshold value for performing connection change and smaller than the voltage BAT of the electricity storage element 40 (ST32).

When a positive determination result is obtained in step ST32, the electric power path PTD is selected.

When a negative determination result is obtained in step ST32, it is determined whether the voltage Vpm2_f is greater than the voltage BAT of the electricity storage element 40 (ST33).

When a positive determination result is obtained in step ST33, the electric power path PTC is selected.

In FIG. 38, the following process is performed.

First, it is determined whether a sum voltage of the voltage Vpm1_f and the voltage Vpm2_f is greater than the minimum open voltage Vop_min and smaller than the open voltage Vddc_se as the threshold value for performing connection change (ST41).

When a positive determination result is obtained in step ST41, the electric power path PTE is selected.

When a negative determination result is obtained in step ST41, it is determined whether the sum voltage of the voltage Vpm1_f and the voltage Vpm2_f is greater than the open voltage Vddc_se as the threshold value for performing connection change and smaller than the voltage BAT of the electricity storage element 40 (ST42).

When a positive determination result is obtained in step ST42, the electric power path PTF is selected.

When a negative determination result is obtained in step ST42, it is determined whether the sum voltage of the voltage Vpm1_f and the voltage Vpm2_f is greater than the voltage BAT of the electricity storage element 40 and smaller than the open voltage Vddc_pa as the threshold value for performing connection change (ST43).

When a positive determination result is obtained in step ST43, the electric power path PTE is selected.

When a negative determination result is obtained in step ST43, it is determined whether the sum voltage of the voltage Vpm1_f and the voltage Vpm2_f is smaller than the open voltage Vddc_pa as the threshold value for performing connection change (ST44). In step ST44, it is further determined whether the open voltages Vop1 and Vop2 are smaller than the voltage BAT of the electricity storage element 40 (ST44).

When a positive determination result is obtained in step ST44, the electric power path PTH is selected.

When a negative determination result is obtained in step ST44, it is determined whether the open voltage Vop1 is greater than the voltage BAT of the electricity storage element 40, and whether the open voltage Vop2 is smaller than the voltage BAT of the electricity storage element 40 (ST45).

When a positive determination result is obtained in step ST45, the electric power path PTI is selected.

When a negative determination result is obtained in step ST45, it is determined whether the open voltage Vop1 is greater than the voltage BAT of the electricity storage element 40 and whether the open voltage Vop2 is smaller than the voltage BAT of the electricity storage element 40 (ST46).

When a positive determination result is obtained in step ST46, the electric power path PTJ is selected.

When a negative determination result is obtained in step ST46, it is determined whether the open voltage Vop1 is greater than the voltage BAT of the electricity storage element 40, and whether the open voltage Vop2 is smaller than the voltage BAT of the electricity storage element 40 (ST47).

When a positive determination result is obtained in step ST47, the electric power path PTG is selected.

When the first control unit 34 is notified by the second control unit 35 that the charging process is terminated, the first control unit 34 opens all of the switches of the power switch circuit 32 so as to shut down the connection between the outputs from the generating elements 20-1 and 20-2 and the voltage supply line LV1.

When the generating elements 20-1 and 20-2 are controlled to be connected in parallel by the power switch circuit 32, the first control unit 34 turns off the backflow prevention function of the backflow prevention circuit 36.

<4-3. Concrete Configuration Example of Characteristics Measurement Circuit>

[First Configuration Example of Characteristics Measurement Circuit]

Figure 39:
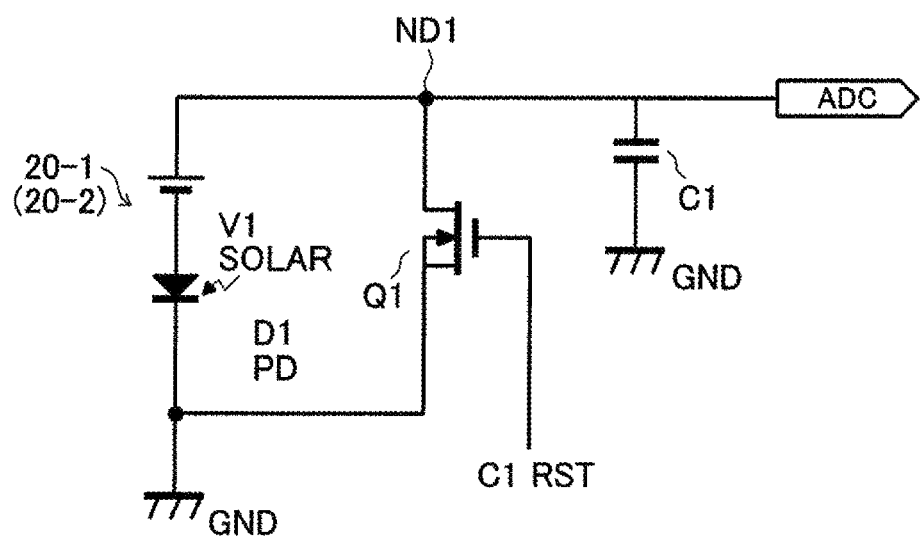
FIG. 39 is a circuit diagram of a first configuration example of a characteristics measurement circuit according to the present embodiment.

FIG. 39 shows a circuit diagram of a first configuration example of the characteristics measurement circuit according to the present embodiment.

In order to monitor the operating characteristics of the generating element and determine how much current and voltage are being generated by the generating element (solar battery) depending on the instantaneous condition of light, it is necessary to measure fine variations of the current and voltage.

In the past, a conventional method has been to amplify variations of current or voltage by connecting an amplifier, for example.

In the present example, as a means of determining how much current and voltage are being generated by the generating elements (solar batteries) 20-1 and 20-2, measurement is made by using a capacitor C1.

In the present example, as shown in FIG. 39, the capacitor C1 is connected in series to the generating elements (solar batteries) 20-1 and 20-2.

In a characteristics side circuit 33A shown in FIG. 39, a switching transistor Q1 for resetting the capacitor C1 is connected between a connection node ND1 and a reference potential VSS.

The switching transistor Q1 is formed of an NMOSFET to the gate of which a reset signal RST is selectively supplied.

By measuring the charging voltage to the capacitor C1 at certain time intervals, the I-V characteristics under the current environment can be measured.

$$V = Q/C, Q = \int i(t)dt \quad \text{[Expression 1]}$$

In the characteristics side circuit 33A, it is possible to search for the MPP even when the characteristics are not simple convex P-V characteristics, and control can be exerted by a voltage regulation method without performing the so-called hill-climbing process.

This is particularly effective when the MPP estimation from the open voltage is insufficient.

Further, by diverting the capacitor of the step-up circuit of the voltage conversion unit 31, the measurement can be made without using additional components.

Figure 40:
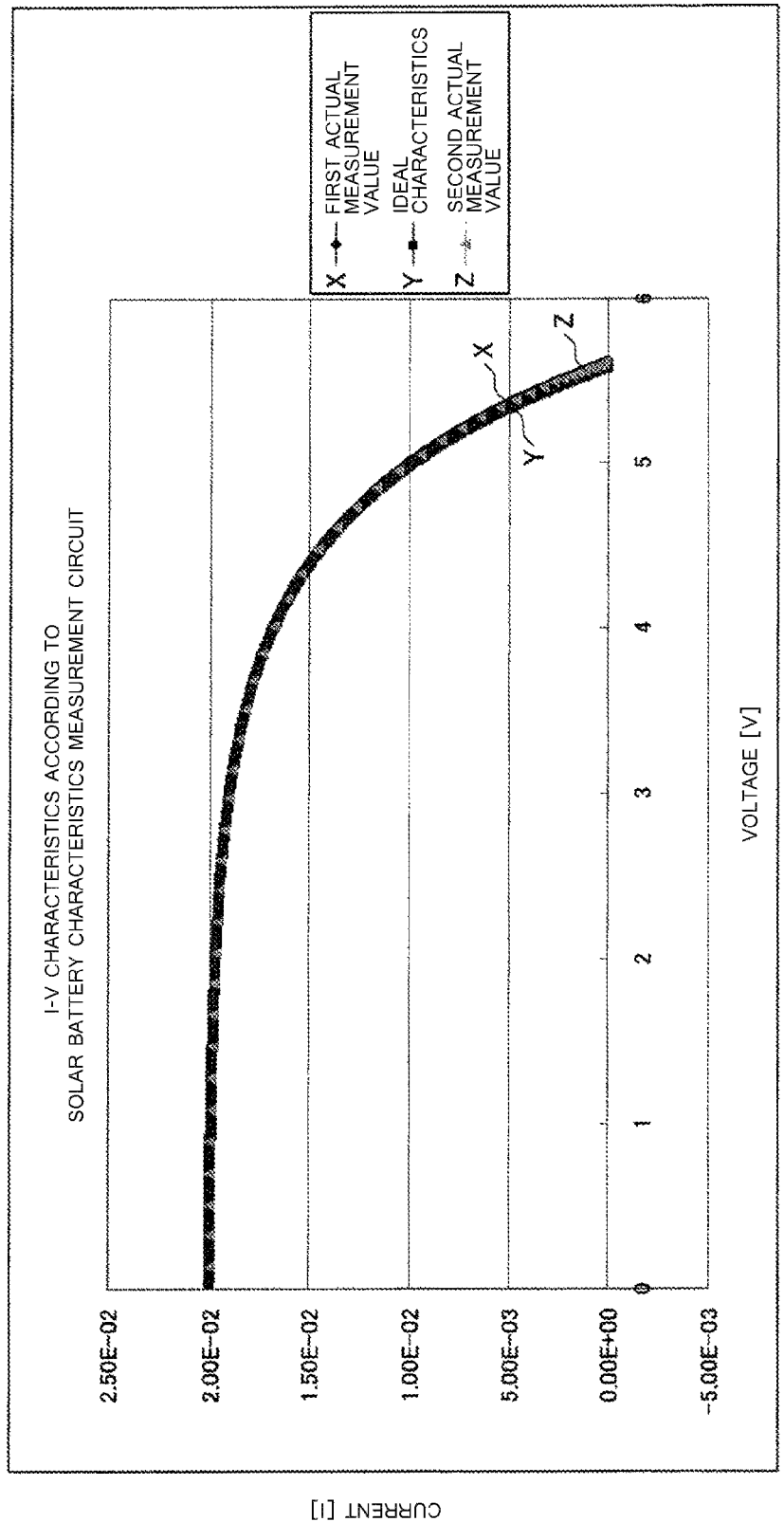
FIG. 40 is a diagram showing I-V characteristics obtained by simulation by diverting a capacitor in a step-up circuit in the characteristics measurement circuit according to the present embodiment.

FIG. 40 shows the I-V characteristics obtained by simulation where the capacitor of the step-up circuit is diverted in the characteristics measurement circuit according to the present embodiment.

In FIG. 40, the horizontal axis shows voltage and the vertical axis shows current.

In FIG. 40, a curve X indicates first actual measurement values at a first sample number; a curve Y indicates ideal characteristics; and a curve Y indicates second actual measurement values at a second sample number.

As shown in FIG. 40, the I-V characteristics can be obtained at realistic sampling intervals by simulation.

[Second Configuration Example of Characteristics Measurement Circuit]

Figure 41:
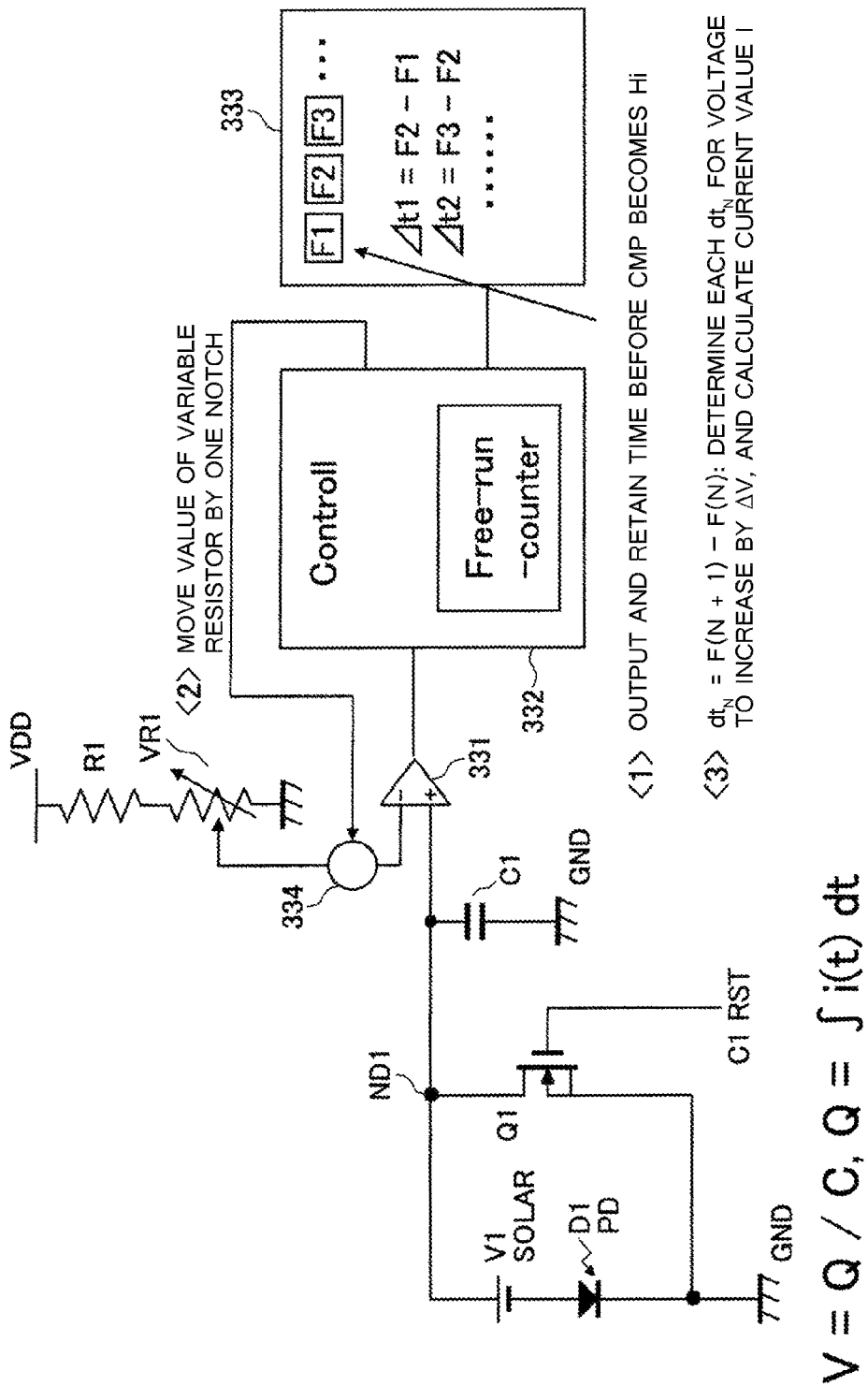
FIG. 41 is a circuit diagram of a second configuration example of the characteristics measurement circuit according to the present embodiment.

FIG. 41 shows a circuit diagram of a second configuration example of the characteristics measurement circuit according to the present embodiment.

As shown in FIG. 41, in the present example, as in the example of FIG. 39, the capacitor C1 is connected in series to the generating elements (solar batteries) 20-1 and 20-2.

The characteristics measurement circuit 33B of FIG. 41 further includes a comparator 331, controller 332, a timer 333, a variable memory unit 334, a resistor R1, and a variable resistor VR1.

The resistor R1 and the variable resistor VR1 are connected in series between a power supply potential VDD and the reference potential VSS (such as GND).

In the FIG. 41,

<1> Output and Retain the time before which CMP becomes Hi

<2> Move value of variable resistor by one notch

<3> dt=F(N+1)–F(N): determine each dt for voltage to increase by ΔV, and calculate current value I In the characteristics measurement circuit 33B, the step-up circuit of the voltage conversion unit 31 is not connected, or the step-up MOSFET is turned off.

The capacitor C1 on the generating element (solar battery) side is short-circuited to the ground GND and thus discharged to 0 V by setting the switching transistor Q1 in on-state.

The switching transistor Q1 is turned off and an initial comparison voltage value is input to the non-inverting input terminal (+) of the comparator 331.

The time before the output from the comparator 331 turns high (Hi) is counted by a counter 3321 of the controller 332.

In-between values are linearly interpolated on the basis of the time and the comparison voltage value.

In this case, the voltage is simply linearly interpolated.

The current is determined according to Expression 4.

To the comparison voltage value, ΔV is added.

The process is repeated as long as the output from the comparator 331 is at low level (=until the comparison voltage value exceeds the open voltage).

According to the characteristics measurement circuit 33B of FIG. 41, the DAC and the comparator can be diverted to AD conversion, so that the need for an ADC can be eliminated and the required area can be reduced.

Further, the comparison voltage value can be set roughly, so that the electric power required for obtaining characteristics can be decreased.

[Third Configuration Example of Characteristics Measurement Circuit]

Figure 42:
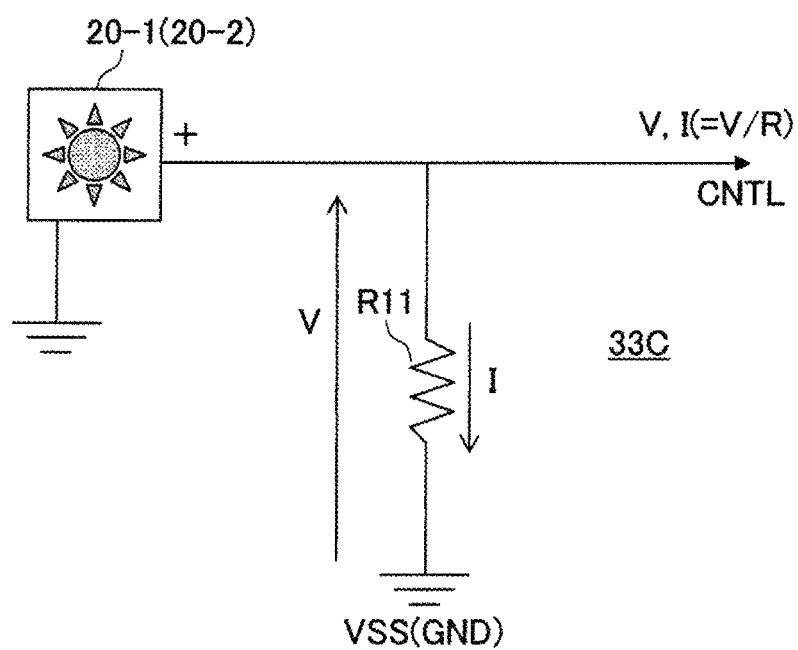
FIG. 42 is a circuit diagram of a third configuration example of the characteristics measurement circuit according to the present embodiment.

FIG. 42 shows a circuit diagram of a third configuration example of the characteristics measurement circuit according to the present embodiment.

In the present example, as a means of determining how much current and voltage are being generated by the generating elements (solar batteries) 20-1 and 20-2, measurement is made by using a resistor R11.

According to the characteristics measurement circuit 33C of FIG. 42, the measurement can be made without adding an amplifier or the like.

Because only the resistor R11 is added, circuit size increase can be minimized.

Compared to the method using a capacitor, less time is required for measurement, so that it is suitable for measurement during a charging operation of actual generating elements (solar batteries).

[Fourth Configuration Example of Characteristics Measurement Circuit]

Figure 43:
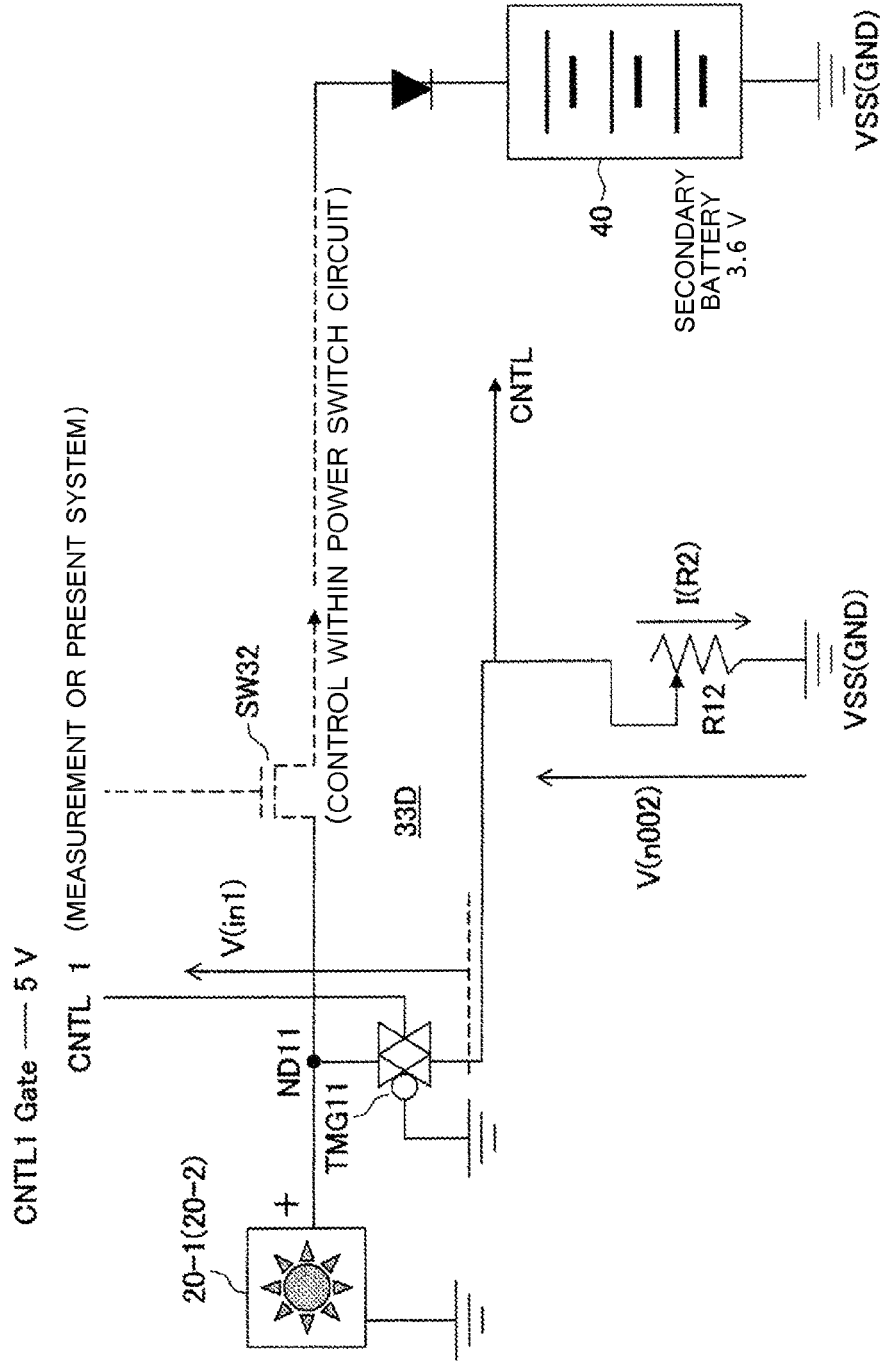
FIG. 43 is a circuit diagram of a fourth configuration example of the characteristics measurement circuit according to the present embodiment.

FIG. 43 shows a circuit diagram of a fourth configuration example of the characteristics measurement circuit according to the present embodiment.

In the characteristics measurement circuit 33D of FIG. 43, instead of simply connecting a resistor to the output of the generating elements (solar batteries) 20-1 and 20-2, the output is connected to a resistor ladder R12 via a transmission gate TMG11.

The transmission gate TMG11 is on- or off-controlled by a control signal CNTL1.

The characteristics measurement circuit 33D is configured such that the measurement is made in a state electrically separated from the power switch circuit 32.

Figure 44:
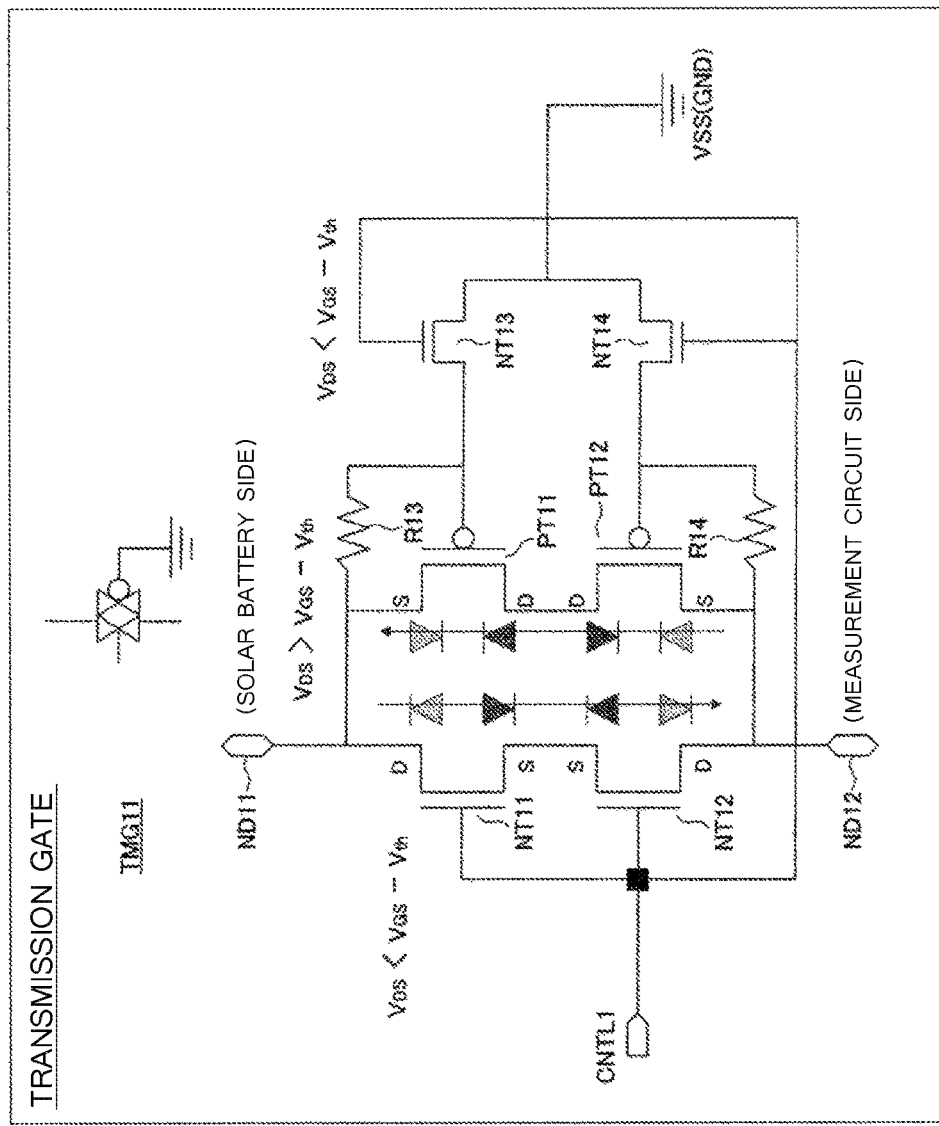
FIG. 44 is a circuit diagram of a concrete configuration example of a transmission gate of the characteristics measurement circuit of FIG. 43.

FIG. 44 shows a circuit diagram of a concrete configuration example of the transmission gate of the characteristics measurement circuit 33D of FIG. 43.

The transmission gate TMG11 includes NMOSFETs NT11, NT12, NT13, and NT14, PMOSFETs PT11 and PT12, and resistors R13 and R14.

In the transmission gate TMG11, the NMOSFETs NT11 and NT12 are connected in series between a connection node ND11 for connection with the generating element and a node ND12 on the characteristics measurement circuit 33D side.

Similarly, in the transmission gate TMG11, the PMOSFETs PT11 and PT12 are connected in series between the connection node ND11 for connection with the generating element and the node ND12 on the characteristics measurement circuit 33D side.

Between the gate of the PMOSFET PT11 and the reference potential VSS, the NMOSFET NT13 is connected. Between the gate of the PMOSFET PT12 and the reference potential VSS, the NMOSFET NT14 is connected.

The node ND11 is connected to the gate of the PMOSFET PT11 via the resistor R13. Similarly, the node ND12 is connected to the gate of the PMOSFET PT12 via the resistor R14.

The gates of the NMOSFETs NT11, NT12, NT13, and NT14 are connected to a supply line for the control signal CNTL1.

In the transmission gate TMG11 with the above configuration, there is no flow because of an opposed-diode structure.

When a drain-source voltage VDS is large, the PMOSFET side conducts. When the drain-source voltage VDS is small, the NMOSFET side conducts.

In the present example, the generating elements (solar batteries) 20-1 and 20-2 are disconnected from the power switch circuit 32 by controlling the switch SW32 in the power switch circuit 32.

In this state, the generating elements (solar batteries) 20-1 and 20-2 and the characteristics measurement circuit 33D are connected by turning on the transmission gate TMG11 by the control signal CNTL1.

Then, a voltage V(n002) applied to the variable resistor (ladder resistor) R12 is measured.

According to I(R2)=V(n002)/R12, I-V is determined.

Figure 45:
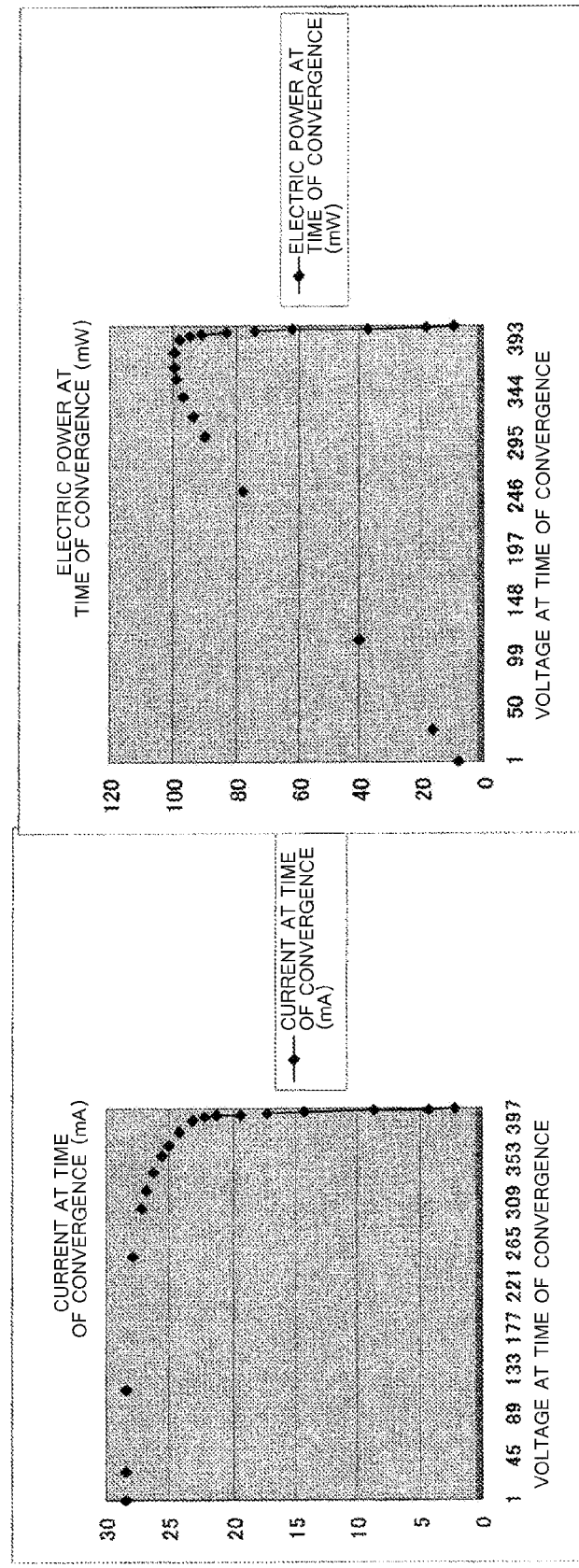
FIG. 45 is a diagram showing a simulation result obtained by the characteristics measurement circuit of FIG. 43.

FIG. 45 shows a simulation result obtained by the characteristics measurement circuit of FIG. 43.

As shown in FIG. 45, according to the characteristics measurement circuit of FIG. 43, good simulation results can be obtained.

<4-4. Concrete Configuration Example of Voltage Conversion Unit>

[First Configuration Example of Voltage Conversion Unit]

Figure 46:
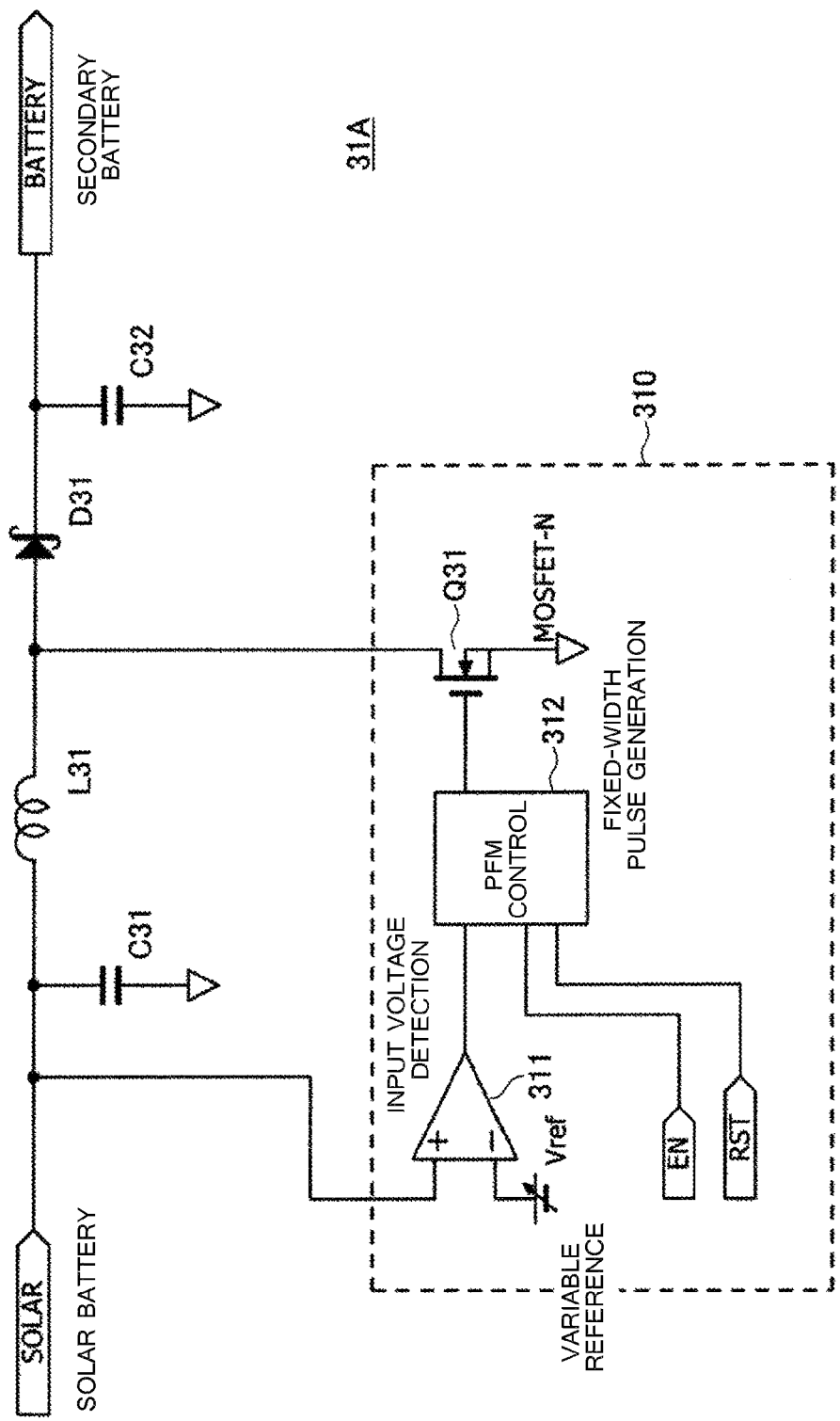
FIG. 46 is a circuit diagram of a basic configuration example of a step-up type switching regulator as a voltage conversion unit according to the present embodiment.

FIG. 46 shows a circuit diagram of a basic configuration example of a step-up type switching regulator as the voltage conversion unit according to the present embodiment.

The switching regulator 31A includes a generating element side capacitor C31, an inductor L31, a diode D31, a secondary battery side capacitor C32, and an operating voltage control unit 310 as major constituent elements.

The operating voltage control unit 310 includes a switching transistor (SW) Q31, a comparator 311 as an input voltage detection unit, and a PFM (pulse frequency modulation) control unit 312.

The comparator 311 compares a variable reference voltage Vref supplied from the first control unit 34 with a voltage generated by the generating elements (solar batteries) 20, i.e., an input voltage V1.

The comparator 310 switches its output to high level when the input voltage V1 exceeds the reference voltage Vref.

The PFM control unit 312 generates a pulse with a fixed width in response to the output from the comparator 311 and turns on the switching transistor Q31 for a predetermined time.

The PFM control unit 312 is configured such that it can be placed in an enable state by an enable signal EN and reset by a reset signal RST.

Figure 47:
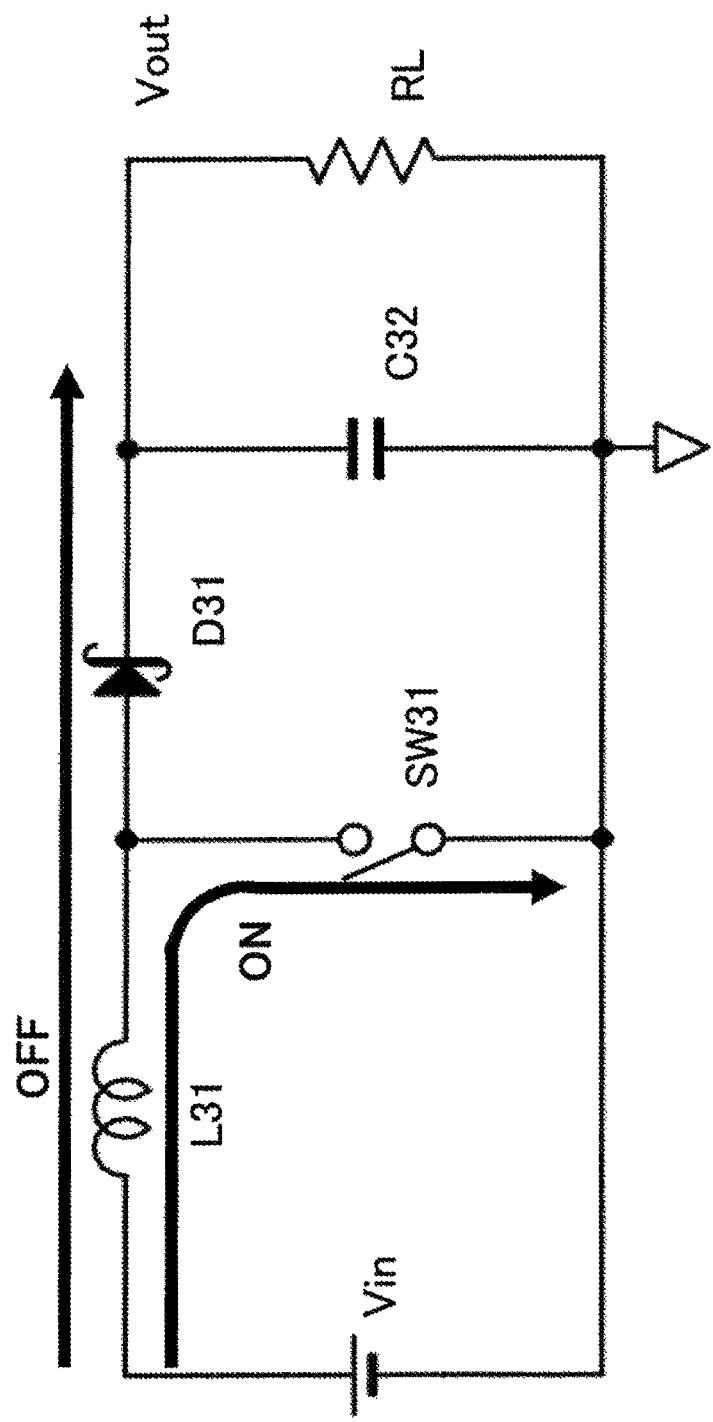
FIG. 47 is a diagram illustrating a basic operation of the step-up type switching regulator.

FIG. 47 illustrates a basic operation of the step-up type switching regulator.

The step-up type switching regulator performs a switching operation by self-excited oscillation.

The operating point (operating voltage) of the generating elements (solar batteries) 20 connected to the input is controlled.

The input is a voltage generated by the generating elements 20, and the output is the electricity storage element 40 (secondary battery (Li+battery). The MPPT is performed by an operating point control of the generating elements (solar batteries) 20-1 and 20-2.

Basically, in the step-up type switching regulator as shown in FIG. 47, energy is stored in the inductor L31 by a current that flows in when the switching transistor W31 is turned on.

When the switching transistor Q31 is turned off, the energy stored in the inductor L31 is released.

Thus, the energy of the inductor L31 is added to the input voltage V1. As a result, the input voltage is stepped up.

Next, an operation of the step-up type switching regulator of FIG. 46 according to the present embodiment will be described on the basis of the basic operation.

Figure 48:
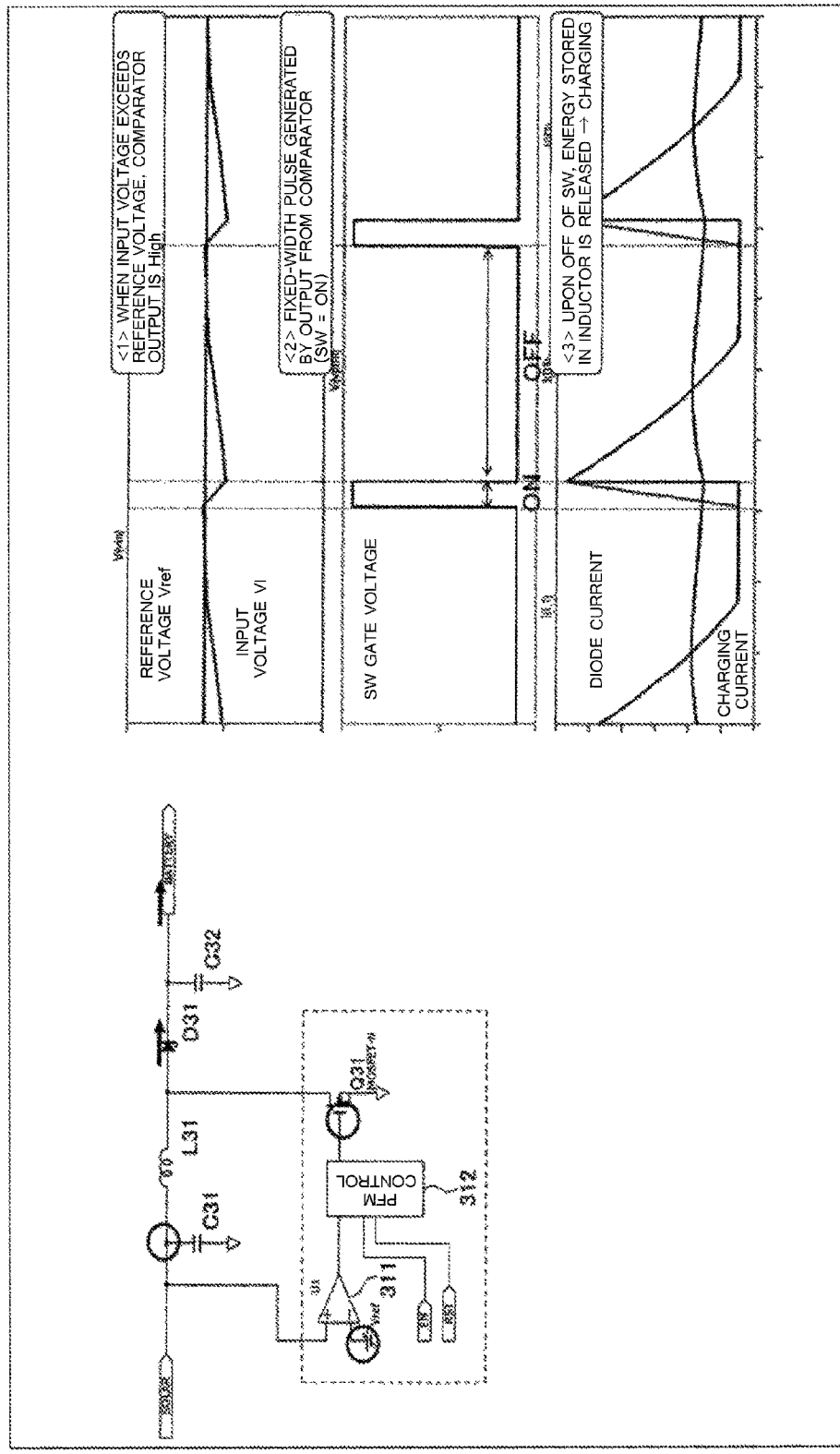
FIG. 48 is a diagram illustrating an operation of the step-up type switching regulator of FIG. 46.

FIG. 48 illustrates the operation of the step-up type switching regulator of FIG. 46.

<1> When the input voltage V1 exceeds the reference voltage Vref, the output from the comparator 311 turns to high level.

<2> In response to the output from the comparator 311, the PFM control unit 312 generates a pulse with a fixed width (SW=on). Thus, the energy in the inductor L31 is released.

<3> When the input voltage V1 becomes lower than the reference voltage Vref, the output from the comparator 311 turns to low level and the switching transistor Q313 is turned off.

Thus, the operation turns from the emission of energy stored in the inductor 31 to the charging of energy into the inductor L31.

The above operation is repeated.

In this case, the generating elements (solar batteries) 20-1 and 20-2 operate at voltages around the reference voltage Vref.

The reference voltage Vref can be varied by the first control unit 34 so as to control the operating point (operating voltage) of the generating elements (solar batteries) 20-1 and 20-2.

According to the present embodiment, a shut-down function may be provided for shutting down the comparator or the PFM control circuit when no stepping-up is performed.

It is also possible to provide a reset function for resetting when, as described above, self-excited oscillation is stopped for one reason or another.

The on-time of the switching transistor Q31 affects the peak current of the inductor L31. Thus, the embodiment may be configured such that the on-time is varied depending on the input current or the generating element (solar battery) that is connected.

The PFM pulse width (switch-on time) needs to be adjusted such that the peak current of the inductor L31 is within a certain range.

Preferably, selection may be made from a plurality of types in each range from the viewpoint of rating, noise, efficiency, and the like.

The voltage conversion unit may be configured as described below.

A change in surrounding environment is detected from a change in the switching frequency.

In this case, the number of times of switching is counted at Δt intervals and a difference from the previous count is determined.

In the measurement of the switching, since the increased frequency is equivalent to increased amount of electricity generated, the reference voltage Vref is changed and the path is switched.

When the frequency decreases, namely, the amount of electricity is decreased, the reference voltage Vref is changed in response, the path is switched, and the step-up operation is terminated.

Also, the current is measured from the switching frequency.

When the reference voltage Vref and the on-time of the switching transistor Q31 are fixed, the switching frequency depends on the input current.

Thus, the current can be calculated from the switching frequency.

A concrete configuration example in which the reference voltage Vref is changed depending on the increase or decrease in switching frequency will be described.

Figure 49:
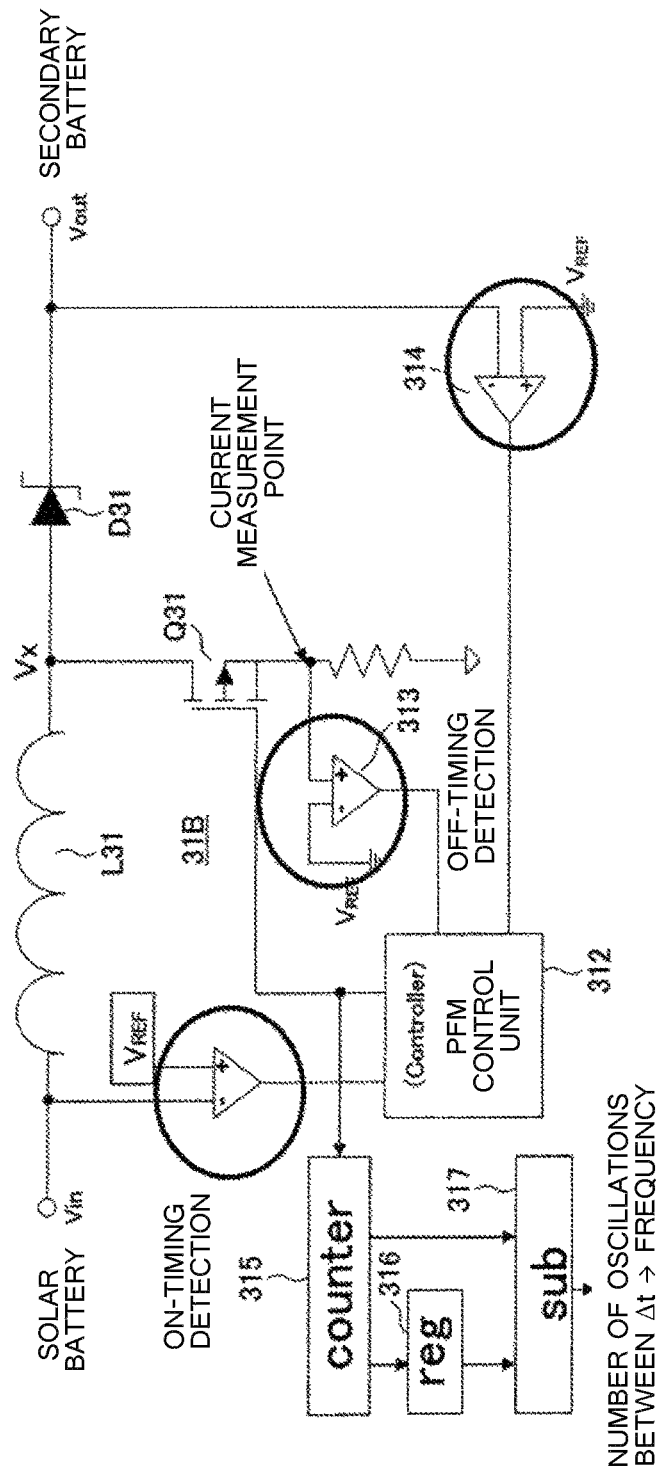
FIG. 49 is a circuit diagram of a configuration example of a step-up type switching regulator with a detection system for detecting a change in the operation frequency of a PFM control unit of FIG. 46.

FIG. 49 shows a circuit diagram of a configuration example of the step-up type switching regulator provided with a detection system for detecting a change in the operation frequency in the PFM control unit of FIG. 46.

In FIG. 49, for ease of understanding, constituent portions similar to those shown in FIG. 46 will be designated with similar reference signs.

A switching regulator 31B shown in FIG. 49 includes, in addition to the configuration of FIG. 46, an off-timing detection unit 313, a charging end detection unit 314, a counter 315, a register 316, and a subtractor 317.

The off-timing detection unit 313 and the charging end detection unit 314 may be constructed of comparators.

A resistor R31 is connected between the source of the switching transistor Q31 and the reference potential VSS, and the connection point thereof forms a node ND31.

The off-timing detection unit 313 compares the threshold value Vref1 with the potential of the node ND31 so as to detect the off-timing of the switching transistor Q31, and outputs the detected result to the PFM control unit 312.

The charging end detection unit 314 compares the output voltage (cathode-side potential of the diode) with the threshold value Vref2 so as to detect the end of charging, and outputs the detected result to the PFM control unit 312.

As the current through the generating elements 20-1 and 20-2, i.e., solar batteries, changes (change in illuminance), the operation frequency of the PFM control unit 312, which is a transformer circuit, changes.

As the current through the generating elements 20-1 and 20-2 changes (change in illuminance), the charging time of the inductor L31 changes. In this case, the greater the current, the shorter the charging time will be.

When the transformer circuit (PFM) is used, the change in illuminance can be measured on the basis of the change in switching frequency.

Compared to a technique involving the measurement of the open voltage by periodically stopping the PFM control unit 312, i.e., the transformer circuit, this technique does not require an ADC, thus this technique being capable of executing control by using a change in low-electric power frequency as a trigger.

In the example of FIG. 49, the frequency can be measured by counting the gate control signal of the switching transistor Q31 using the counter 315.

It can be determined that the greater the current through the generating elements 20-1 and 20-2, i.e., the solar batteries, the higher the frequency is.

It can be determined that as the current through the generating elements 20-1 and 20-2, i.e., the solar batteries, is smaller, the frequency is lower or that the switching is in a terminated state.

When the change in the frequency is equal to or more than a predetermined value under the control of the control unit of the first control unit 34, the measurement of the I-V characteristics (or the short-circuit current) is performed again and the MPPT control is performed again.

It may be configured to perform the measurement again when the change is increased.

The measurement of the frequency can be achieved by counting the switching pulse signal of the PFM control unit 312, i.e., the transformer circuit, by the counter 315, polling the counter value at M intervals, and then determining a difference using the subtractor 317.

By using a tracking trigger as the change in frequency, the number of times of measurement of the MPPT error and control electric power can be reduced.

It is also possible to conduct the MTTP control in accordance with a temperature change.

Figure 50:
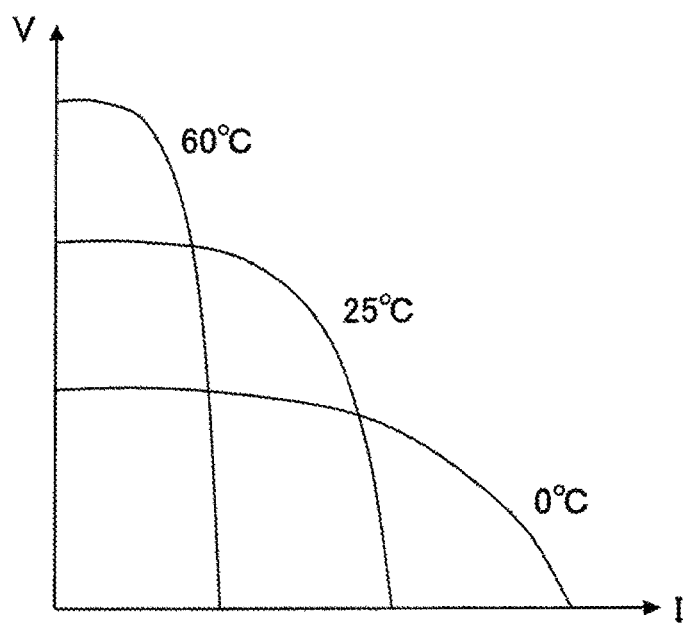
FIG. 50 is a diagram illustrating variations of the I-V characteristics of the generating elements (solar batteries) depending on temperature changes.

FIG. 50 shows changes in the I-V characteristics of the generating elements (solar batteries) in accordance with temperature changes.

As shown in FIG. 50, the I-V characteristics of the generating elements (solar batteries) are varied in accordance with temperature changes. Thus, the thermistor 50 is monitored by the second control unit 35, and the detected temperature information is supplied to the first control unit 34.

The first control unit 34 selects a coefficient that is associated with a temperature in advance, in accordance with the temperature information. The first control unit 34 then multiplies the reference voltage Vref for the MTTP control, for example, with the coefficient, and performs the MTTP control in such a manner as to track the temperature conversion.

In this case, various embodiments are possible. For example, in one embodiment, a normal MTTP control is performed in a normal temperature range of ±10 to 15 with respect to room temperature of 25° C., a first coefficient is used in a temperature range higher than the normal temperature range, and a second coefficient is used in a lower temperature range.

The MTTP control may be applied not just to the control of the voltage conversion unit 31 but also to the connection switching of the electric power path of the power switch circuit 32.

Figure 51:
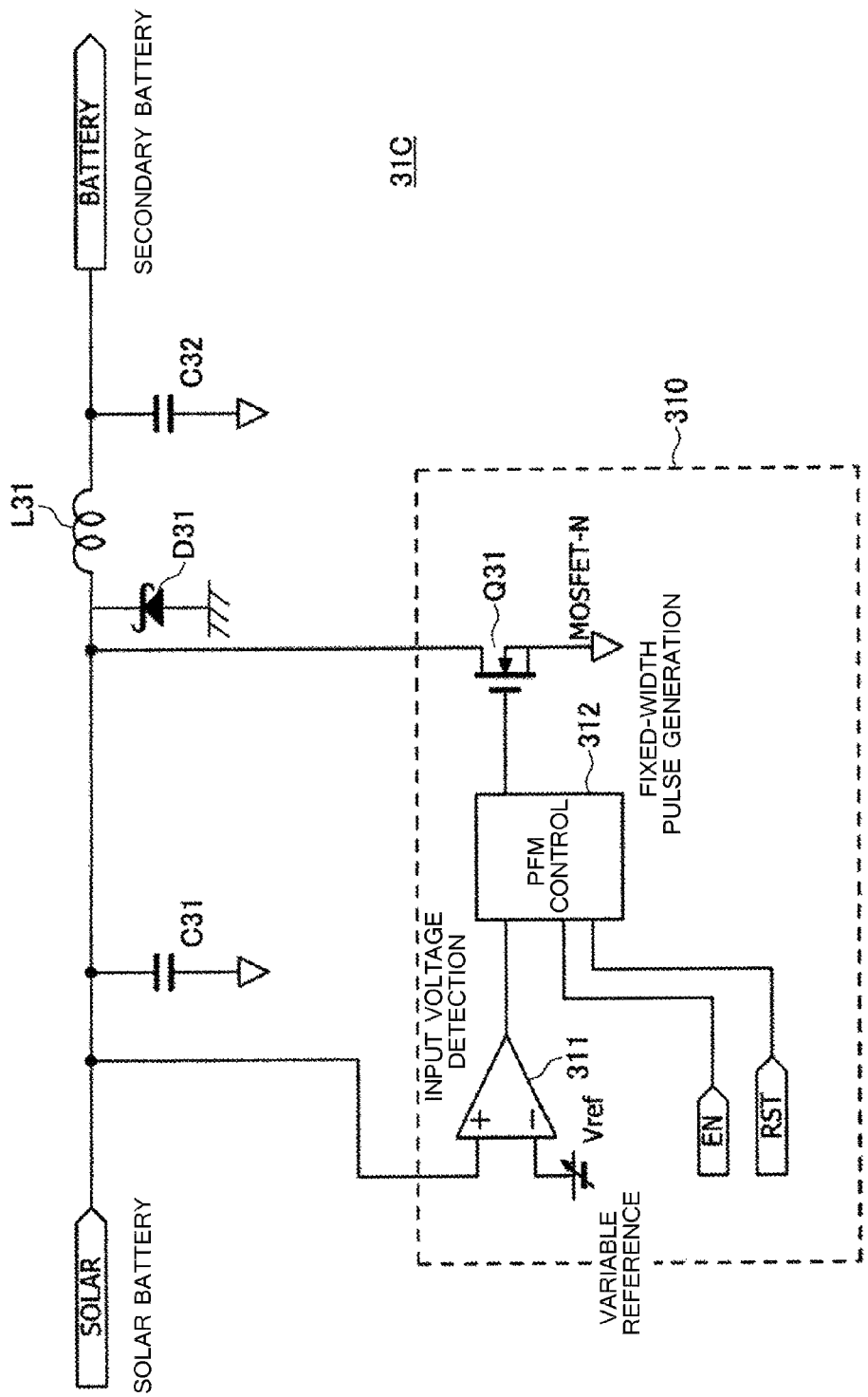
FIG. 51 is a circuit diagram of a basic configuration example of a step-down-type switching regulator as a voltage conversion unit according to the present embodiment.

While in the foregoing description the voltage conversion unit 31 is provided by a step-up type switching regulator, it is also possible to apply a step-down type switching regulator 31C as shown in FIG. 51.

Basically, the step-down type switching regulator 31C has a configuration similar to the step-up type except for the mode of connection of the inductor L31 and the diode D31.

Thus, the circuit configuration of FIG. 49 can be applied as it is.

<4-5. Configuration Example of Backflow Prevention Circuit>

Figure 52:
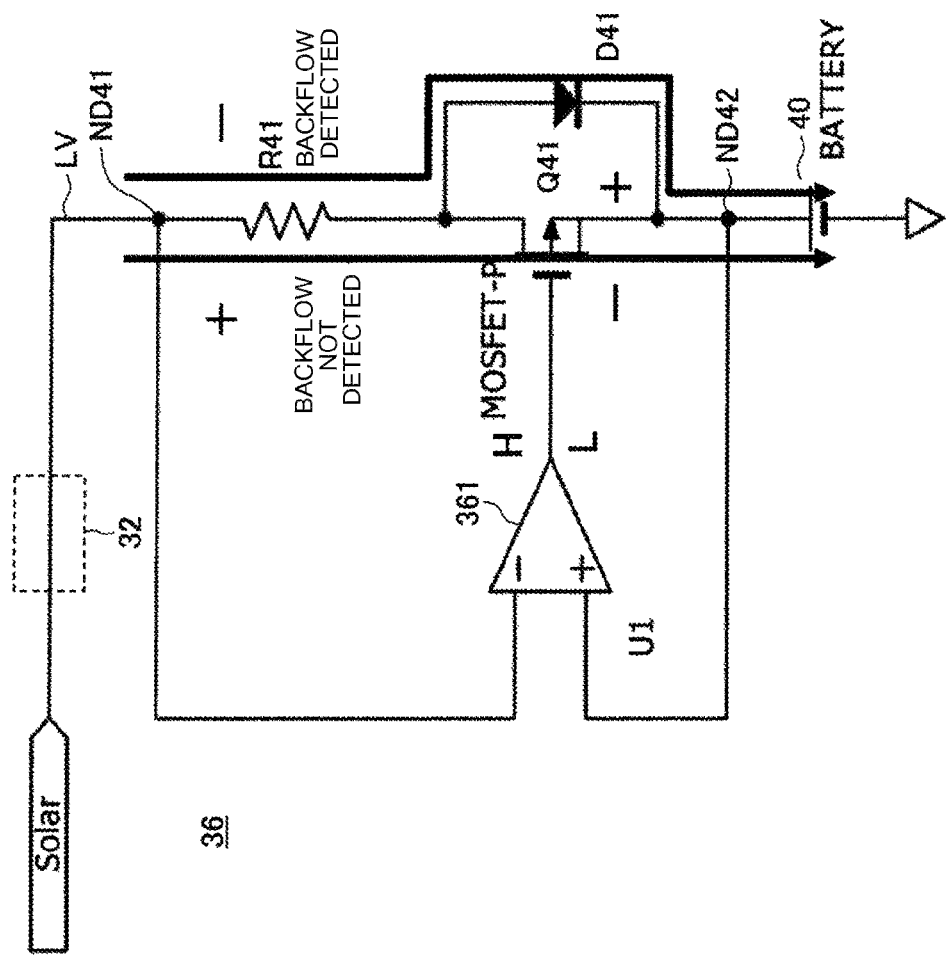
FIG. 52 is a circuit diagram of a configuration example of a backflow prevention circuit according to the present embodiment.

FIG. 52 shows a circuit diagram of a configuration example of a backflow prevention circuit according to the present embodiment.

The backflow prevention circuit 36 is disposed in a voltage supply line LV from the output of the power switch circuit 32 to the electricity storage element 40.

The backflow prevention circuit 36 includes a resistor R41, a switching transistor Q41 formed by a PMOSFET, a diode D41, and a comparator 361.

The resistor R41 and the switching transistor Q41 are connected in series between a node ND41 on the generating element side and a node ND42 on the electricity storage element 40 side of the voltage supply line LV1. The diode D41 for backflow prevention is connected in parallel to the switching transistor Q41.

The comparator 361 compares the potential of the node ND41 with the potential of the node ND42, and turns on or off the switching transistor Q41 depending on the comparison result.

The backflow prevention circuit 36 performs a bypass control of the diode for preventing backflow from the electricity storage element 40 to the generating element (solar battery).

The backflow prevention circuit 36 decreases the loss due to the forward voltage VF while preventing backflow.

When the potential of the node ND41 is higher than the potential of the node ND42 and there is a no-backflow state, no backflow is detected and the comparator 361 outputs a low level.

As a result, the switching transistor Q41 turns on and the backflow prevention diode D41 is bypassed.

When the potential of the node ND42 is higher than the potential of the node ND41 and there is a backflow state, the backflow is detected and the comparator 361 outputs a high level.

As a result, the switching transistor Q41 turns off and a connection line dedicated to the backflow prevention diode D41 is provided.

In this configuration, the loss due to the backflow prevention circuit needs to be smaller than the loss due to the diode connection.

It is also possible to be configured such that the backflow can be detected only via the on-resistance of the MOSFET.

It is preferable that the electric power consumption by the comparator 361 be minimized.

It is also possible to perform backflow prevention by utilizing the characteristics of the secondary battery.

In this case, the diode D41 dedicated to backflow prevention is provided when the battery voltage sharply drops during charging (charging voltage>discharging voltage).

<4-6. Charging Control>

Next, charging control of the electricity storage element 40 by the current/voltage limit circuit 37 of the electric power control apparatus 30 will be described.

Figure 53:
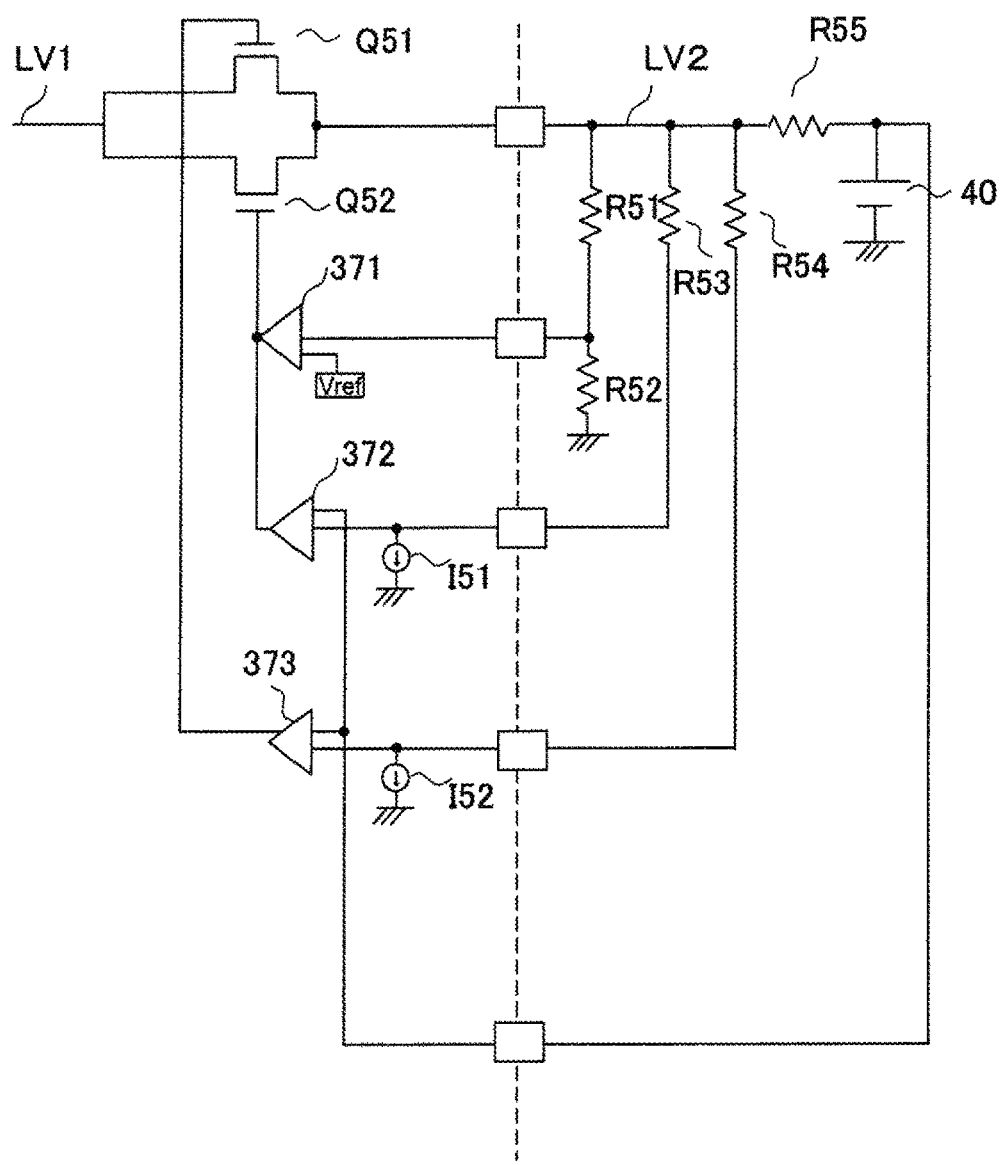
FIG. 53 is a circuit diagram of a configuration example of a current/voltage limit circuit according to the present embodiment.

FIG. 53 is a circuit diagram of a configuration example of the current/voltage limit circuit according to the present embodiment.

The current/voltage limit circuit 37 includes MOSFETs Q51 and Q52 disposed in a voltage supply line, error amplifiers 371 to 373, constant current sources I51 and I52, and external resistors R51 to R55.

In the current/voltage limit circuit 37, the gate potentials of the MOSFETs Q51 and Q52 are controlled by the error amplifiers 371 to 373.

As a control voltage, a reference voltage Vref1 provided to the error amplifier 371 is used in the case of voltage regulation.

In the case of current regulation, the control voltage is provided by a voltage dropped when a current is pulled by the constant current sources I51 and I52 from the path of R55 of the electricity storage element (BAT) 40.

Two types of control are provided, i.e., a maximum limit and an initial charging limit.

[Charging Termination Method in the Case of Load Pulling (1)]

When a load LD (FIG. 1) is connected to the electricity storage element 40, the voltage is limited not to the full charging voltage of 4.2 V but a lower voltage, such as 4.1 V.

There may be a possible aspect where charging may not be terminated, or terminated when ΔV is infinitely close to 4.1 V, for example.

Floating time may be extended, and sometimes it may be better to charge with a lower voltage.

In the present example, full charge is not attained. For example, approximately 90% voltage is obtained.

Full charge may gradually be approached by extending the charging time.

[Charge Termination Method in the Case of Load Pulling (2)]

In addition to the above method (1), charging may be terminated by a 4.2 V regurage/ΔV detection technique (4.1×V) when there is a signal (no load connected) from a control pin.

In the case of a stand-alone charger, this pin may be configured to provide a fixed potential so that the charging voltage control of the electricity storage element 40 can be performed at all times.

[ΔV Detection Technique]

After the start of CV charging, ΔV detection is started at five-minute intervals, for example.

The period of five minutes may be adopted in view of the output electric power performance of the generating elements (solar batteries) 20-1 and 20-2 or the charging capacity of the electricity storage element 40, for example.

Charging is terminated during ΔV detection and the open voltage of the electricity storage element 40 is measured.

Charging may be terminated for two or three seconds, for example. The termination time may be determined in view of the performance of the ADC or the electricity storage element 40.

The difference between the charging voltage and the open voltage is measured as ΔV. When the ΔV is equal to or less than 50 mV, for example, charging is terminated.

<4-7. Overall Charging Control>

Next, charging control of the electricity storage element 40 by the electric power control apparatus 30 will be described.

Figure 54:
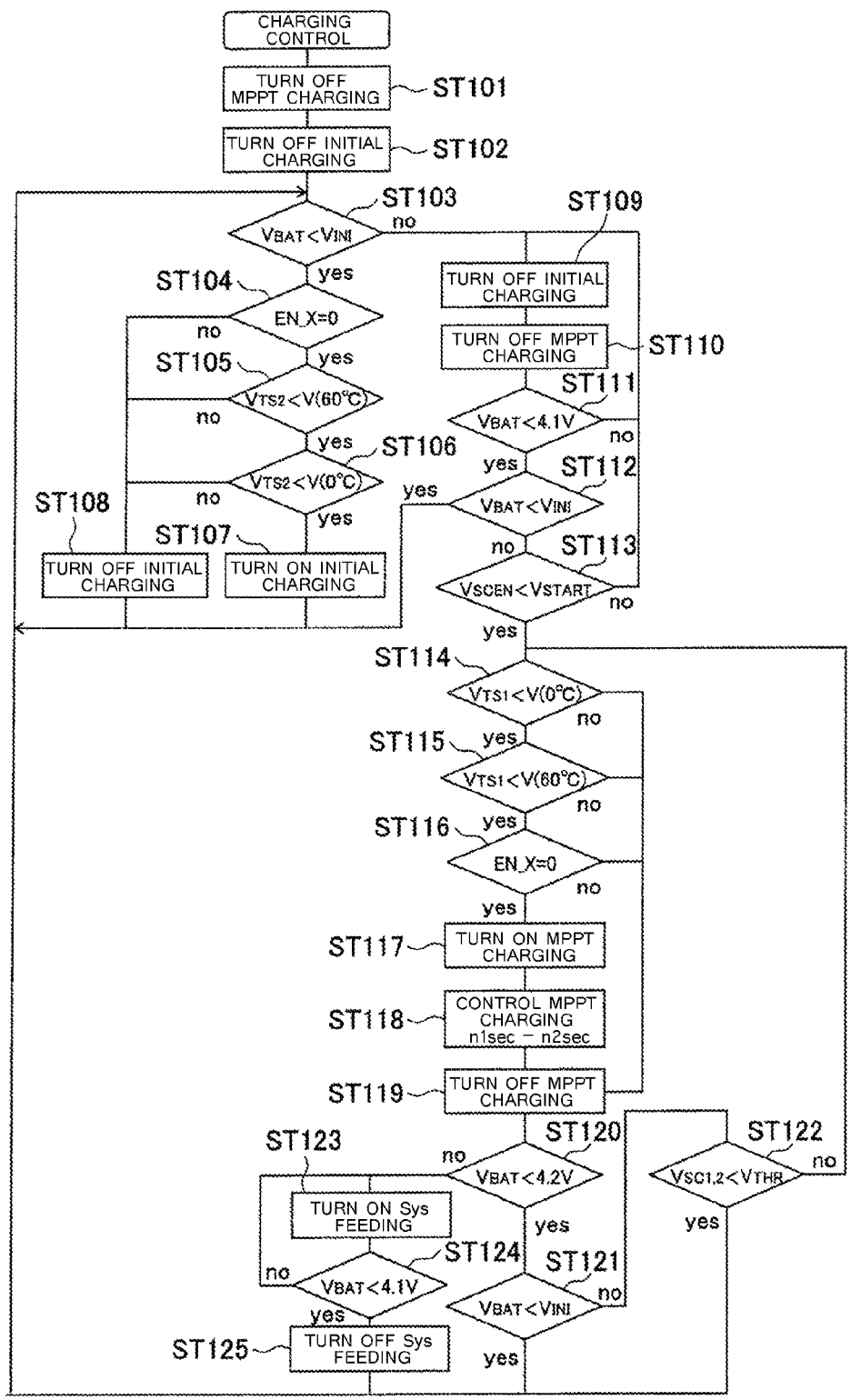
FIG. 54 is a flowchart illustrating an overall charging control by an electric power control apparatus according to the present embodiment.

FIG. 54 is a flowchart for describing the overall charging control by the electric power control apparatus according to the present embodiment.

The second control unit 35 controls the power switch circuit 32 and the like on the basis of a detection result from the thermistor 50, for example.

In the following, the overall charging control will be described, including the operations of the second control unit 35 and the start-up circuit 38.

First, it is determined whether, in a state where MPPT charging is off (ST101) and the initial charging is off (ST102), an input voltage VIN by the generating elements 20-1 and 20-2 is higher than the voltage VBAT of the electricity storage element 40 (ST103).

When it is determined in step ST103 that the input voltage VIN is higher than the voltage VBAT of the electricity storage element 40, it is determined whether a low, active charging enable signal EN_X is at low level (ST104).

When the charging enable signal EN_X is at low level, initial charging is turned on (ST107) when the temperature from the thermistor 50 is not 0° or less (ST105) and not 60° or more (ST106).

Thus, the initial charging of the electricity storage element 40 is performed with the electric power generated by the generating elements 20-1 and 20-2, and the process returns to step ST103.

When negative determination results are obtained in steps ST105 to ST107, the process returns to step ST103 while leaving the initial charging off (ST108).

When it is determined in step ST103 that the input voltage VIN is lower than the voltage VBAT of the electricity storage element 40, the initial charging is turned off (ST109), and the MTTP charging is maintained off (ST110).

Then, it is determined whether the voltage VBAT of the electricity storage element 40 is lower than 4.1 V, which is the limited full charging voltage of 4.2 V (ST111).

When the voltage VBAT of the electricity storage element 40 is lower than 4.1 V, it is determined whether the input voltage VIN by the generating elements 20-1 and 20-2 is higher than the voltage VBAT of the electricity storage element 40 (ST112).

When the input voltage VIN is higher than the voltage VBAT of the electricity storage element 40, the process returns to step ST103. When the input voltage VIN is lower, it is determined whether a starting voltage VSTART is lower than a starting threshold value voltage VSCEN of a charging system circuit (ST113).

When the starting voltage VSTART is higher than the starting threshold value voltage VSCEN, the process returns to step ST109.

When the starting voltage VSTART is lower than the starting threshold value voltage VSCEN, the following applies.

That is, when the temperature from the thermistor 50 is not 0° or lower (ST114) and not 60° or higher (ST115), and when the charging enable signal EN_X is at low level (ST116), the MTTP charging is turned on (ST117).

As a result, when the switching is performed such that the voltage conversion unit 31 is applied, the MPPT charging control is performed (ST118).

After the MPPT charging control, the MPPT charging is turned off (ST119), and then it is determined whether the voltage VBAT of the electricity storage element 40 is lower than the full charging voltage of 4.2 V (ST120).

When the voltage VBAT of the electricity storage element 40 is lower than the full charging voltage of 4.2 V, it is determined whether the input voltage VIN is higher than the voltage VBAT of the electricity storage element 40 (ST121). When the input voltage VIN is higher, the process returns to step ST103.

When the input voltage VIN is lower than the voltage VBAT of the electricity storage element 40, it is determined whether output voltages VSC1 and 2 of the generating elements 20-1 and 20-2 are lower than the voltage VTHR (ST122).

When the output voltages VSC1 and 2 are lower than the voltage VTHR, the process returns to step ST103. When the output voltages VSC1 and 2 are higher, the process returns to step ST114.

When it is determined in step ST120 that the voltage VBAT of the electricity storage element 40 is higher than the full charging voltage of 4.2 V, a system feeding function is turned on (ST123).

It is then determined whether the voltage VBAT of the electricity storage element 40 is lower than 4.1 V, i.e., the limited full charging voltage of 4.2 V (ST124). When lower, the system feeding function is turned off (ST125) and the process returns to step ST103.

When the electric power supply is being limited by the current/voltage limit circuit 37, the backflow prevention function of the backflow prevention circuit 36 may be controlled to be terminated.

Such control may be configured to directly perform by the current/voltage limit circuit 37, or by the first control unit 34 or the second control unit 35.

It is also possible for the second control unit 35 to control monitoring of the voltage VBAT of the electricity storage element 40, i.e., the secondary battery, and turn-off of the voltage conversion unit 31 at the time of full charge.

Figure 55:
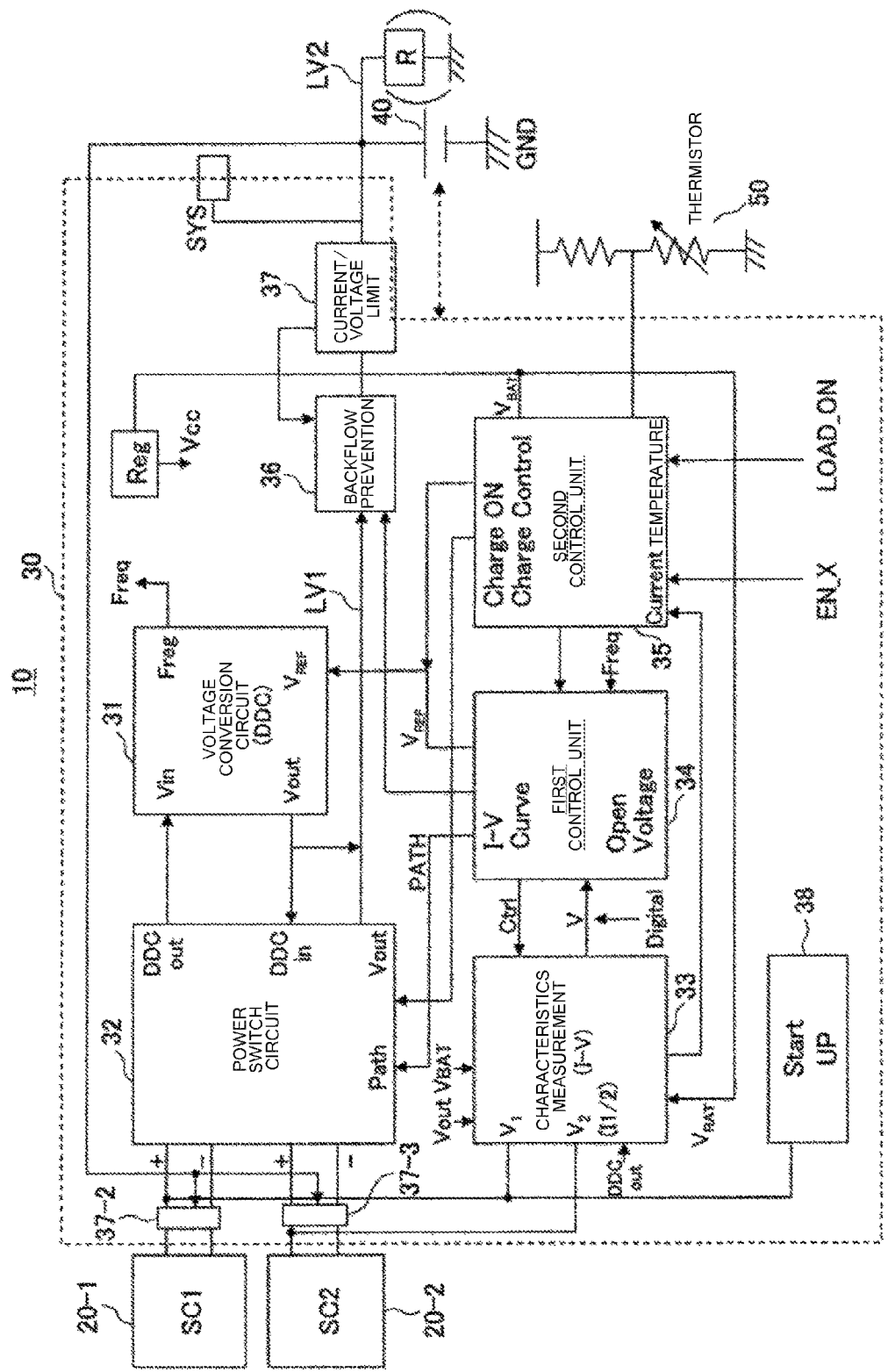
FIG. 55 shows an example in which the current/voltage limiting circuit according to the present embodiment is disposed not just in an output stage but also in an input stage of the electric power control apparatus.

Further, as shown in FIG. 55, current/voltage limit circuits 37-2 and 37-3 may be provided in a portion where the generating elements 20-1 and 20-2 are connected and configured such that the electric power supply can be limited when the generated electric power of the generating elements 20-1 and 20-2 is equal or more than a certain value.

Also, the backflow prevention function of the backflow prevention circuit 36 may be controlled to be terminated when the electric power supply is limited by the current/voltage limit circuits 37-2 and 37-3.

In the configuration of FIG. 55, the current/voltage limit circuits are disposed at the input stage and the output stage of the electric power control apparatus 30. The current/voltage limit circuits may be configured to be disposed at one of the input stage and the output stage.

<5. Case where Different Types of Solar Batteries are Used>

Figure 56:
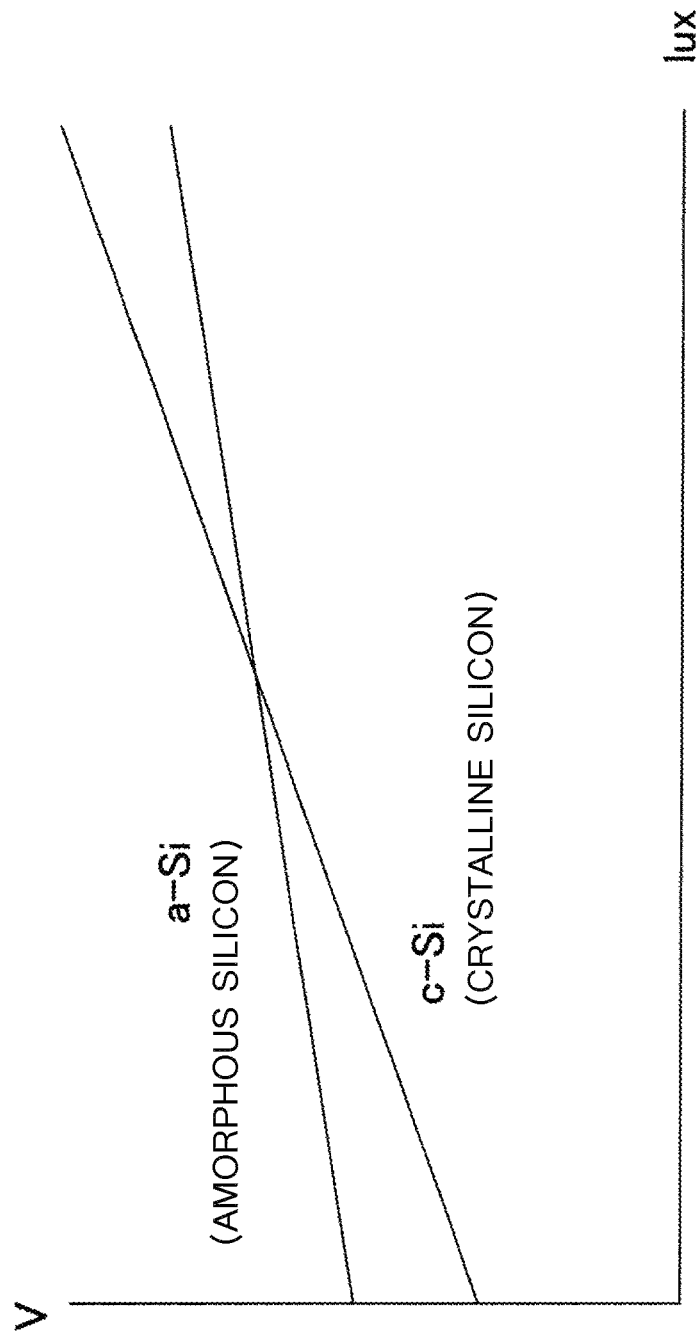
FIG. 56 is a diagram illustrating different rates of change of voltage (open voltage or maximum operating point voltage) with respect to illuminance depending on the type of solar battery.

FIG. 56 shows that the rate of change of a voltage (the open voltage or the maximum operating point voltage) with respect to illuminance varies depending on the type of solar battery.

In the case of amorphous silicon (a-Si), the rate of change of voltage with respect to illuminance is small.

In the case of crystalline silicon (c-Si), the rate of change of voltage with respect to illuminance is large.

Figure 57:
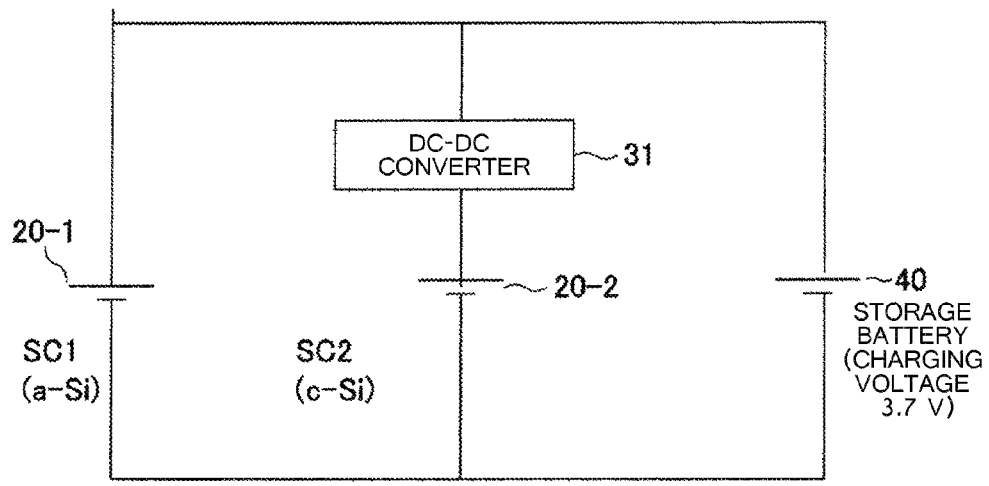
FIG. 57 is a diagram illustrating a mode of connection in a case where different types of solar batteries are used.

FIG. 57 is a diagram illustrating a mode of connection in a case where different types of solar batteries are used.

In this case, a solar battery with a large rate of change of voltage and a solar battery with a small rate of change of voltage are connected in parallel.

When the voltage (the open voltage or the maximum operating point voltage) is equal to or less than V1, the output from the solar battery with a large rate of change of voltage is controlled to be stepped up by the DC-DC converter, i.e., the voltage conversion unit 31.

When the voltage is equal to or more than V2, the output is controlled to be stepped down by the DC-DC converter. When the voltage is between V1 and V2, the output is output without passing through the DC-DC converter.

When, in the above circuit configuration, the voltages of the solar batteries are insufficient for charging the storage battery, the respective solar batteries are connected in series.

According to the electric power feeding system of the present embodiment, the electricity storage element (battery) 40, i.e., the secondary battery, can be charged (or caused to store electricity) from the generating elements 20-1(SC1) and 20-1(SC2), such as solar batteries, not just under sunlight but also in the shades or under indirect light, or other everyday environments, such as in a bright room.

Particularly, the maximum operating point of the generating elements, such as the solar batteries, can be controlled to be maintained, so that electric power loss can be avoided.

The process steps described with reference to the embodiment of the present invention may be viewed as a method including a series of the steps. The process steps may also be viewed as a program for causing a computer to execute a series of the steps, or a recording medium storing the program. As such a recording medium, a CD (Compact Disc), a MD (Mini Disc), a DVD (Digital Versatile Disc), a memory card, a Blu-ray Disc (registered trademark), or the like may be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

10 Electric power feeding system
20-1, 20-1 Generating element
30 Electric power control apparatus
31 Voltage conversion unit
32 Power switch circuit (Electric power path switch unit)
33 Characteristics measurement circuit
34 First control unit
35 Second control unit
36 Backflow prevention circuit
37 Current/voltage limit circuit

38 Start-up circuit
40 Electricity storage element

The invention claimed is:
1. An electric power control apparatus comprising:
an electric power path switch unit configured to be connectable with a plurality of generating elements; and
a voltage conversion unit configured to convert a voltage level which is generated by the generating elements and supplied via the electric power path switch unit,
wherein the electric power path switch unit includes:
a first connection switching function which switches between series connection and parallel connection for the plurality of generating elements; and
a second connection switching function which switches between connected and non-connected to an input side of the voltage conversion unit for the generating elements connected in series or parallel,
wherein the electric power path connection unit is configured to, when output voltages of the generating elements are in a first voltage range, connect the plurality of generating elements in parallel by the first connection switching function, and
perform connection switching to a non-connected state by the second connection switching function such that the voltage level of any of the output voltages of the plurality of generating elements is not converted by the voltage conversion unit.

2. The electric power control apparatus according to claim 1,
wherein the electric power path connection unit is configured to, when the output voltages of the generating elements are in a second voltage range, connect the plurality of generating elements in parallel by the first connection switching function, and
perform the connection switching to a connected state by the second connection switching function such that the voltage level of a final-stage output voltage of the plurality of generating elements is converted by the voltage conversion unit.

3. The electric power control apparatus according to claim 1,
wherein the electric power path connection unit is configured to, when the output voltages of the generating elements are in a third voltage range, connect the plurality of generating elements in series by the first connection switching function, and
perform connection switching to a non-connected state by the second connection switching function such that the voltage level of any of the output voltages of the plurality of generating elements is not converted by the voltage conversion unit.

4. The electric power control apparatus according to claim 1,
wherein the electric power path connection unit is configured to, when the output voltages of the generating elements are in a fourth voltage range, connect the plurality of generating elements in series by the first connection switching function, and
perform connection switching to a non-connected state by the second connection switching function such that the voltage level of a final-stage output voltage of the plurality of generating elements is converted by the voltage conversion unit.

5. The electric power control apparatus according to claim 4,
wherein the first voltage range is higher than the second voltage range, the second voltage range is higher than the third voltage range, and the third voltage range is higher than the fourth voltage range.

6. The electric power control apparatus according to claim 1,
wherein the electric power path connection unit is configured to, when the output voltages of the generating elements are in a fifth voltage range, connect the plurality of generating elements in parallel by the first connection switching function, and
perform connection switching to a connected state by the second connection switching function such that the voltage level of a final-stage output voltage of the plurality of generating elements is converted by the voltage conversion unit.

7. The electric power control apparatus according to claim 6,
wherein the fifth voltage range is higher than the first voltage range, the first voltage range is higher than the second voltage range, the second voltage range is higher than the third voltage range, and the third voltage range is higher than the fourth voltage range.

8. The electric power control apparatus according to claim 1, comprising:
a control unit configured to perform MPPT control by switching an electric power path of the electric power path switch unit such that a maximum electric power operating point of the generating elements is tracked.

9. The electric power control apparatus according to claim 1, comprising:
a control unit configured to perform MPPT control in the voltage conversion unit such that a maximum electric power operating point of the generating elements is tracked in the voltage conversion unit upon selection of an electric power path including the voltage conversion unit and when a circuit is operated in the selected electric power path.

10. The electric power control apparatus according to claim 8, comprising a characteristics measurement circuit configured to measure output characteristics of the plurality of generating elements,
wherein the control unit is configured to perform switching control of the electric power path of the electric power path switch unit in accordance with a measurement result from the characteristics measurement circuit.

11. The electric power control apparatus according to claim 10, wherein
the characteristics measurement circuit includes a function of measuring a short-circuit current and an open voltage of the plurality of generating elements, and
the control unit performs the switching control of the electric power path of the electric power path switch unit by determining the electric power path in accordance with the short-circuit current and the open voltage obtained by the characteristics measurement circuit.

12. The electric power control apparatus according to claim 11,
wherein the control unit is configured to determine whether the plurality of generating elements are in a generating operation state on the basis of the short-circuit current obtained by the characteristics measurement circuit, and perform the switching control of the electric power path of the electric power path switch unit by determining the electric power path by determining an operation state on the basis of the open voltage.

13. The electric power control apparatus according to claim 10,
wherein the characteristics measurement circuit is configured to, upon selection of the electric power path including the voltage conversion unit and when a circuit is operated in the selected electric power path, perform current-voltage (I-V) measurement for the MPPT control for tracking the maximum electric power operating point of the generating elements in the voltage conversion unit, and
the control unit is configured to perform the MPPT control in the voltage conversion unit on the basis of a I-V measurement result.

14. An electric power control method comprising:
when output voltages of a plurality of generating elements are in a first voltage range,
connecting the plurality of generating elements in parallel by a first connection switching function, and
performing connection switching to a non-connected state by a second connection switching function such that a voltage level of any of the output voltages of the plurality of generating elements is not converted by a voltage conversion unit;
when the output voltages of the generating elements are in a second voltage range lower than the first voltage range,
connecting the plurality of generating elements in parallel by the first connection switching function, and
performing the connection switching to a connected state by the second connection switching function such that the voltage level of a final-stage output voltage of the plurality of generating elements is converted by the voltage conversion unit; and
when the output voltages of the generating elements are in a third voltage range lower than the second voltage range,
connecting the plurality of generating elements in series by the first connection switching function, and
performing the connection switching to the non-connected state by the second connection switching function such that the voltage level of any of the output voltages of the plurality of generating elements is not converted by the voltage conversion unit.

15. The electric power control method according to claim 14, comprising, when the output voltages of the generating elements are in a fourth voltage range lower than the third voltage range:
connecting the plurality of generating elements in series by the first connection switching function; and
performing the connection switching to the non-connected state by the second connection switching function such that the voltage level of the final-stage output voltage of the plurality of generating elements is converted by the voltage conversion unit.

16. The electric power control method according to claim 14, comprising, when the output voltages of the generating elements are in a fifth voltage range higher than the first voltage range:
connecting the plurality of generating elements in parallel by the first connection switching function; and
performing the connection switching to the connected state by the second connection switching function such that the voltage level of the final-stage output voltage of the plurality of generating elements is converted by the voltage conversion unit.

17. An electric power feeding system comprising:
a plurality of generating elements configured to generate electric power;
a characteristics measurement circuit configured to measure output characteristics of the plurality of generating elements; and
an electric power control apparatus configured to supply the electric power from the generating elements to a load side,
wherein the electric power control apparatus includes
an electric power path switch unit configured to be connectable with the plurality of generating elements, and
a voltage conversion unit configured to convert a voltage level which is generated by the generating elements and supplied via the electric power path switch unit,
wherein the electric power path switch unit includes
a first connection switching function which switches between series connection or parallel connection for the plurality of generating elements, and
a second connection switching function which switches between connected and non-connected to an input side of the voltage conversion unit for the generating elements connected in series or parallel, and
wherein the characteristics measurement circuit includes:
a capacitor connected configured to an electric power supply line of the generating elements;
a variable voltage source;
a comparator configured to compare a voltage of the electric power supply line with a voltage of the variable voltage source;
a counter configured to count the time for a variable voltage to be higher than the voltage of the electric power supply line; and
a controller configured to determine a current value on the basis of a complementary voltage and a count value obtained by a voltage increase by $\Delta V$.

18. An electric power control apparatus comprising:
an electric power path switch unit configured to be connectable with a plurality of generating elements and including a function of switching between series connection and parallel connection for the plurality of generating elements;
a characteristics measurement circuit configured to measure output characteristics of the plurality of generating elements; and
a control unit configured to perform switching control of an electric power path of the electric power path switch unit in accordance with a measurement result from the characteristics measurement circuit,
wherein the characteristics measurement circuit includes:
a capacitor connected configured to an electric power supply line of the generating elements;
a variable voltage source;
a comparator configured to compare a voltage of the electric power supply line with a voltage of the variable voltage source;
a counter configured to count the time for a variable voltage to be higher than the voltage of the electric power supply line; and
a controller configured to determine a current value on the basis of a complementary voltage and a count value obtained by a voltage increase by $\Delta V$.

19. The electric power control apparatus according to claim 18,
wherein the characteristics measurement circuit includes a function of measuring a short-circuit current and an open voltage of the plurality of generating elements, and
the control unit is configured to perform the switching control of the electric power path of the electric power path switch unit by determining the electric power path in accordance with the short-circuit current and the open voltage obtained by the characteristics measurement circuit.

20. The electric power control apparatus according to claim 19,
wherein the control unit is configured to determine whether the plurality of generating elements are in a generating operation state on the basis of the short-circuit current obtained by the characteristics measurement circuit, and
perform the switching control of the electric power path of the electric power path switch unit by determining the electric power path by determining an operation state on the basis of the open voltage.

21. The electric power control apparatus according to claim 18,
wherein the control unit includes a function which performs MPPT control by switching the electric power path of the electric power path switch unit such that a maximum electric power operating point of the generating elements is tracked.

22. The electric power control apparatus according to claim 18, comprising a voltage conversion unit configured to convert a voltage level which is generated by the generating elements and supplied via the electric power path switch unit,
wherein the electric power path switch unit is configured to be connectable with the plurality of generating elements and includes a first connection switching function which switches between series connection and parallel connection for the plurality of generating elements, and a second connection switching function which switches the generating elements connected to an input side of the voltage conversion unit,
the characteristics measurement circuit is configured to perform, upon selection of the electric power path including the voltage conversion unit and when a circuit is operated in the selected electric power path, current-voltage (I-V) measurement for MPPT control such that a maximum electric power operating point of the generating elements is tracked in the voltage conversion unit, and
the control unit is configured to perform the MPPT control in the voltage conversion unit on the basis of a I-V measurement result.

23. The electric power control apparatus according to claim 18,
wherein the control unit is configured to measure a current at a voltage on a load side at the time of series connection and a current at a voltage on the load side at the time of parallel connection, and select the electric power path with higher electric power.

24. The electric power control apparatus according to claim 18,
wherein the characteristics measurement circuit includes a capacitor connected to an electric power supply line of the generating elements, and is configured to measure I-V characteristics by measuring a charging voltage to the capacitor at certain time intervals.

25. The electric power control apparatus according to claim 18,
wherein the characteristics measurement circuit includes a resistor connected to the electric power supply line of the generating elements.

26. The electric power control apparatus according to claim 18,
wherein the characteristics measurement circuit includes:
a switch connected to the electric power supply line of the generating element and configured to be turned on or off by a control signal; and
a resistor connected to the switch.

27. An electric power control apparatus comprising:
a voltage conversion unit configured to convert a voltage level which is generated by at least one generating element;
a characteristics measurement circuit configured to measure output characteristics of the generating element; and
a control unit configured to perform MPPT control for tracking a maximum electric power operating point of the generating element in the voltage conversion unit in accordance with a measurement result from the characteristics measurement circuit,
wherein the voltage conversion unit is configured to compare a variable reference voltage with the voltage level generated by the generating element, and perform charging or discharging such that the maximum electric power operating point of the generating element is tracked in accordance with a comparison result, and
the control unit is configured to perform the MPPT control for tracking the maximum electric power operating point of the generating element in the voltage conversion unit by supplying the variable reference voltage on the basis of the measurement result from the characteristics measurement circuit.

28. The electric power control apparatus according to claim 27,
wherein the characteristics measurement circuit includes a function of measuring a short-circuit current and an open voltage of the plurality of generating elements, and
the control unit is configured to determine the reference voltage in accordance with the short-circuit current and the open voltage obtained by the characteristics measurement circuit, and supply the reference voltage to the voltage conversion unit.

29. The electric power control apparatus according to claim 28, wherein the voltage conversion unit includes:
an inductor connected to an electric power supply line of the generating elements; and
a switch element configured to perform charging or discharging of energy in the inductor in accordance with a result of comparison of an input voltage from the electric power supply line and the reference voltage, and
wherein the control unit includes a function which changes the reference voltage in accordance with increase or decrease of a switching frequency of the switch element.

30. The electric power control apparatus according claim 27, comprising:
a plurality of generating elements; and
an electric power path switch unit configured to be connectable with the plurality of generating elements and including a function which switches the generating elements connected to an input side of the voltage conversion unit, wherein the characteristics measurement circuit includes a function of measuring output characteristics of the plurality of generating elements, and the control unit is configured to perform switching control of the electric power path of the electric power path switch unit in accordance with a measurement result from the characteristics measurement circuit.

31. The electric power control apparatus according to claim 30, wherein the electric power path switch unit is configured to be connectable with the plurality of generating elements and includes a first connection switching function which switches between series connection and parallel connection for the plurality of generating elements, and a second connection switching function which switches the generating elements connected to the input side of the voltage conversion unit.

32. The electric power control apparatus according to claim 31, wherein the characteristics measurement circuit includes a function of measuring a short-circuit current and an open voltage of the plurality of generating elements, and the control unit is configured to perform the switching control of the electric power path of the electric power path switch unit by determining the electric power path in accordance with the short-circuit current and the open voltage obtained by the characteristics measurement circuit.

33. The electric power control apparatus according to claim 32, wherein the control unit is configured to determine whether the plurality of generating elements are in a generating operation state on the basis of the short-circuit current obtained by the characteristics measurement circuit, and perform the switching control of the electric power path of the electric power path switch unit by determining the electric power path by determining an operation state on the basis of the open voltage.

34. The electric power control apparatus according to claim 30, wherein the control unit includes a function which performs MPPT control by switching the electric power path of the electric power path switch unit such that a maximum electric power operating point of the generating elements is tracked.

35. The electric power control apparatus according to claim 30, wherein the characteristics measurement circuit is configured to, upon selection of the electric power path including the voltage conversion unit and when a circuit is operated in the selected electric power path, perform current-voltage (I-V) measurement for the MPPT control for tracking the maximum electric power operating point of the generating elements in the voltage conversion unit, and the control unit is configured to perform the MPPT control in the voltage conversion unit on the basis of a I-V measurement result.

36. The electric power control apparatus according to claim 27, wherein the voltage conversion unit includes:

an inductor connected to an electric power supply line of the generating element;

a switch element for performing charging or discharging of energy in the inductor;

a comparator configured to compare an input voltage from the electric power supply line with the reference voltage; and a pulse control unit configured to turn on the switch element so as to discharge the inductor for a predetermined time when the input voltage exceeds the reference voltage according to a comparison result from the comparator.

37. The electric power control apparatus according to claim 27, wherein the characteristics measurement circuit includes a capacitor connected to an electric power supply line of the generating element, and is configured to measure I-V characteristics by measuring a charging voltage to the capacitor at certain time intervals.

38. The electric power control apparatus according to claim 27, wherein the characteristics measurement circuit includes:

a capacitor connected to an electric power supply line of the generating element;

a variable voltage source;

a comparator configured to compare a voltage of the electric power supply line with a voltage of the variable voltage source;

a counter configured to count the time for a variable voltage to be higher than the voltage of the electric power supply line; and a controller configured to determine a current value on the basis of a complementary voltage and a count value obtained by a voltage increase by $\Delta V$.

39. The electric power control apparatus according to claim 27, wherein the characteristics measurement circuit includes a resistor connected to an electric power supply line of the generating element.

40. The electric power control apparatus according to claim 27, wherein the characteristics measurement circuit includes:

a switch connected to an electric power supply line of the generating element and configured to be turned on or off by a control signal; and a resistor connected to the switch.

41. An electric power feeding system comprising:

at least one generating element configured to generate electric power; and an electric power control apparatus configured to supply the electric power from the generating element to a load side, wherein the electric power control apparatus includes:

a voltage conversion unit configured to convert a voltage level generated by the generating element;

a characteristics measurement circuit configured to measure output characteristics of the generating element; and a control unit configured to perform MPPT control for tracking a maximum electric power operating point of the generating element in the voltage conversion unit in accordance with a measurement result from the characteristics measurement circuit, wherein the voltage conversion unit is configured to compare a variable reference voltage with the voltage level generated by the generating element, and perform charging or discharging such that the maximum electric power operating point of the generating elements is tracked in accordance with a comparison result, and the control unit is configured to perform the MPPT control for tracking the maximum electric power operating point of the generating element in the voltage conversion unit by supplying the variable reference voltage on the basis of the measurement result from the characteristics measurement circuit.

42. An electric power control apparatus comprising:

an electric power path switch unit configured to be connectable with a plurality of generating elements and including a function which switches between series connection and parallel connection for the plurality of generating elements;

a voltage conversion unit configured to convert a voltage level generated by the generating elements and supplied via the electric power path switch unit; and a control unit configured to perform charging control by supplying electric power from the generating elements to an electricity storage element on a load side by performing switching control of the electric power path switch unit, wherein the control unit is configured to perform switching such that, when a voltage of the electricity storage element is equal to or less than a certain voltage, the electric power is directly supplied from the generating elements to the electricity storage element, and when the voltage of the electricity storage element is equal to or more than the certain voltage, operating voltages for the electric power path switch unit, the voltage conversion unit, and the control unit are obtained from the electricity storage element.

43. The electric power control apparatus according to claim 42, wherein the electric power path switch unit is configured to be connectable with the plurality of generating elements and includes a first connection switching function which switches between series connection and parallel connection for the plurality of generating elements, and a second connection switching function which switches the generating elements connected to an input side of the voltage conversion unit.

44. The electric power control apparatus according to claim 42, comprising:

a characteristics determination circuit including a function which measures a short-circuit current and an open voltage of the plurality of generating elements; and a control unit configured to perform switching control of an electric power path of the electric power path switch unit by determining the electric power path in accordance with the short-circuit current and the open voltage obtained by the characteristics measurement circuit.

45. The electric power control apparatus according to claim 44, wherein the control unit is configured to determine whether the plurality of generating elements are in a generating operation state on the basis of the short-circuit current obtained by the characteristics measurement circuit, and perform the switching control of the electric power path of the electric power path switch unit by determining the electric power path by determining an operation state on the basis of the open voltage.

46. The electric power control apparatus according to claim 42, comprising a control unit including a function which performs MPPT control by switching an electric power path of the electric power path switch unit such that a maximum electric power operating point of the generating elements is tracked.

47. The electric power control apparatus according claim 42, comprising:

a characteristics measurement circuit configured to perform current-voltage (I-V) measurement for the MPPT control for tracking the maximum electric power operating point of the generating elements in the voltage conversion unit upon selection of the electric power path including the voltage conversion unit and when a circuit is operated in the selected electric power path; and a control unit configured to perform MPPT control in the voltage conversion unit on the basis of a I-V measurement result.

48. An electric power feeding system comprising:

a plurality of generating elements configured to generate electric power; and an electric power control apparatus configured to supply the electric power from the generating elements to a load side, wherein the electric power control apparatus includes:

an electric power path switch unit configured to be connectable with the plurality of generating elements and including a function which switches between series connection and parallel connection for the plurality of generating elements;

a voltage conversion unit configured to convert a voltage level generated by the generating elements and supplied via the electric power path switch unit; and a control unit configured to perform charging control by supplying the electric power from the generating elements to the load side by performing switching control of the electric power path switch unit, wherein the control unit is configured to, when a voltage of the electricity storage elements is equal to or less than a certain voltage, directly supply the electric power from the generating elements to the electricity storage element, and configured to, when the voltage of the electricity storage element is equal to or more than the certain voltage, perform the switching such that operating voltages for the electric power path switch unit, the voltage conversion unit, and the control unit are obtained from the electricity storage element.

49. An electric power control apparatus comprising:

an electric power path unit configured to be connectable with a plurality of generating elements with different rates of change of a voltage with respect to illuminance or temperature; and a voltage conversion unit configured to convert a voltage level generated by the generating elements and supplied via the electric power path unit, wherein the electric power path unit is configured to connect the generating elements with a large rate of change of the voltage to the voltage conversion unit, and put the generating elements with a small rate of change of the voltage in a non-connected state with respect to the voltage conversion unit.

50. The electric power control apparatus according to claim 49, wherein the electric power path unit is configured to connect the generating elements with the large rate of change of the voltage to the voltage conversion unit in series, and connect the generating elements with the small rate of change of the voltage to the generating elements and the voltage conversion unit that are in series connection in parallel.

51. The electric power control apparatus according to claim 49, wherein the electric power path unit includes an electric power path switch unit,
wherein the electric power path switch unit is configured to be connectable with the plurality of generating elements and includes a first connection switching function which switches between series connection and parallel connection for the plurality of generating elements, and a second connection switching function which switches the generating elements connected to an input side of the voltage conversion unit.

52. The electric power control apparatus according to claim 49, comprising:
a characteristics determination circuit including a function which measures a short-circuit current and an open voltage of the plurality of generating elements; and
a control unit configured to perform switching control of an electric power path of the electric power path switch unit by determining the electric power path in accordance with the short-circuit current and the open voltage obtained by the characteristics measurement circuit.

53. The electric power control apparatus according to claim 52,
wherein the control unit is configured to determine whether the plurality of generating elements are in a generating operation state on the basis of the short-circuit current obtained by the characteristics measurement circuit, and
perform the switching control of the electric power path of the electric power path switch unit by determining the electric power path by determining an operation state on the basis of the open voltage.

54. The electric power control apparatus according to claim 49, comprising a control unit including a function which performs MPPT control by switching an electric power path of the electric power path switch unit such that a maximum electric power operating point of the generating element is tracked.

55. The electric power control apparatus according to claim 49, comprising:
a characteristics measurement circuit configured to perform current-voltage (I-V) measurement for MPPT control for tracking a maximum electric power operating point of the generating elements in the voltage conversion unit upon selection of the electric power path including the voltage conversion unit and when a circuit is operated in the selected electric power path; and
a control unit configured to perform the MPPT control in the voltage conversion unit on the basis of a I-V measurement result.

56. An electric power feeding system comprising:
a plurality of generating elements with different rates of change of a voltage with respect to illuminance or temperature; and
an electric power control apparatus configured to supply electric power from the generating elements to a load side,
wherein the electric power control apparatus includes:
an electric power path unit configured to be connectable with the plurality of generating elements with the different rates of change of the voltage with respect to illuminance or temperature; and
a voltage conversion unit configured to convert a voltage level generated by the generating elements and supplied via the electric power path unit,
wherein the electric power path unit is configured to connect the generating elements with a large rate of change of the voltage to the voltage conversion unit, and
put the generating elements with a small rate of change of the voltage in a non-connected state with respect to the voltage conversion unit.

* * * * *